US008458038B2

(12) United States Patent
Ando

(10) Patent No.: US 8,458,038 B2
(45) Date of Patent: Jun. 4, 2013

(54) INFORMATION RETRIEVING SYSTEM, INFORMATION RETRIEVING METHOD, INFORMATION RETRIEVING APPARATUS, INFORMATION RETRIEVING PROGRAM, IMAGE RECOGNIZING APPARATUS IMAGE RECOGNIZING METHOD IMAGE RECOGNIZING PROGRAM AND SALES

(75) Inventor: Naotaka Ando, Tokyo (JP)

(73) Assignee: Zeta Bridge Corporation, Tokyo (JP)

(*) Notice: Subject to any disclaimer, the term of this patent is extended or adjusted under 35 U.S.C. 154(b) by 1218 days.

(21) Appl. No.: 10/597,168

(22) PCT Filed: Jan. 27, 2005

(86) PCT No.: PCT/JP2005/001561
§ 371 (c)(1),
(2), (4) Date: Jul. 31, 2008

(87) PCT Pub. No.: WO2005/073879
PCT Pub. Date: Aug. 11, 2005

(65) Prior Publication Data
US 2008/0279481 A1 Nov. 13, 2008

(30) Foreign Application Priority Data

Jan. 29, 2004 (JP) ................................ P2004-020852

(51) Int. Cl.
*G06Q 30/00* (2012.01)
(52) U.S. Cl.
USPC ........................................ 705/26.1; 705/26.61
(58) Field of Classification Search
None
See application file for complete search history.

(56) References Cited

U.S. PATENT DOCUMENTS

| 6,512,919 B2* | 1/2003 | Ogasawara ................ 455/422.1 |
| 6,624,843 B2* | 9/2003 | Lennon ........................... 348/61 |
| 7,734,729 B2* | 6/2010 | Du et al. ........................ 709/219 |
| 2002/0048403 A1 | 4/2002 | Guerreri |
| 2002/0107850 A1* | 8/2002 | Sugimoto et al. ................. 707/3 |
| 2002/0172405 A1 | 11/2002 | Schultz |
| 2003/0164819 A1 | 9/2003 | Waibel |
| 2004/0092284 A1* | 5/2004 | Satoh et al. ................ 455/550.1 |

FOREIGN PATENT DOCUMENTS

JP 2003-15980 1/2003

OTHER PUBLICATIONS

European Search Report dated Feb. 27, 2007 for corresponding European Patent Application No. 05709660 (3 pages).

* cited by examiner

*Primary Examiner* — Paul Danneman
(74) *Attorney, Agent, or Firm* — K&L Gates LLP

(57) ABSTRACT

Steps after a user finds an attractive product until he or she buys it are successively performed so that he or she can buy it stressfreely. The user photographs an attractive product with a portable camera telephone terminal 1 and transmits image data 7 to a server 3 through Internet 2. The server 3 has a DB 4 in which images such as various types of products, persons, and logo marks are registered and a DB 5 in which related information of image data registered in the DB 4 is registered. The server 3 performs an image recognizing process for the image data 7, retrieves data that match the image data 7 with a high match rate from the image data registered in the DB 4, and extracts corresponding related information from the DB 5. The related information is provided to the user through the Internet 2. By only transmitting the image data 7, the user can obtain related information of an attractive product. When the user accesses a site 6 for the product corresponding to the related information, he or she can obtain detailed information and buy the product.

26 Claims, 54 Drawing Sheets

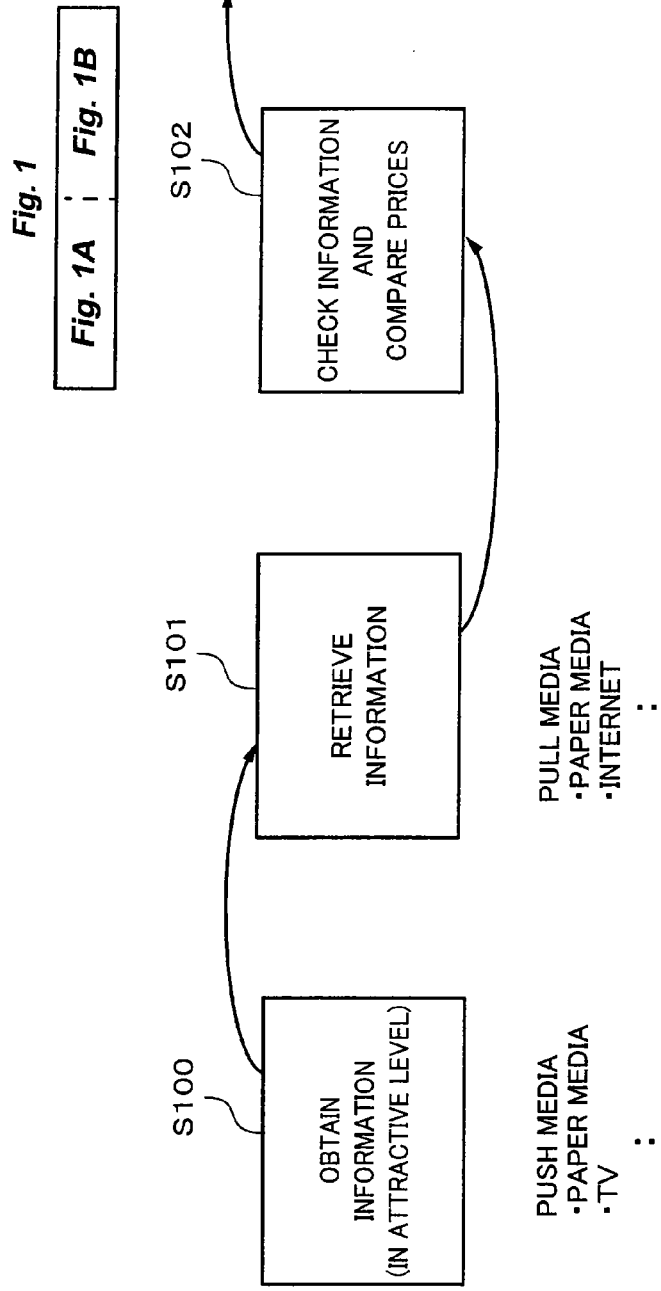

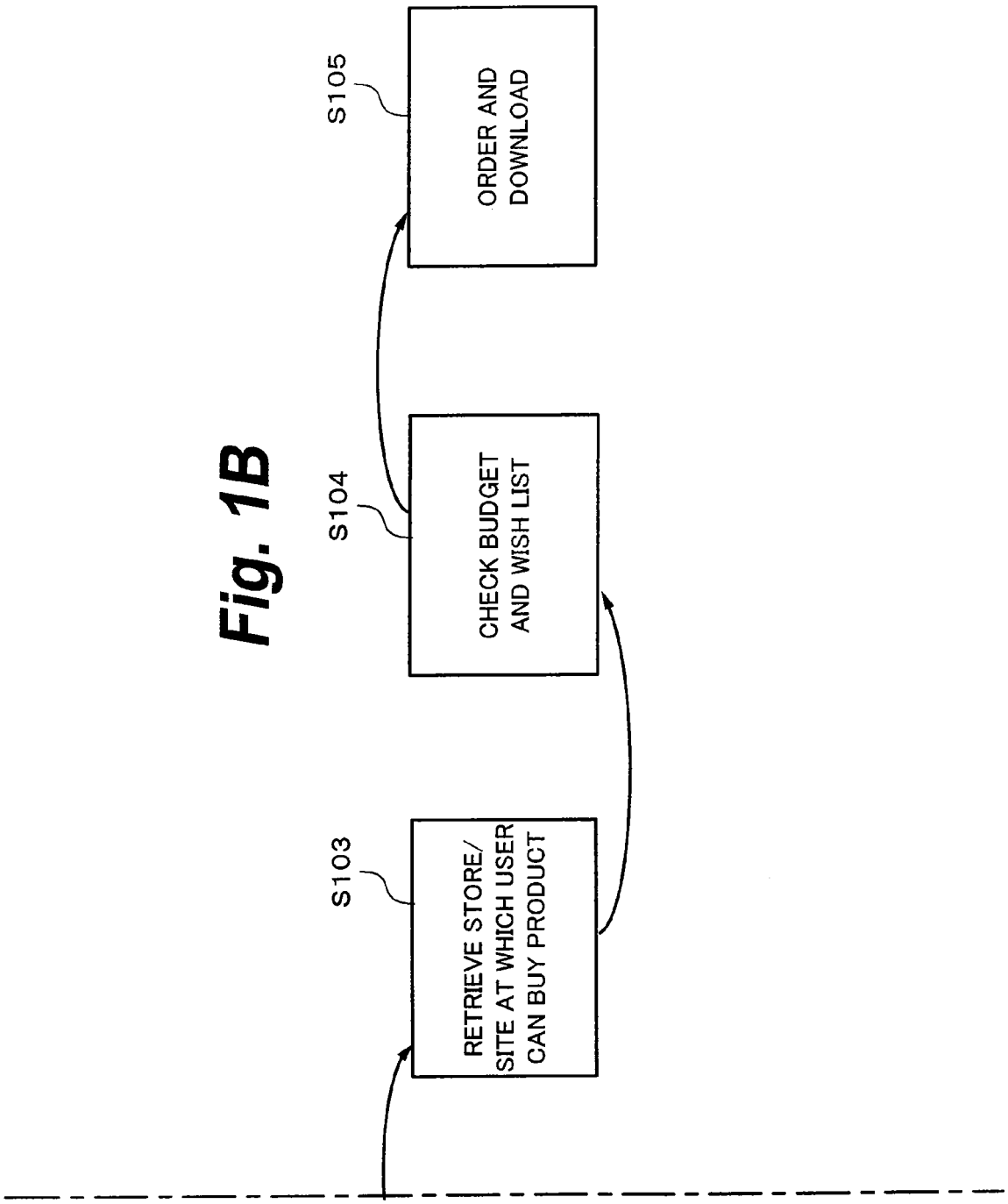

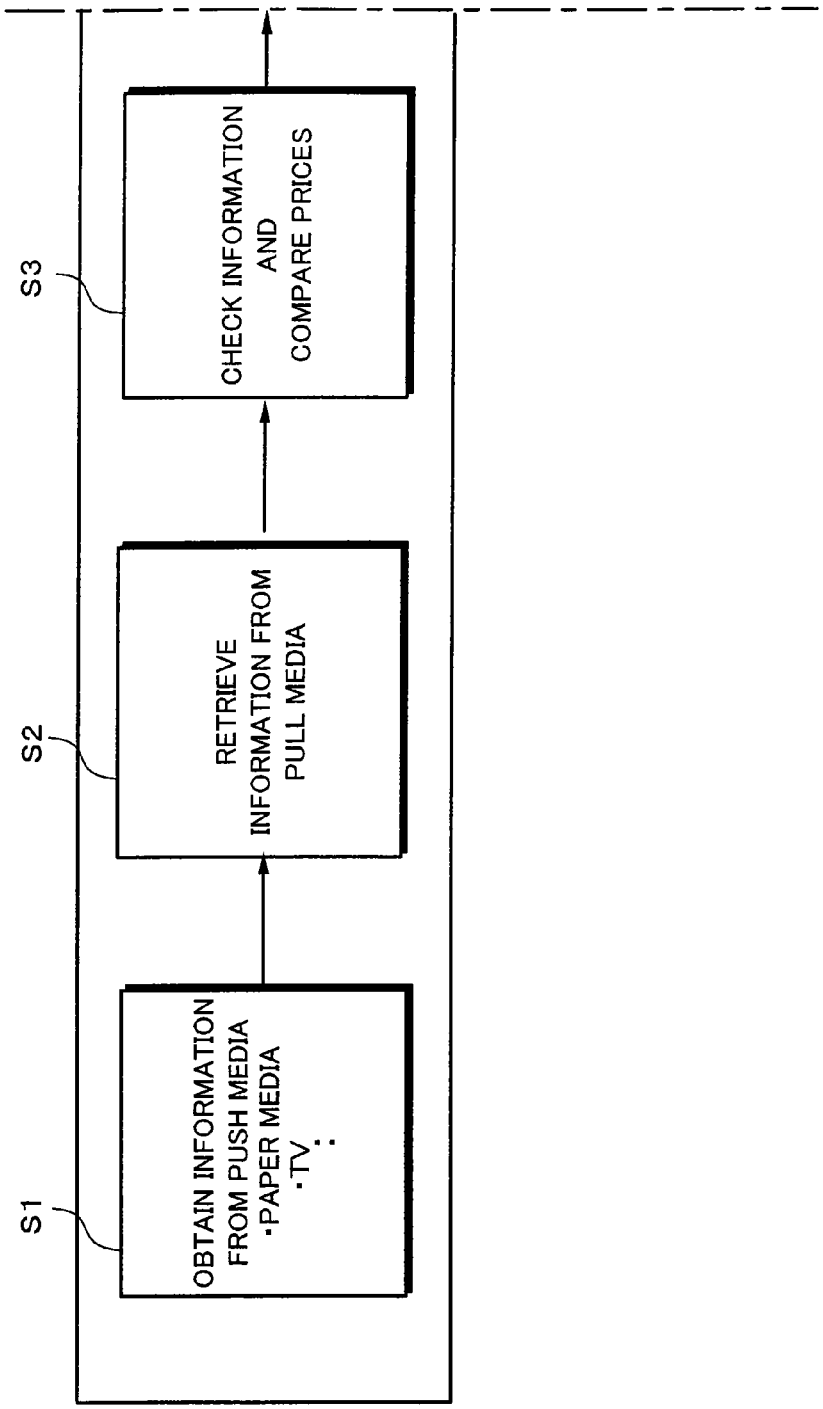

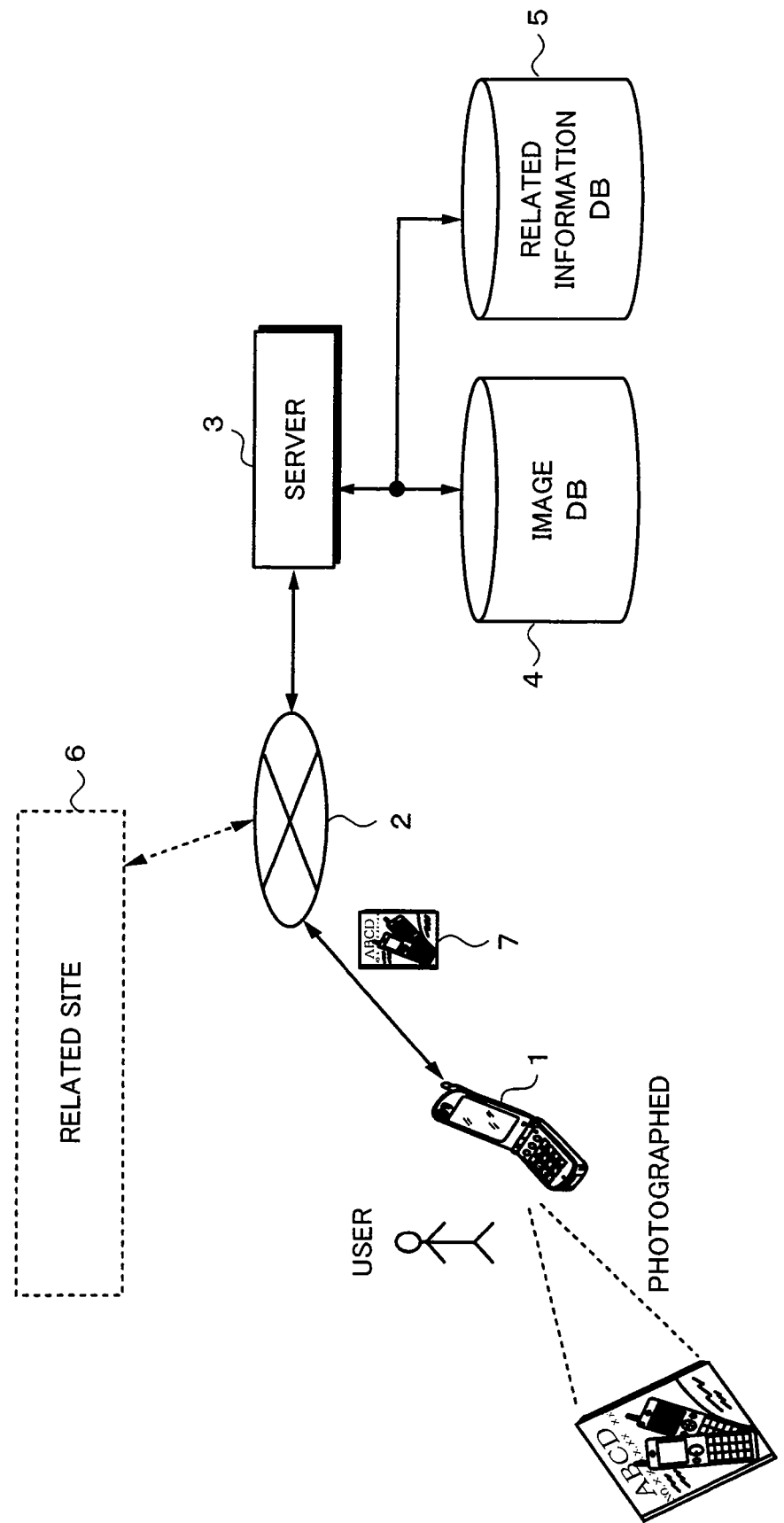

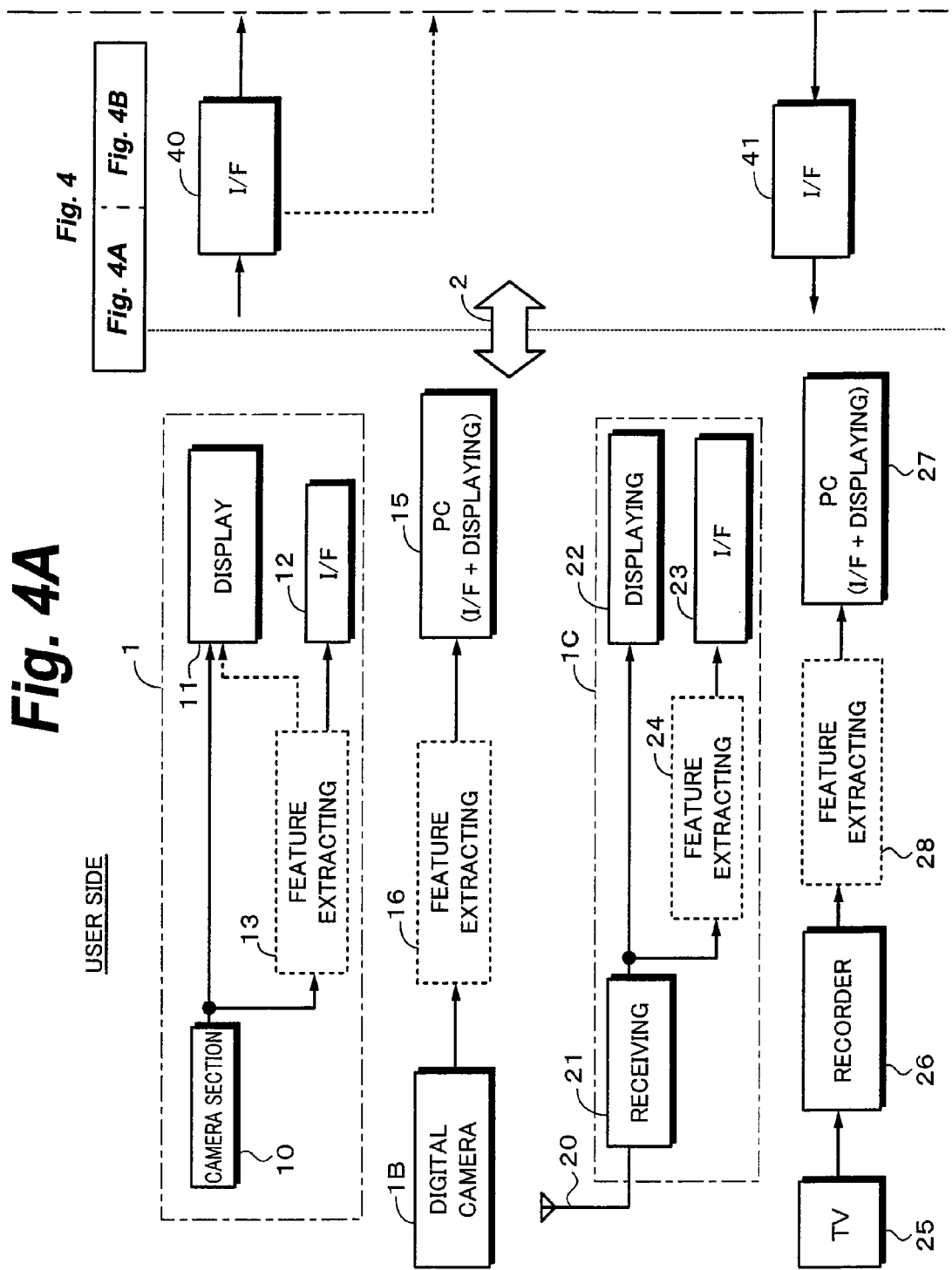

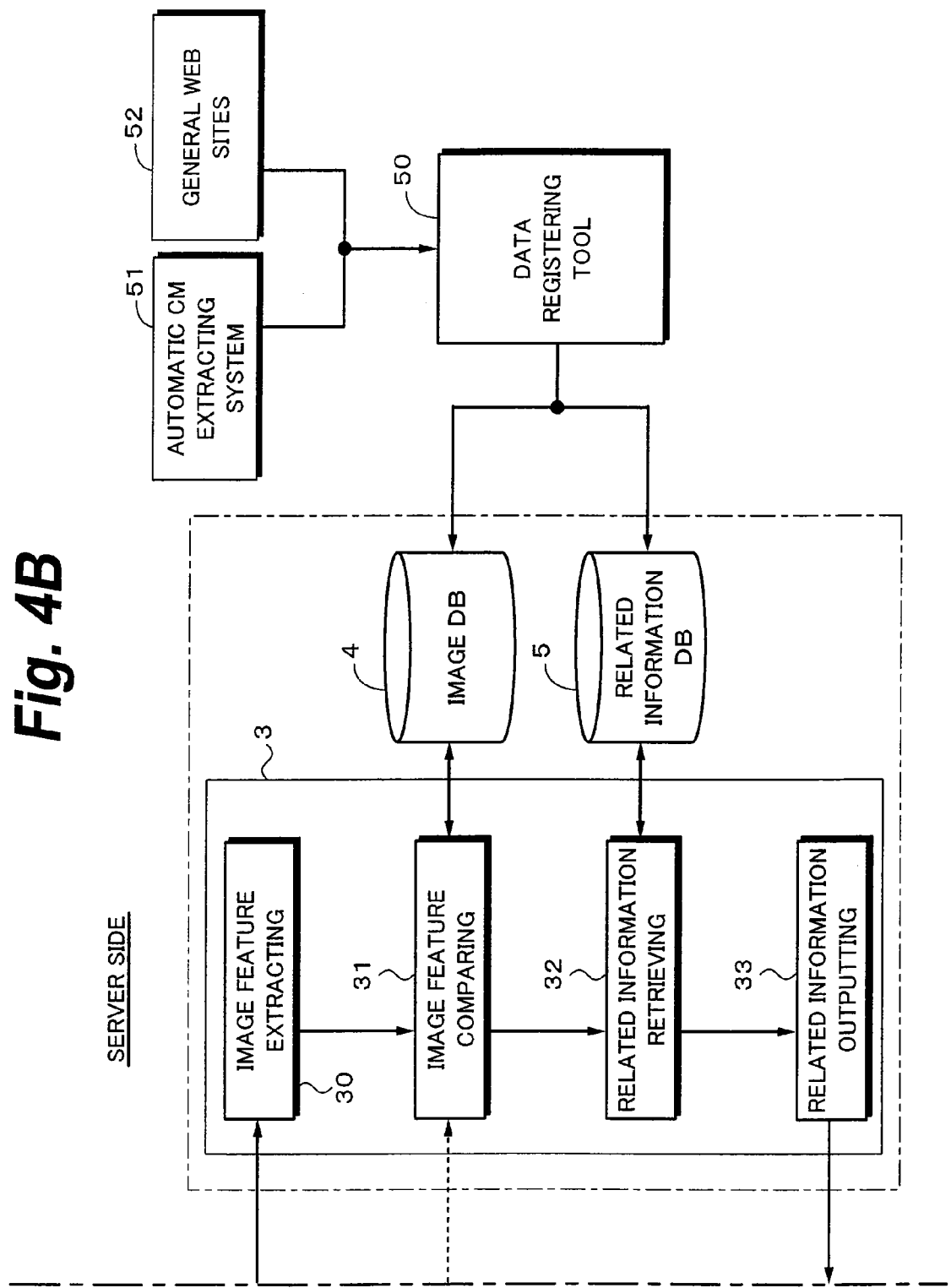

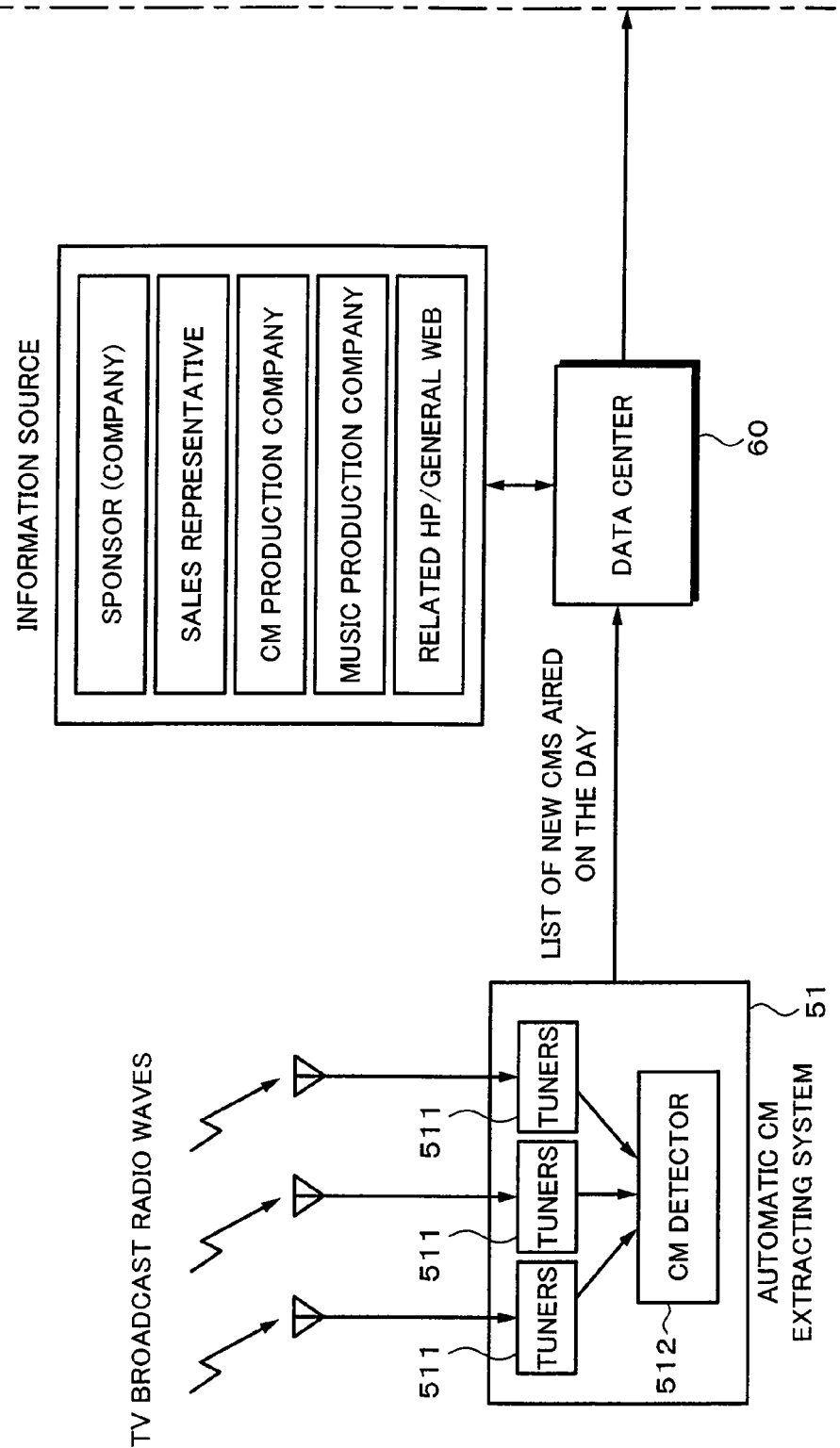

Fig. 5B

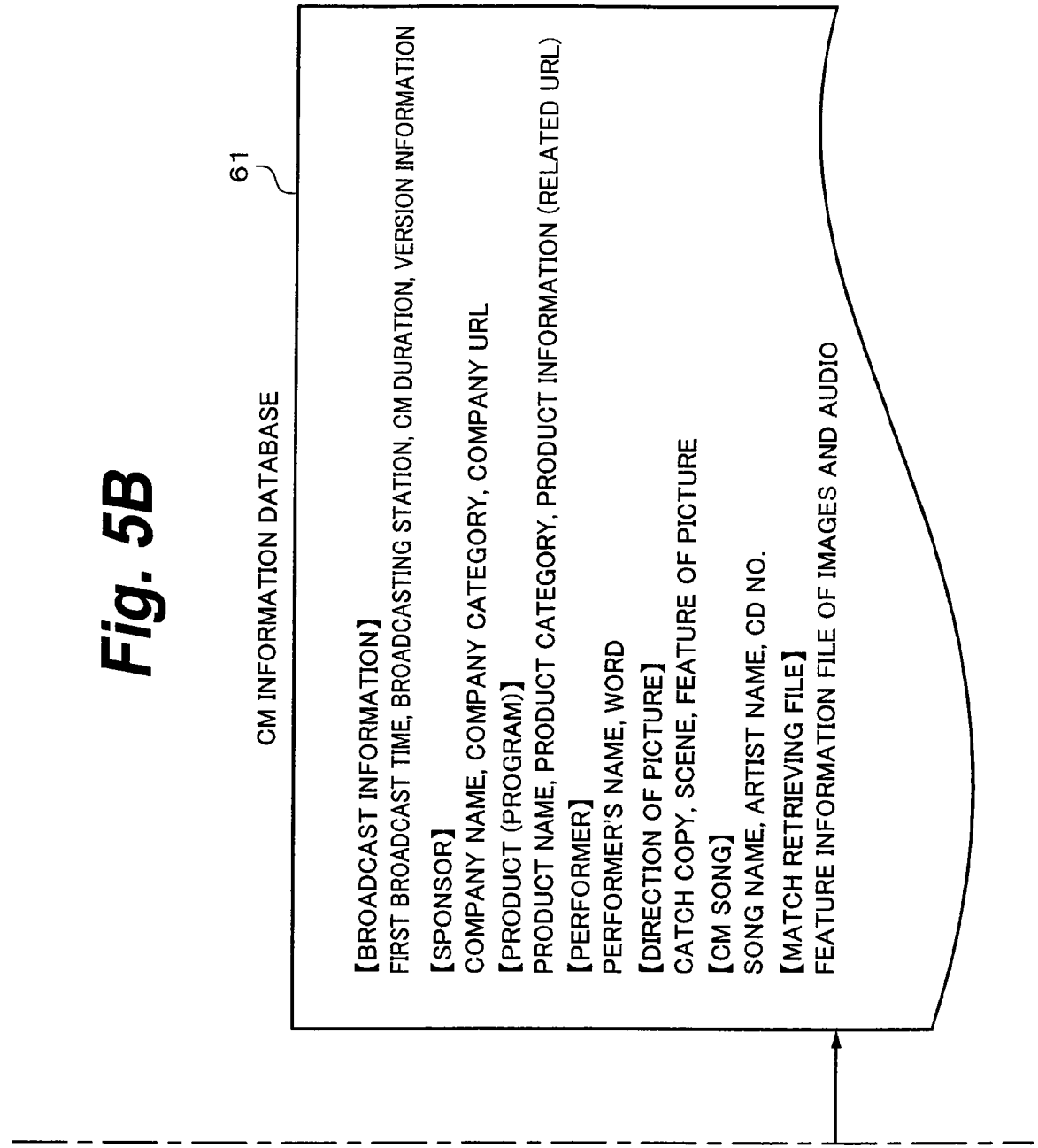

CM INFORMATION DATABASE — 61

[BROADCAST INFORMATION]
FIRST BROADCAST TIME, BROADCASTING STATION, CM DURATION, VERSION INFORMATION

[SPONSOR]
COMPANY NAME, COMPANY CATEGORY, COMPANY URL

[PRODUCT (PROGRAM)]
PRODUCT NAME, PRODUCT CATEGORY, PRODUCT INFORMATION (RELATED URL)

[PERFORMER]
PERFORMER'S NAME, WORD

[DIRECTION OF PICTURE]
CATCH COPY, SCENE, FEATURE OF PICTURE

[CM SONG]
SONG NAME, ARTIST NAME, CD NO.

[MATCH RETRIEVING FILE]
FEATURE INFORMATION FILE OF IMAGES AND AUDIO

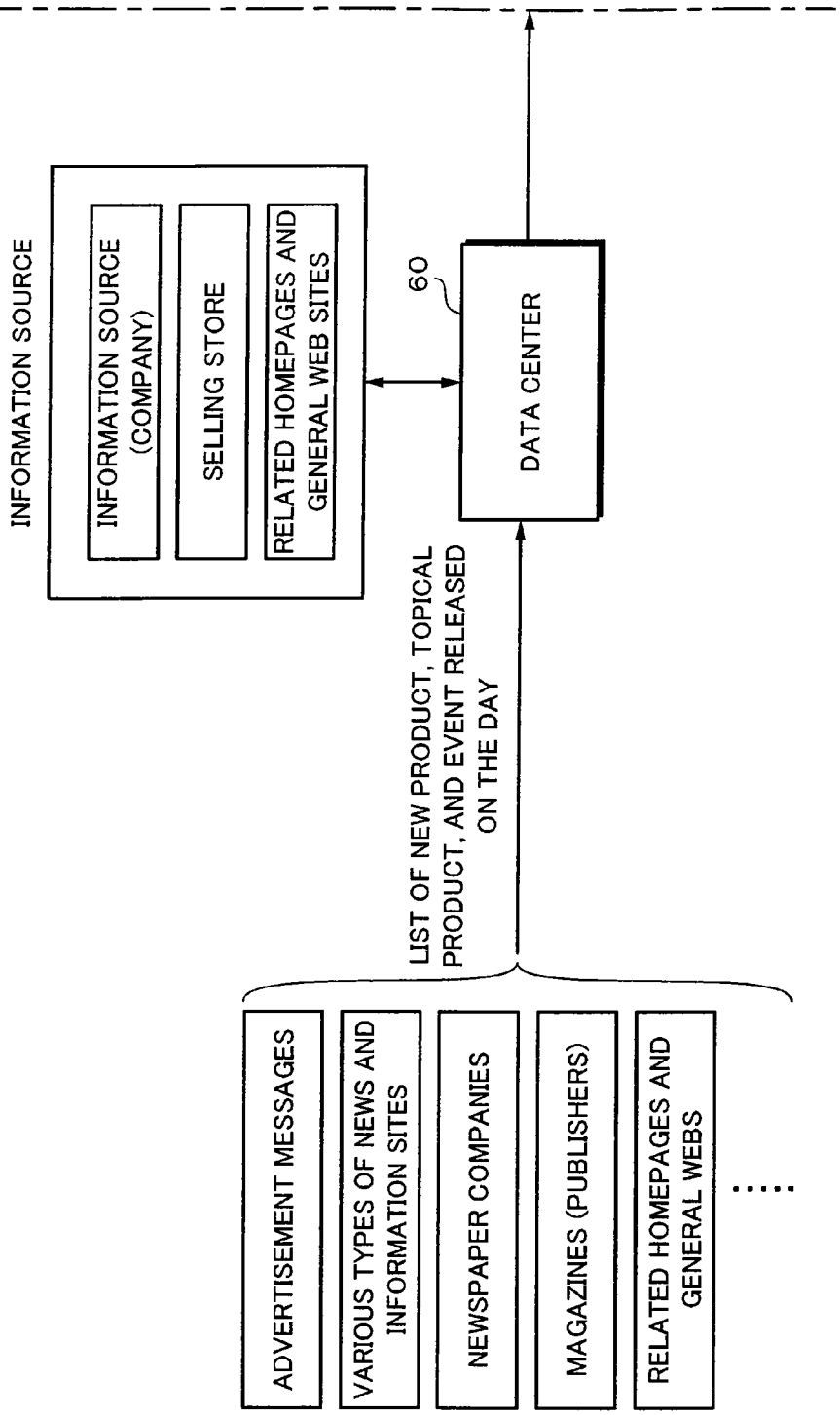

Fig. 9A
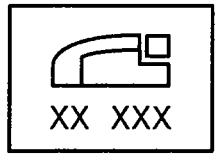 
LOGO: XXXYYY
CHARACTERS: XXXYYY
X X X X X X X X
SHAPE: UNKNOWN
Fig. 9B
 
LOGO: ZZZ
CHARACTERS: NONE
SHAPE: SHOES
Fig. 9C
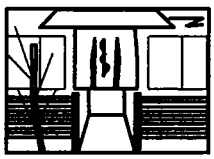 
LOGO: ○○'S STORE
CHARACTERS: NONE
SHAPE: BUILDING
Fig. 9D
 
LOGO: NONE
CHARACTERS: NONE
SHAPE: FACE
PERSON: △△△△

LOGO: PS2
CHARACTERS: HARDWARE
"PlayStation BB Unit" EQUIPPED
"PlayStation 2 BB Pack"
(Midnight Blue)
NOW ON SALE, RETAIL PRICE ¥35,000
SHAPE: GAME MACHINE MADE BY ○○ COMPANY

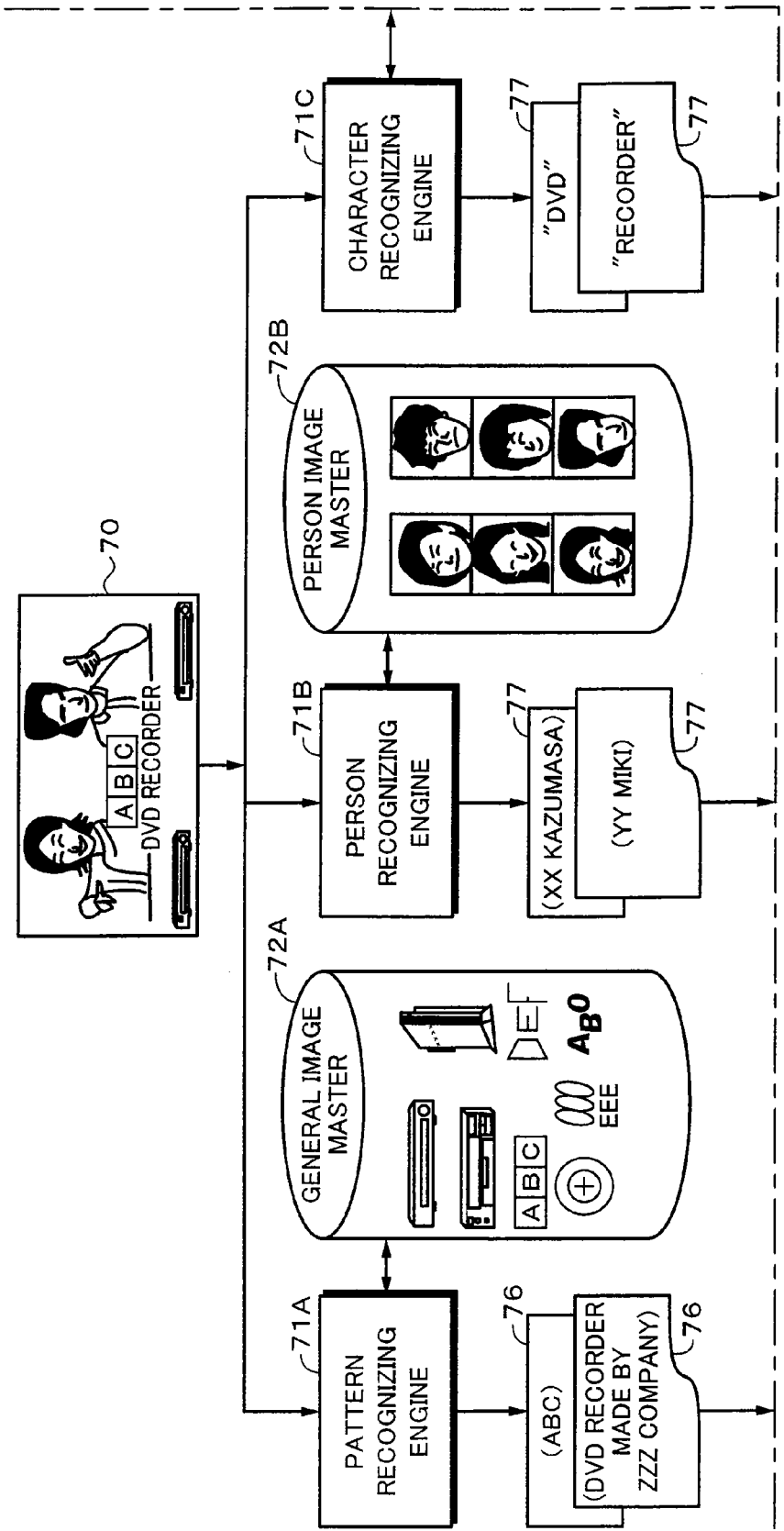

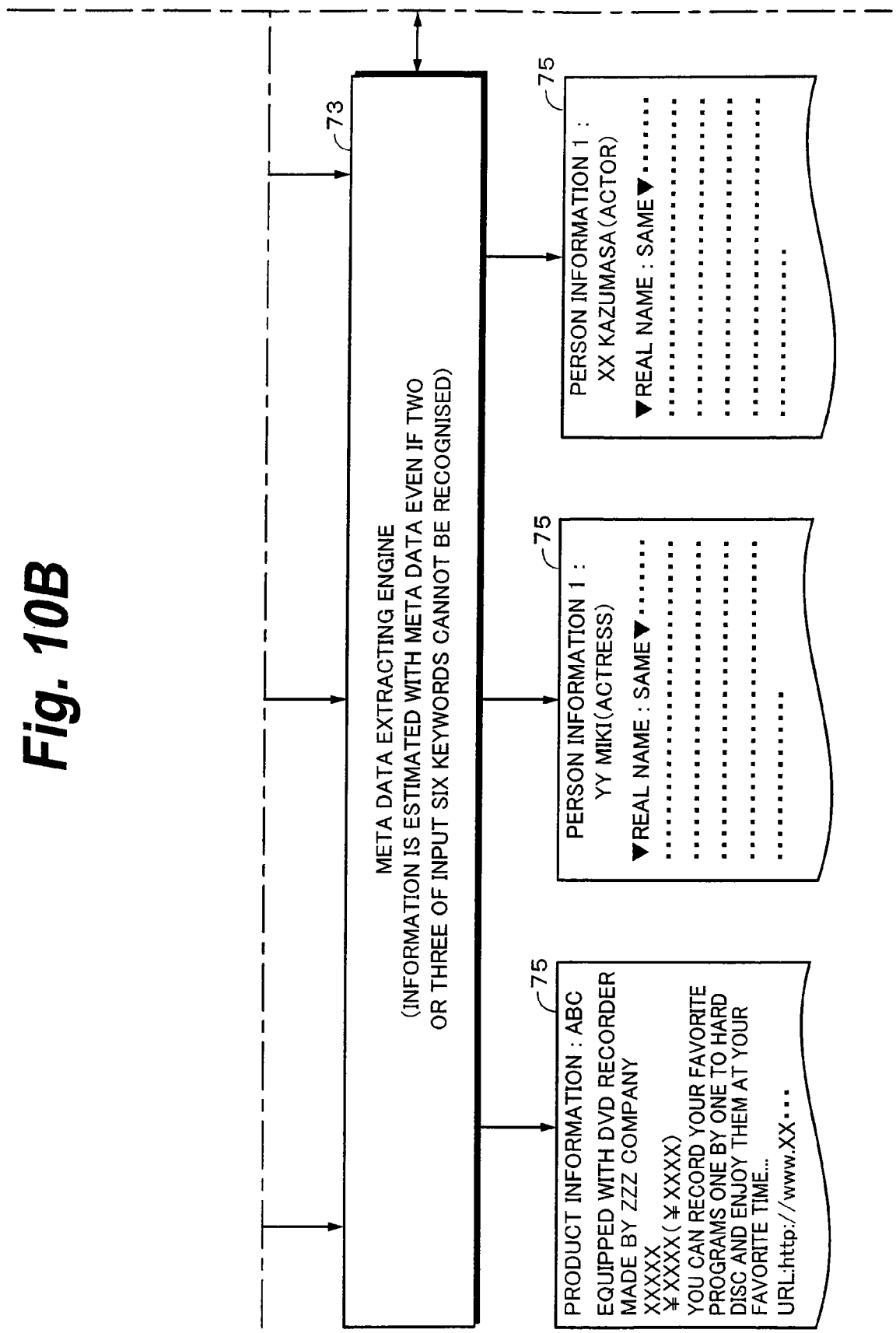

| Fig.11A | Fig. 11B |

- INFORMATION ABOUT TASTE
- INFORMATION ABOUT RETAILERS AND PRICES
- WINE ORDER

- RESTAURANT NAME
- MENU INFORMATION
- BUSINESS HOURS
- PHOTOS INSIDE RESTAURANT
- TELEPHONE NUMBER (FOR RESERVATION)

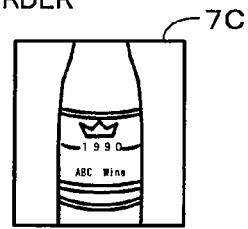
7C

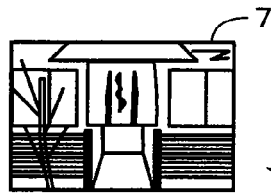
7B

- WINE, DRINK
- VARIOUS TYPES OF LABELS

- RESTAURANT (BUILDING)
- SIGNBOARD

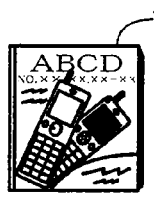
7A

- PHOTO OR ARTICLE OF MAGAZINE
- ARTICLE OF NEWSPAPER

- FLASH NEWS ABOUT ARTICLE
- INFORMATION ABOUT PRODUCT
- MAIL ORDER OF PRODUCT
- INFORMATION ABOUT RESORTS
- INFORMATION ABOUT TICKET ORDER

Fig. 11B
- TEAM INFORMATION
- GAME INFORMATION
- ATHLETE INFORMATION (IDOL)
- CHARACTER GOODS ORDER
- STORY
- PERFORMERS, DIRECTOR
- INFORMATION ABOUT THEATERS AND SHOW TIMES
- TICKET ORDER
- CD/DVD ORDER
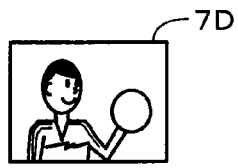
7D
- ATHLETE
- IDOL
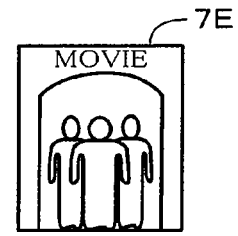
7E
- DVD, CD JACKET
- POSTER
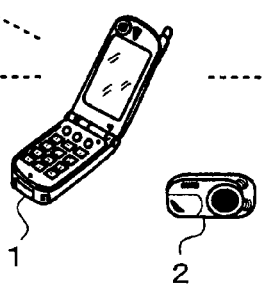
1   2
- ONE CUT OF CM
- POSTER, OUTDOOR ADVERTISEMENT
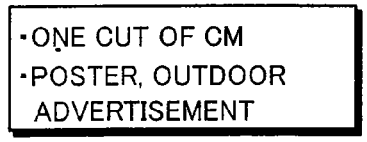
7F
- INFORMATION ABOUT PRODUCT
- PERFORMERS
- CM SONG INFORMATION
- PRODUCT ORDER

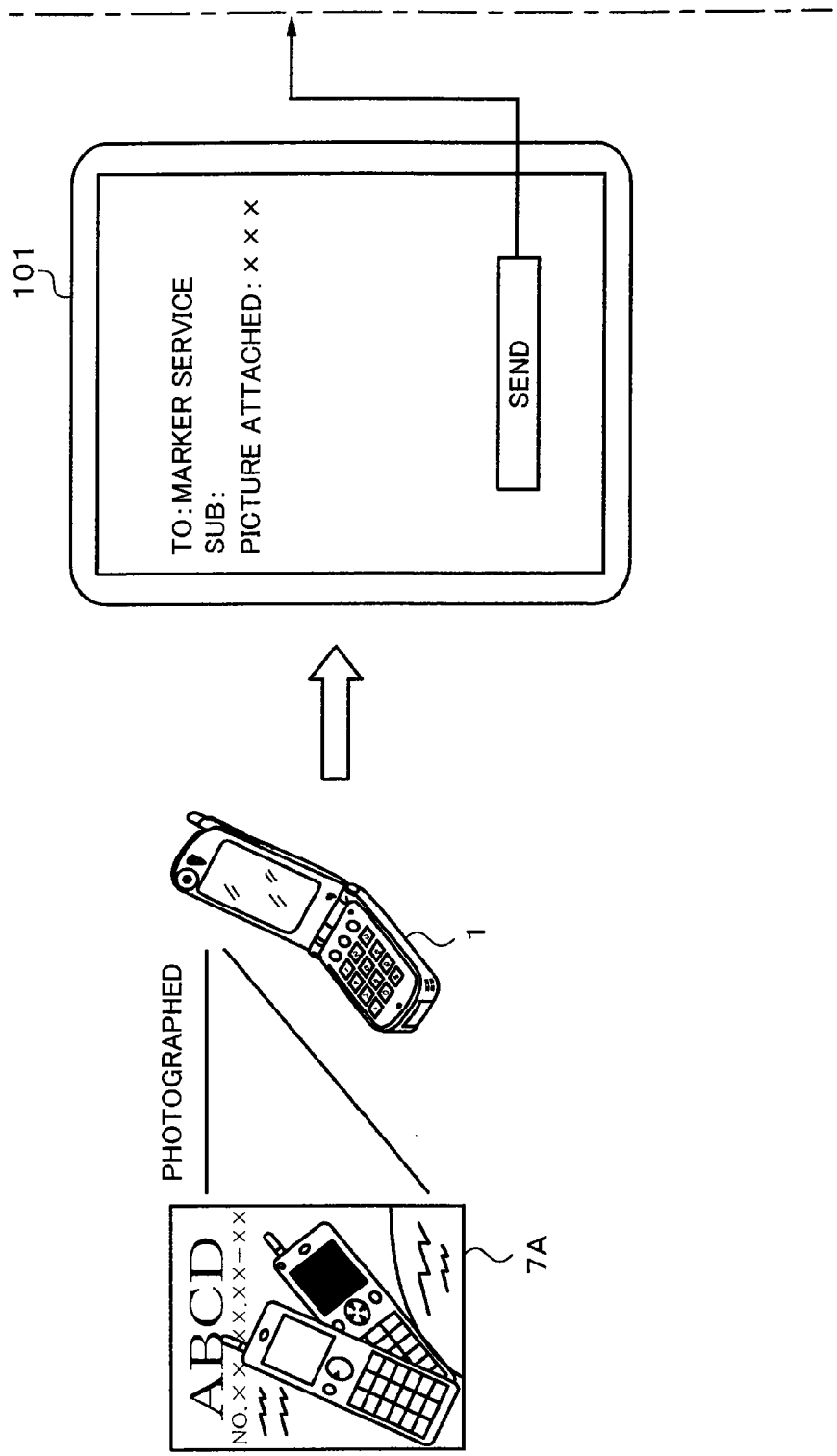

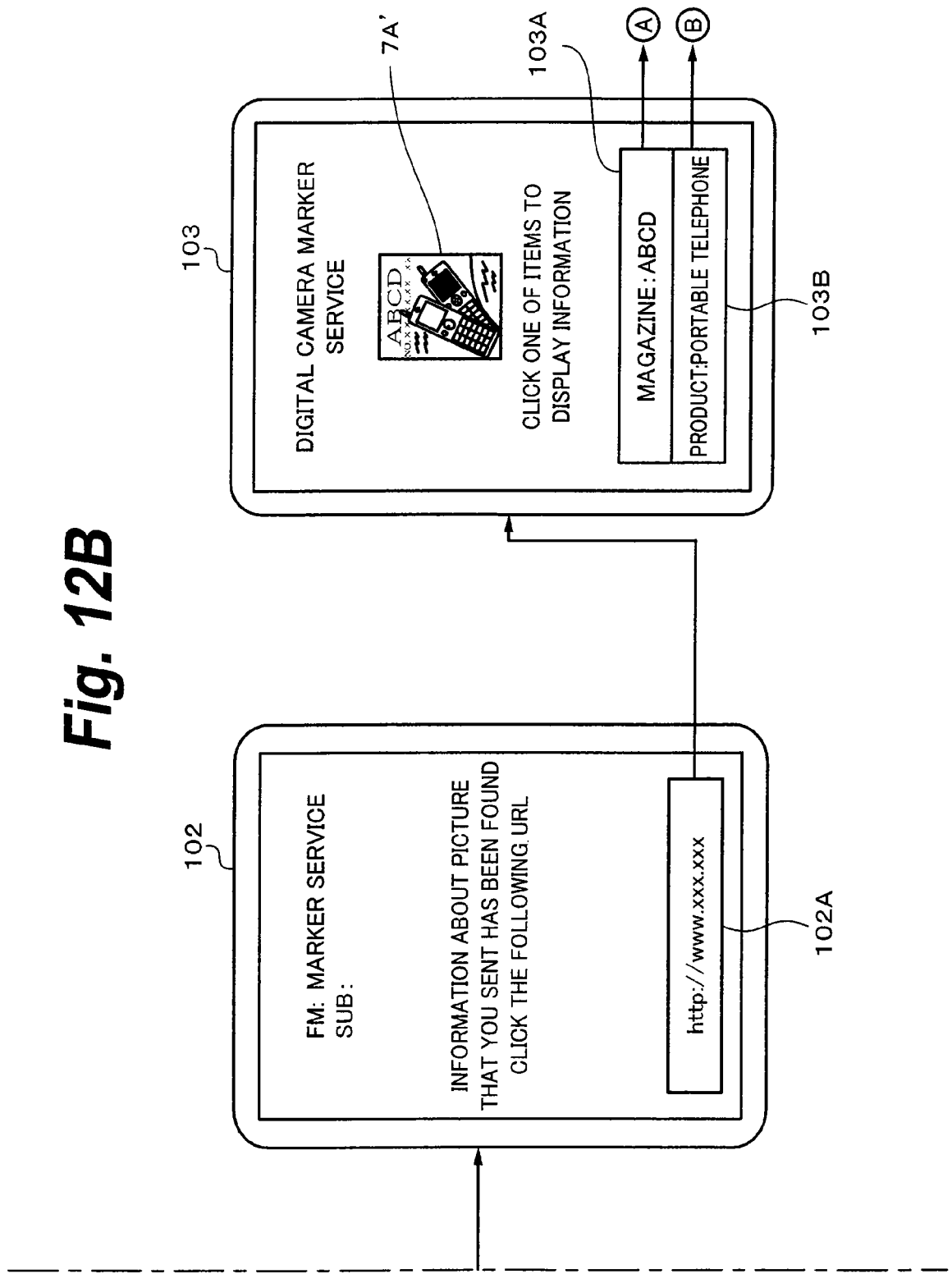

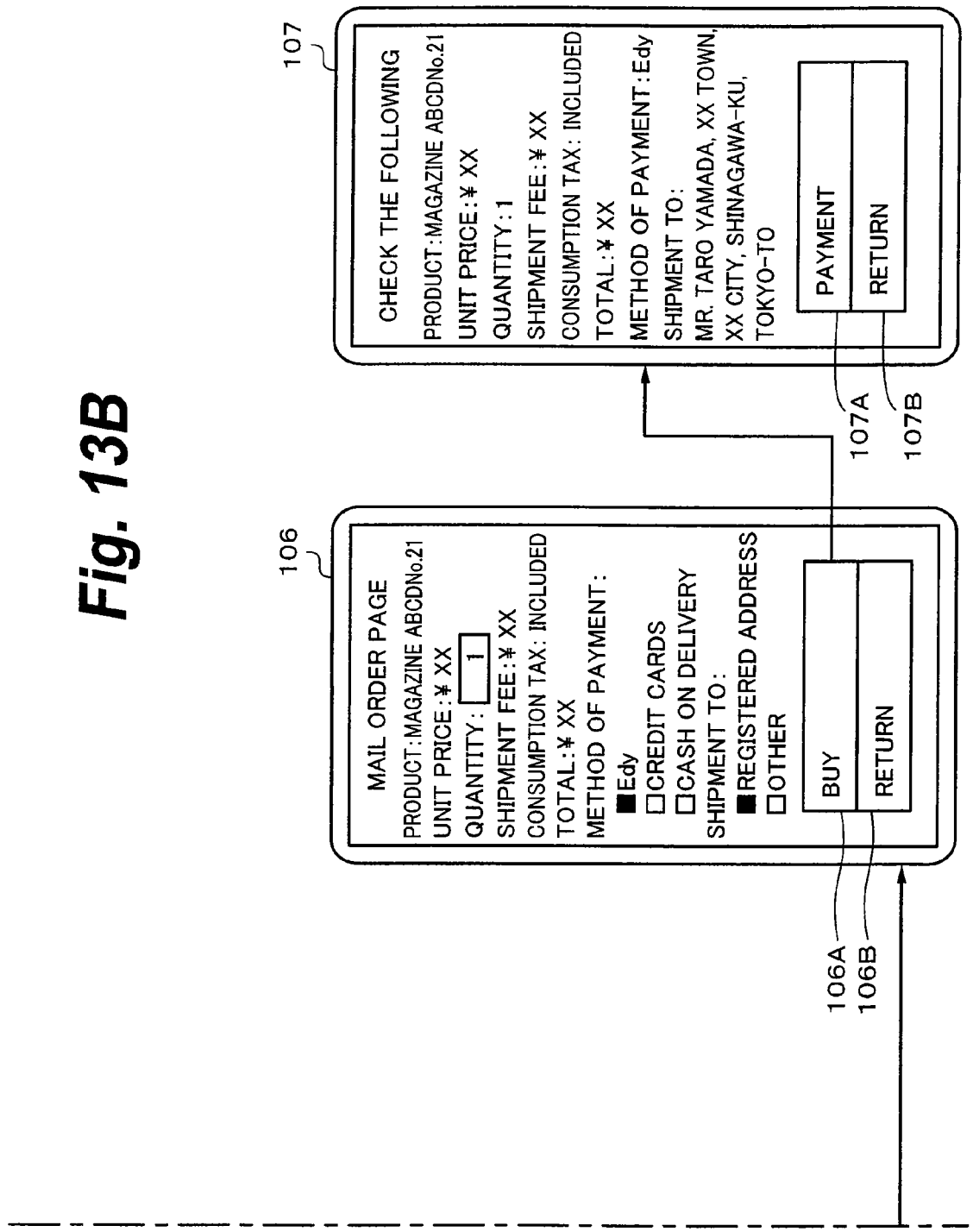

Fig. 15A
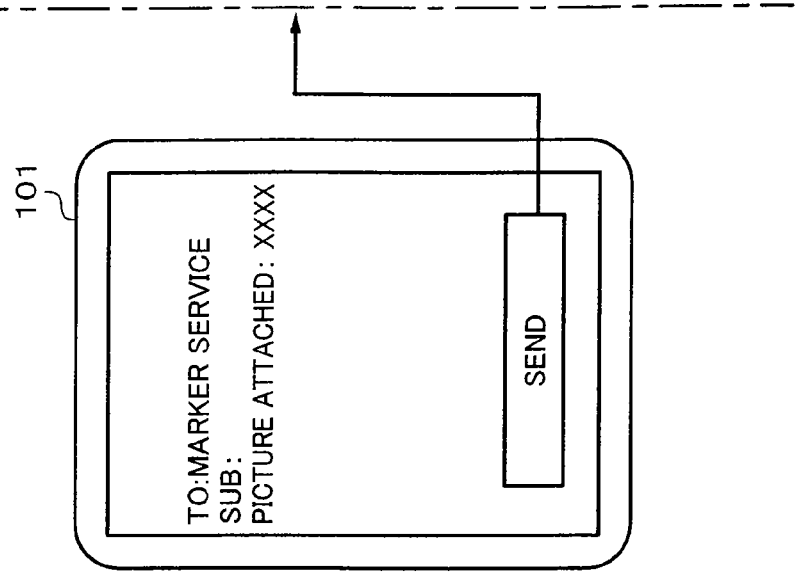
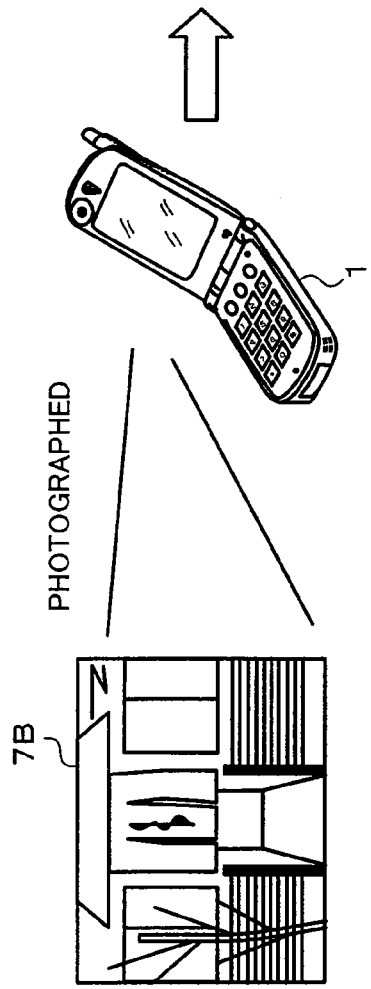
| Fig. 15 |
|---|
| Fig. 15A : Fig. 15B |

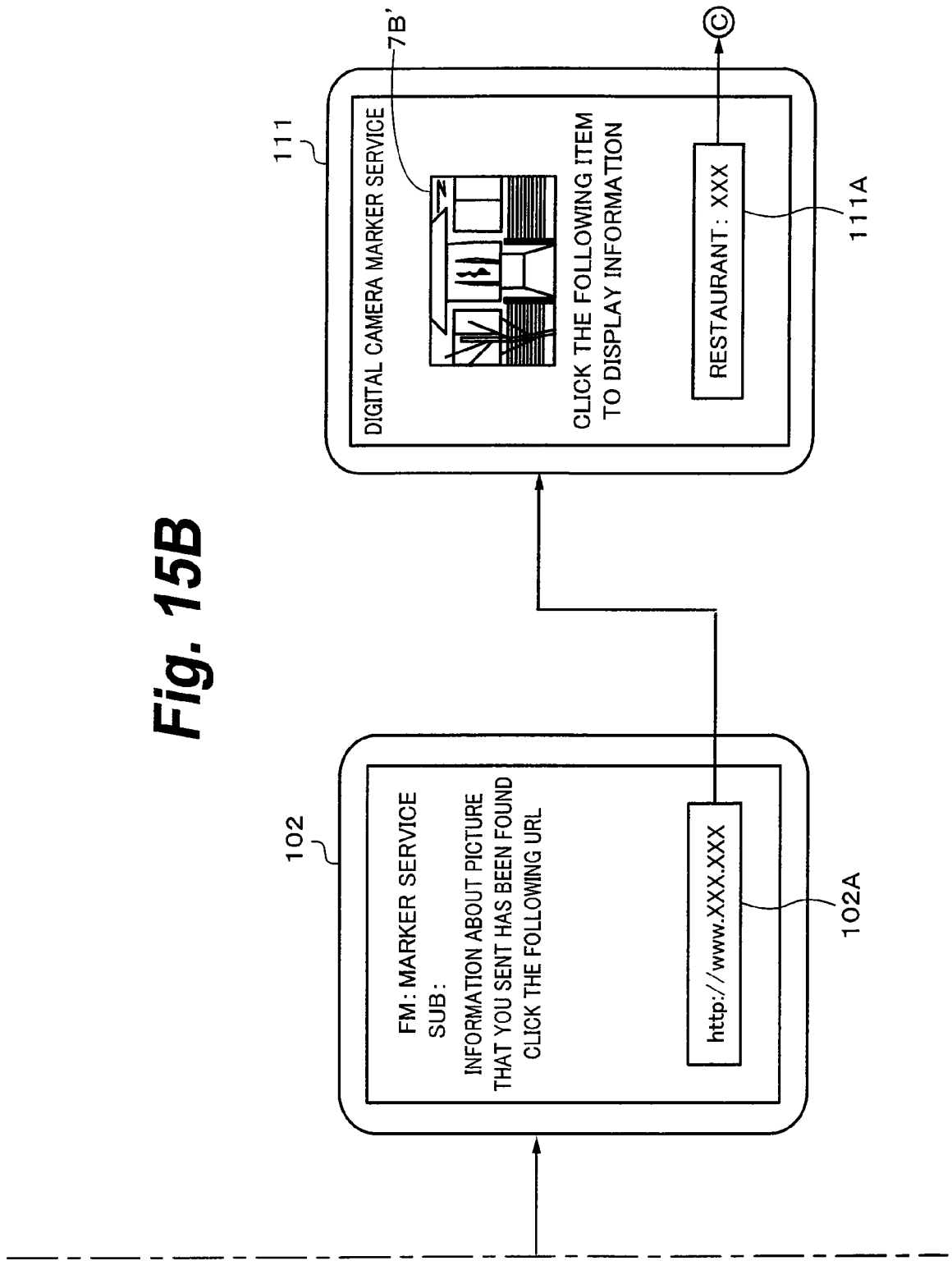

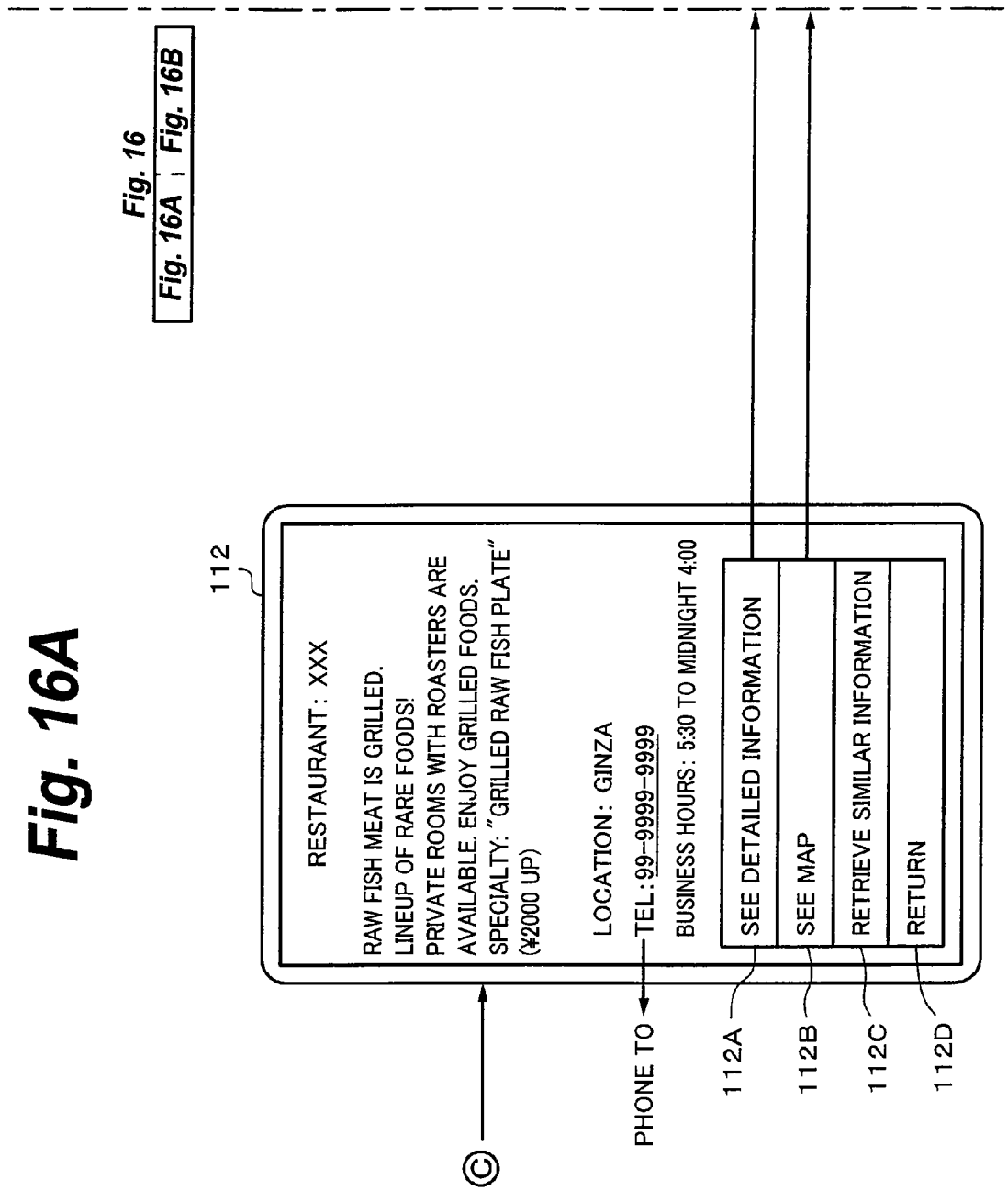

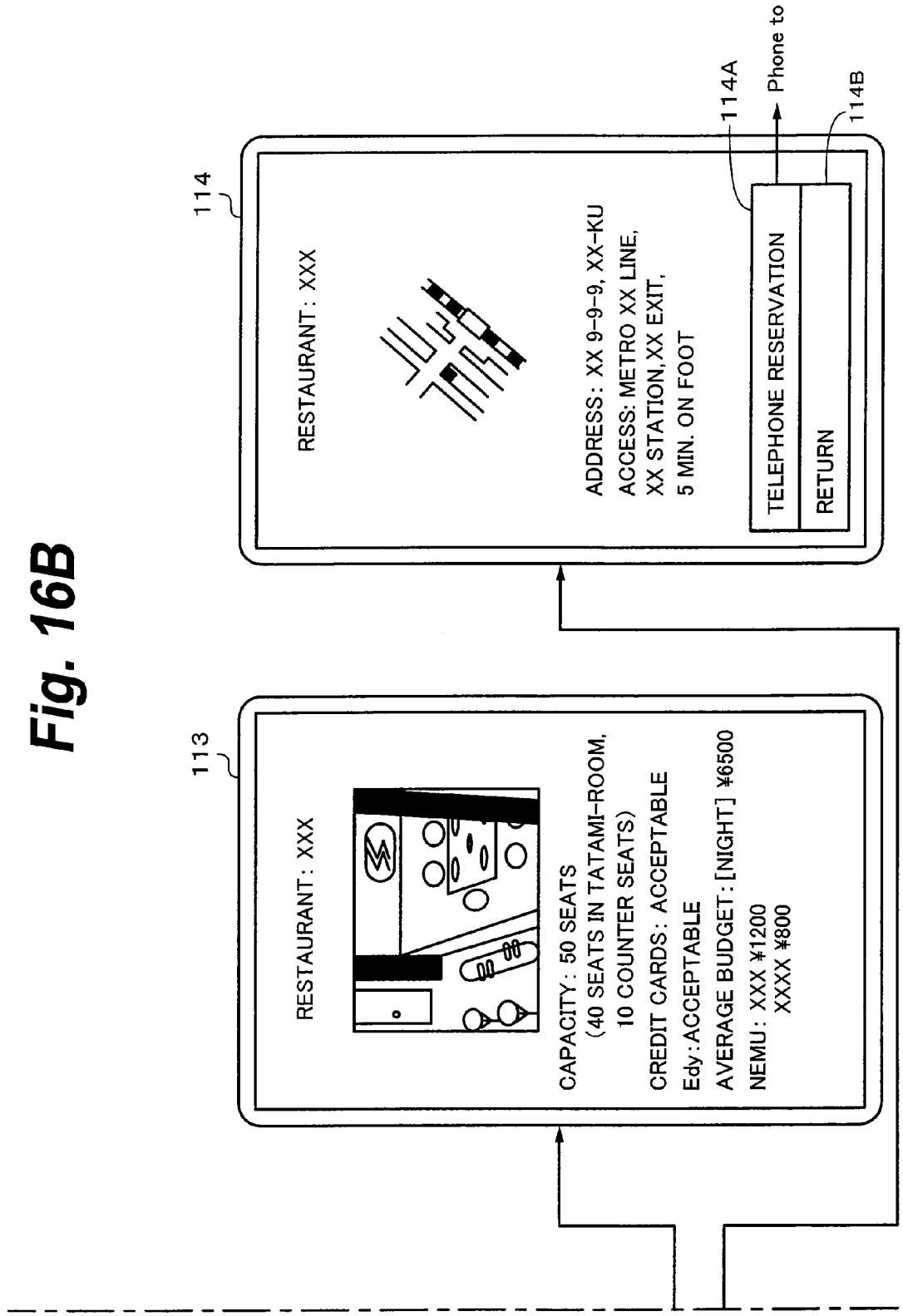

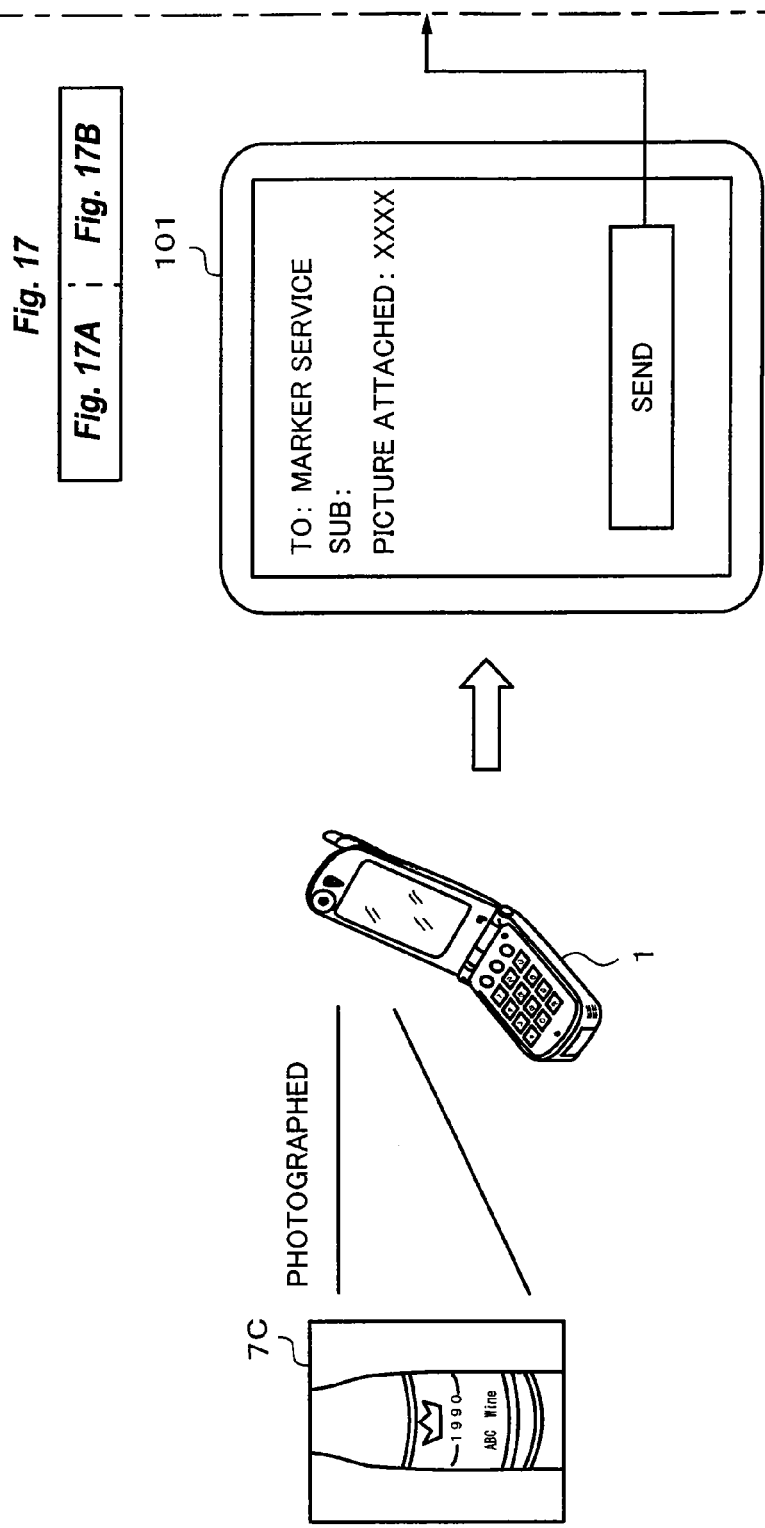

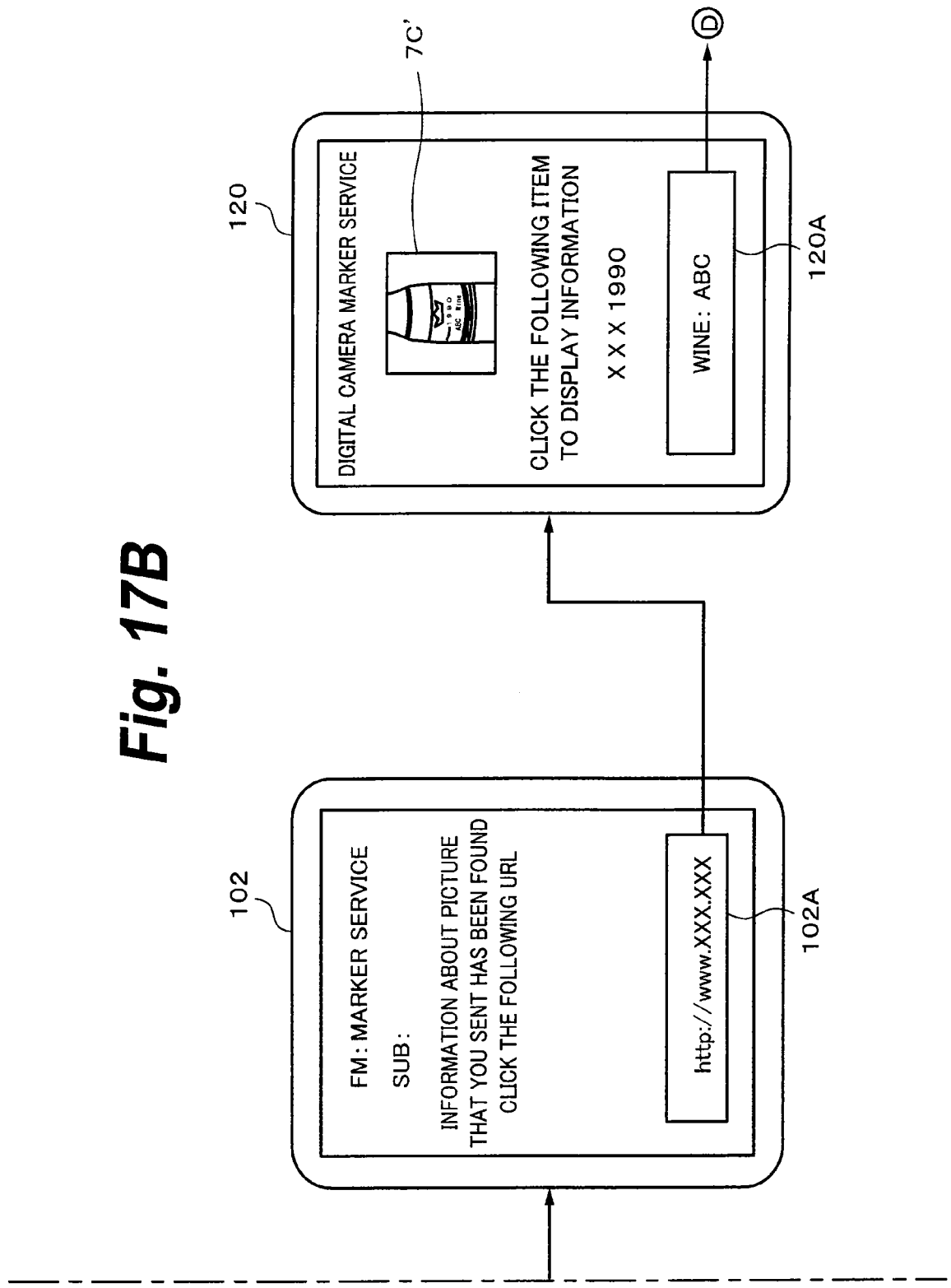

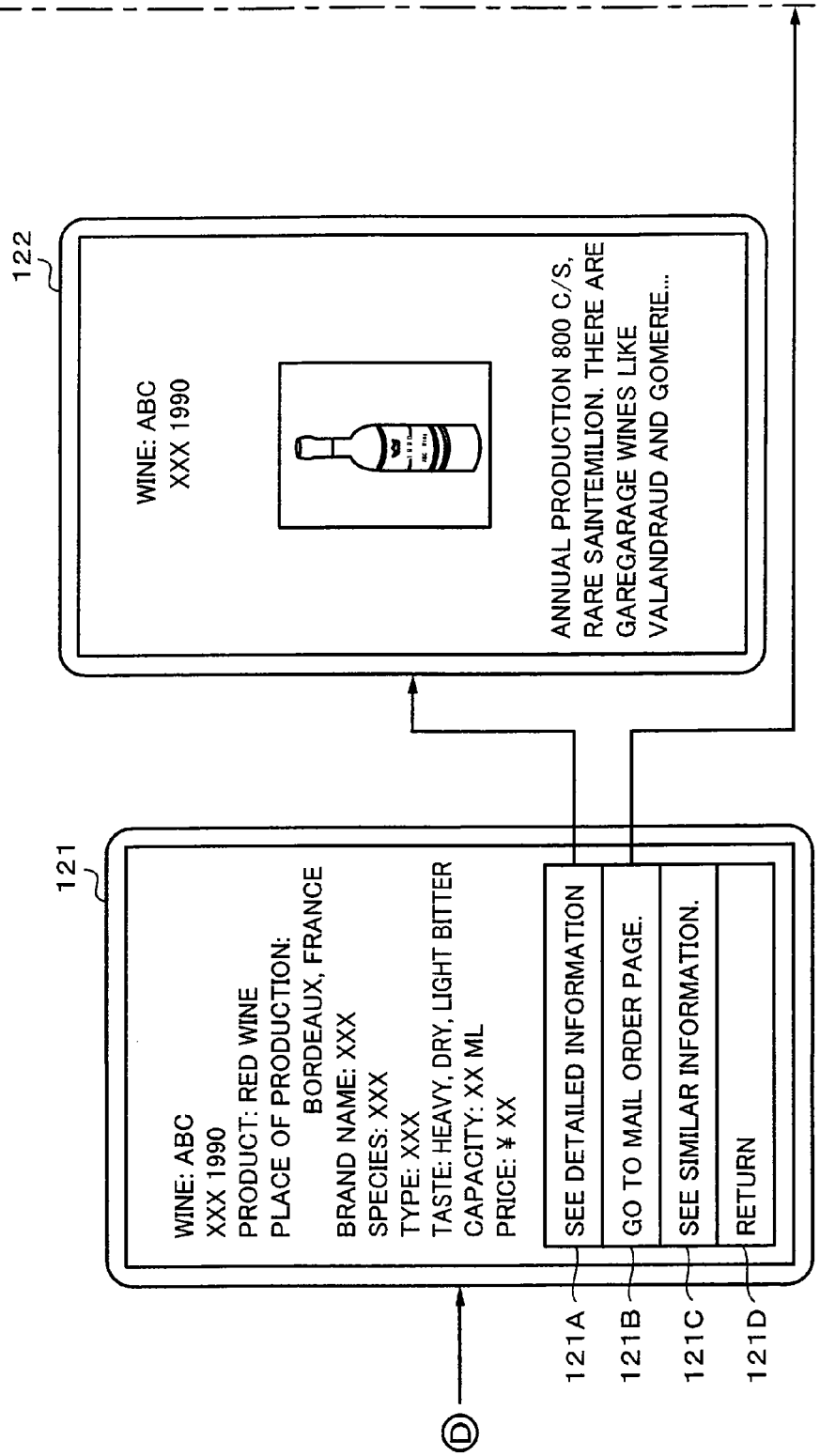

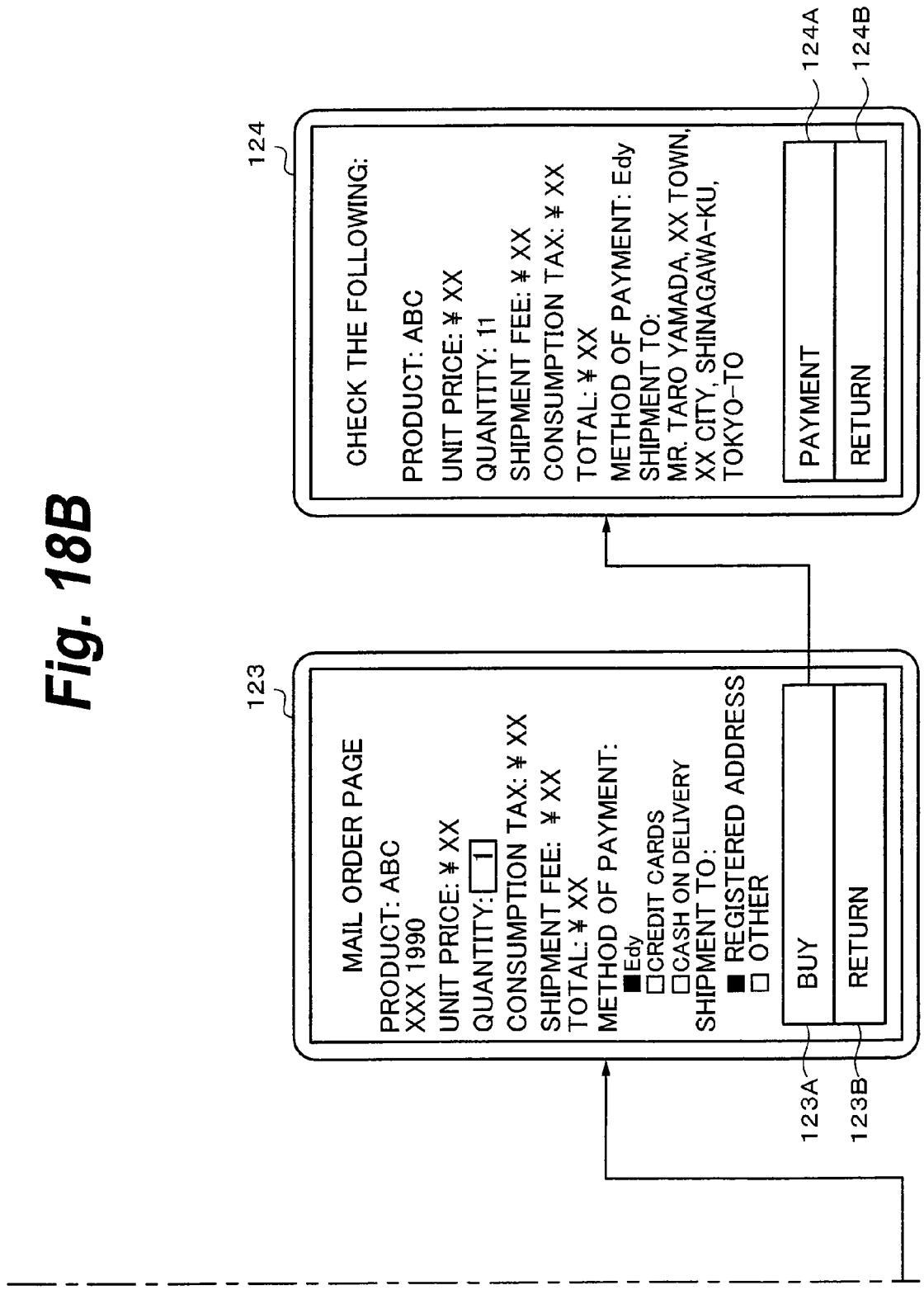

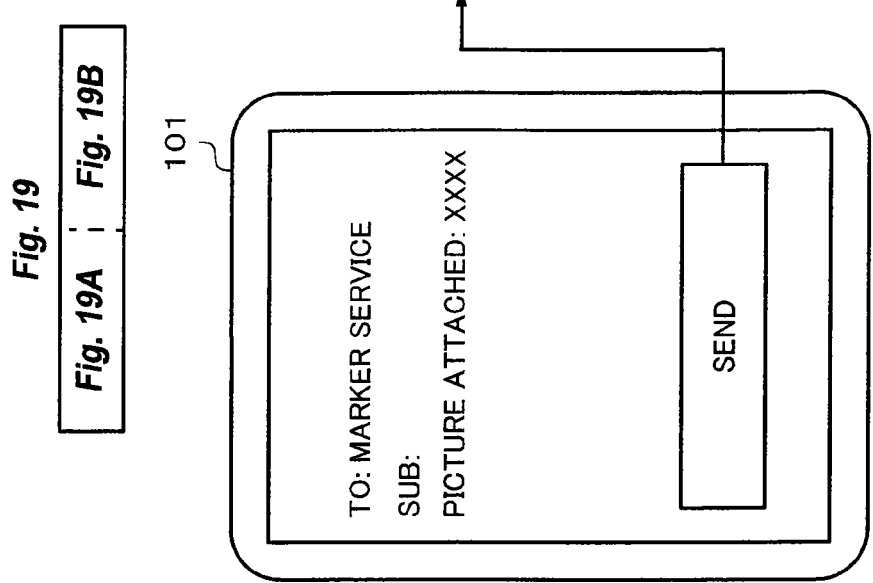
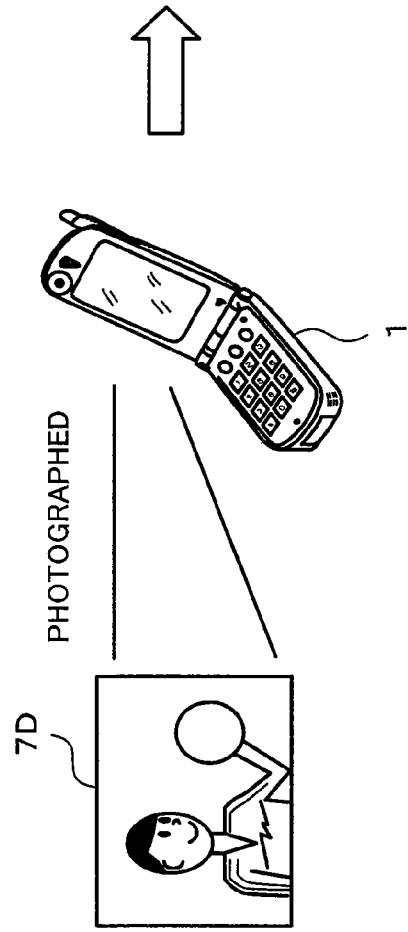
*Fig. 19A*
| *Fig. 19* | |
|---|---|
| *Fig. 19A* | *Fig. 19B* |

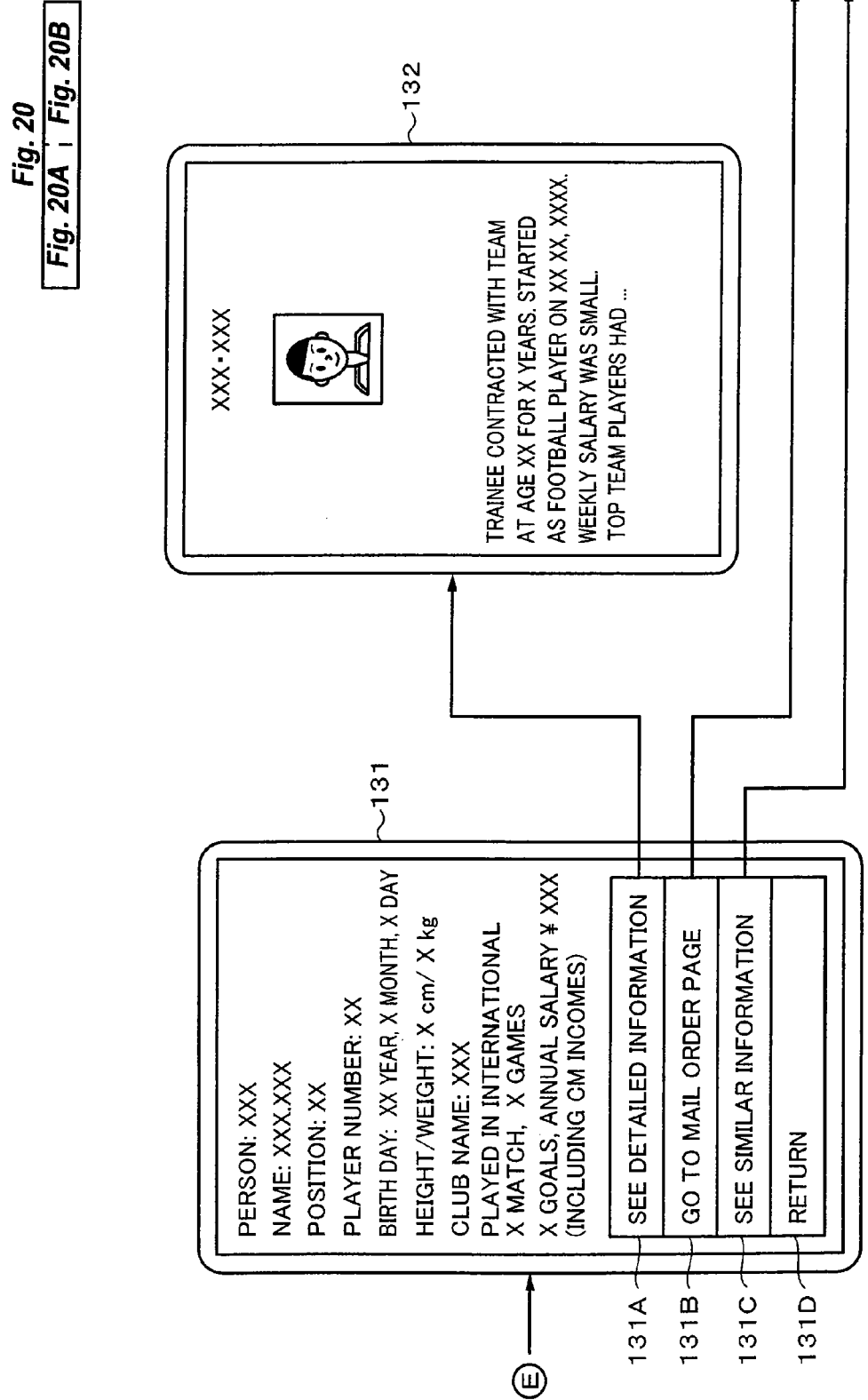

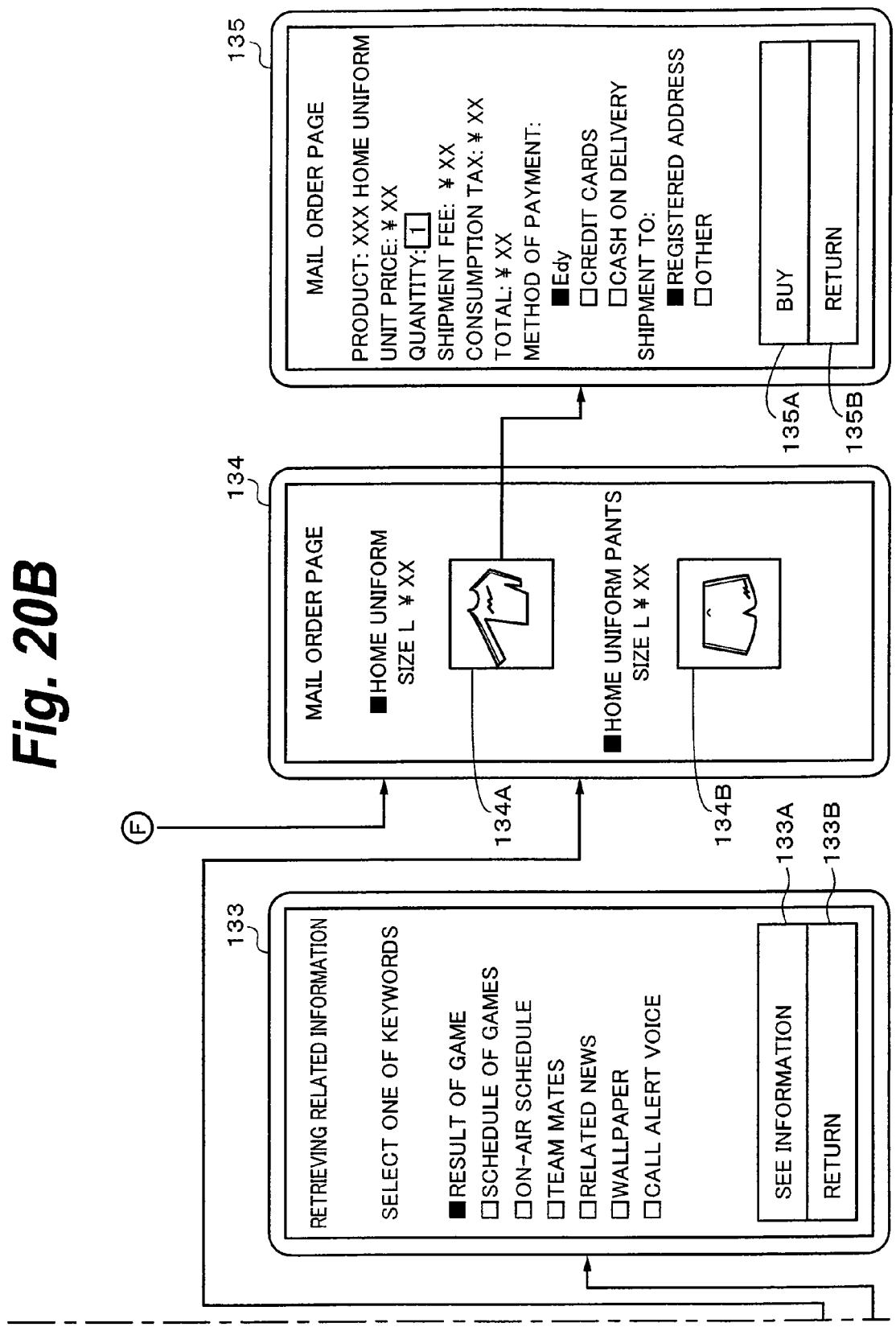

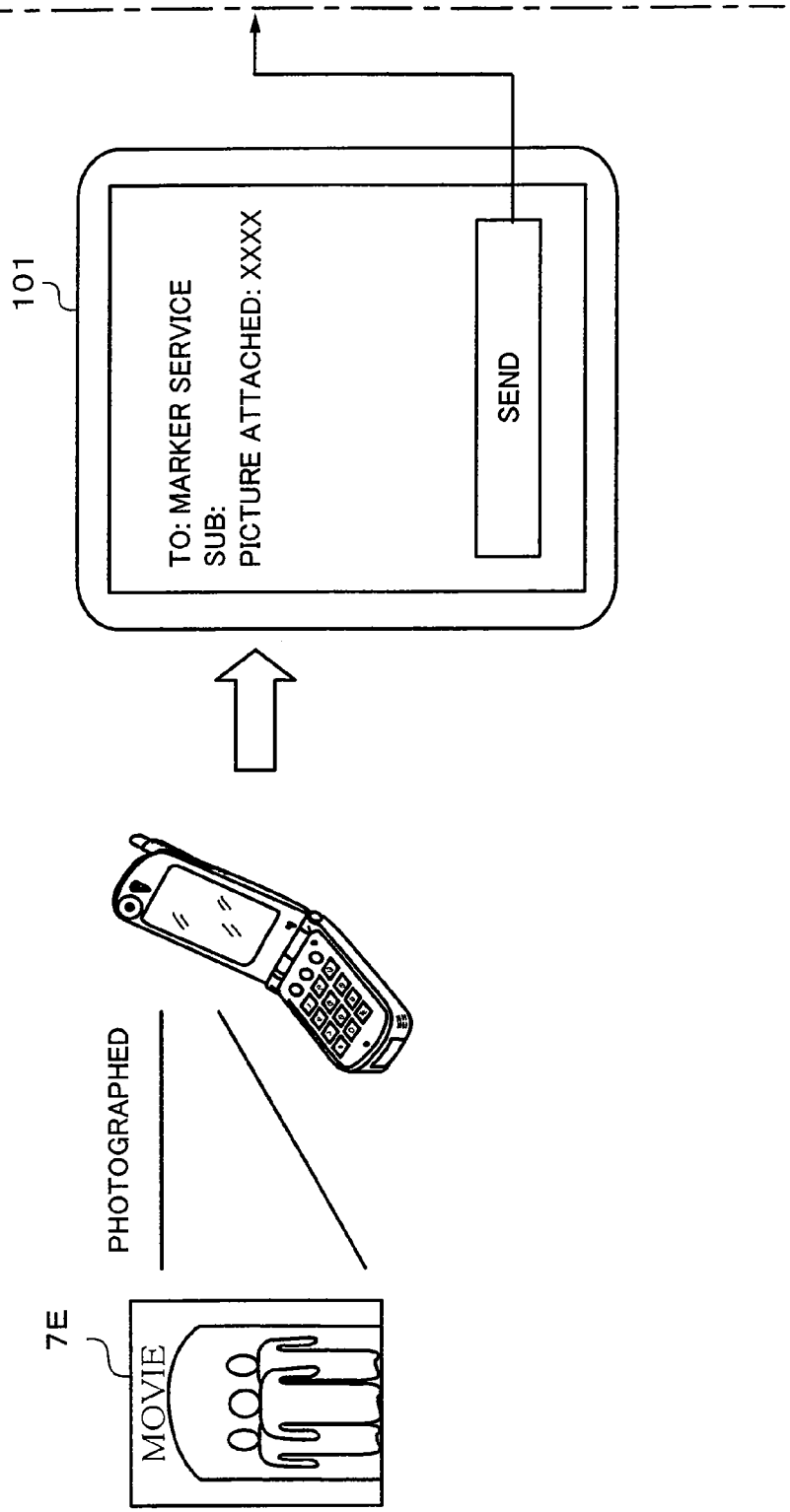

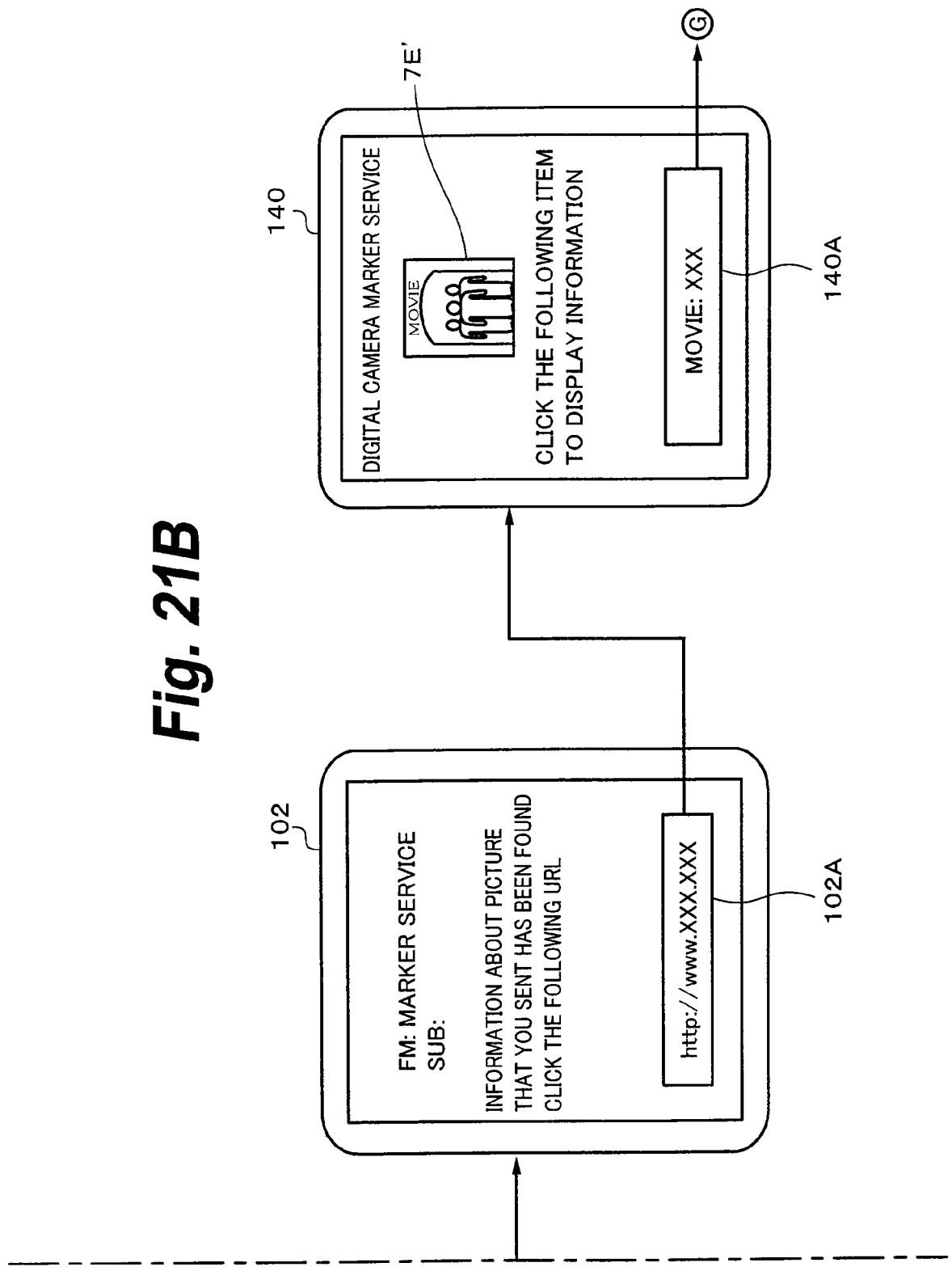

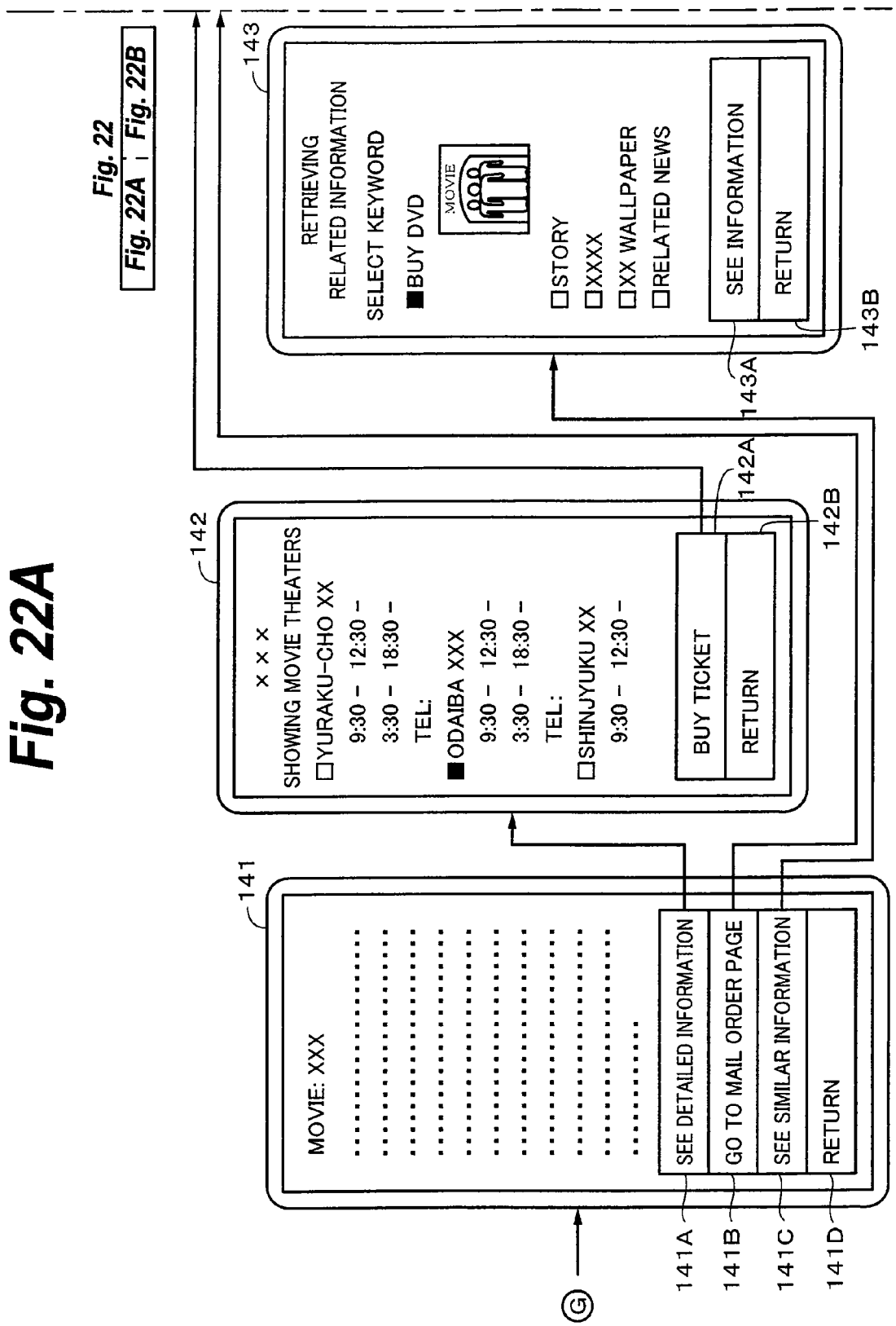

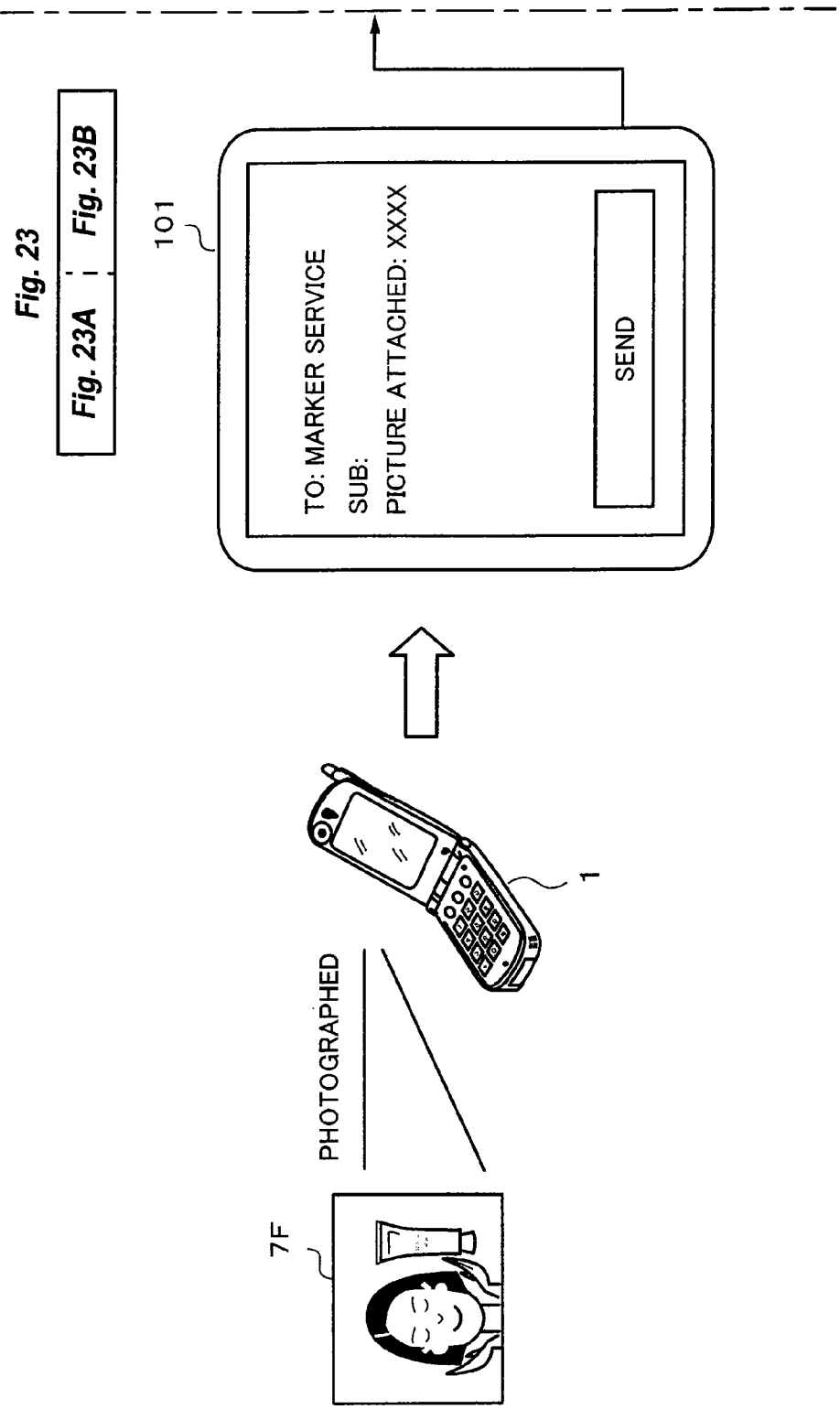

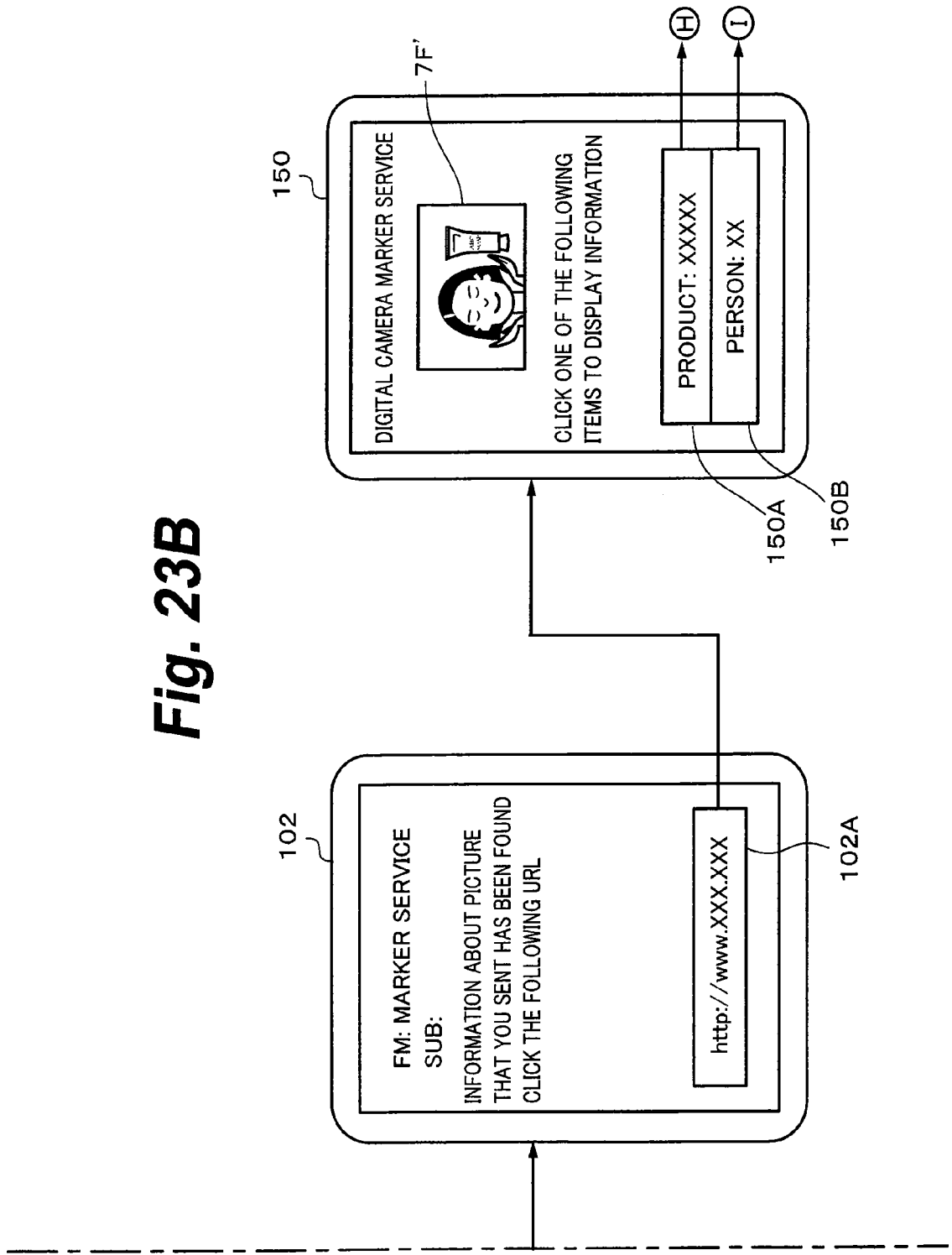

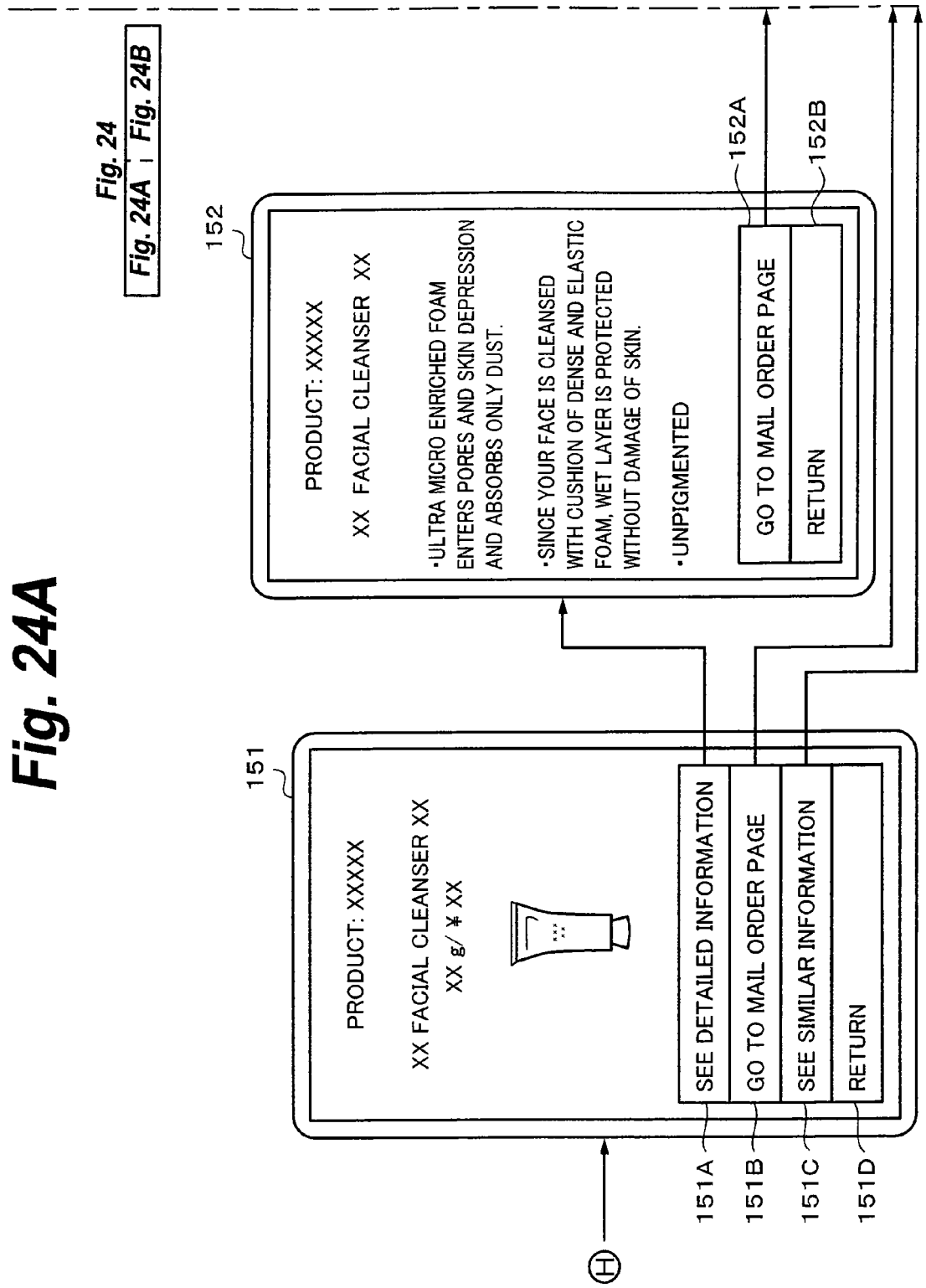

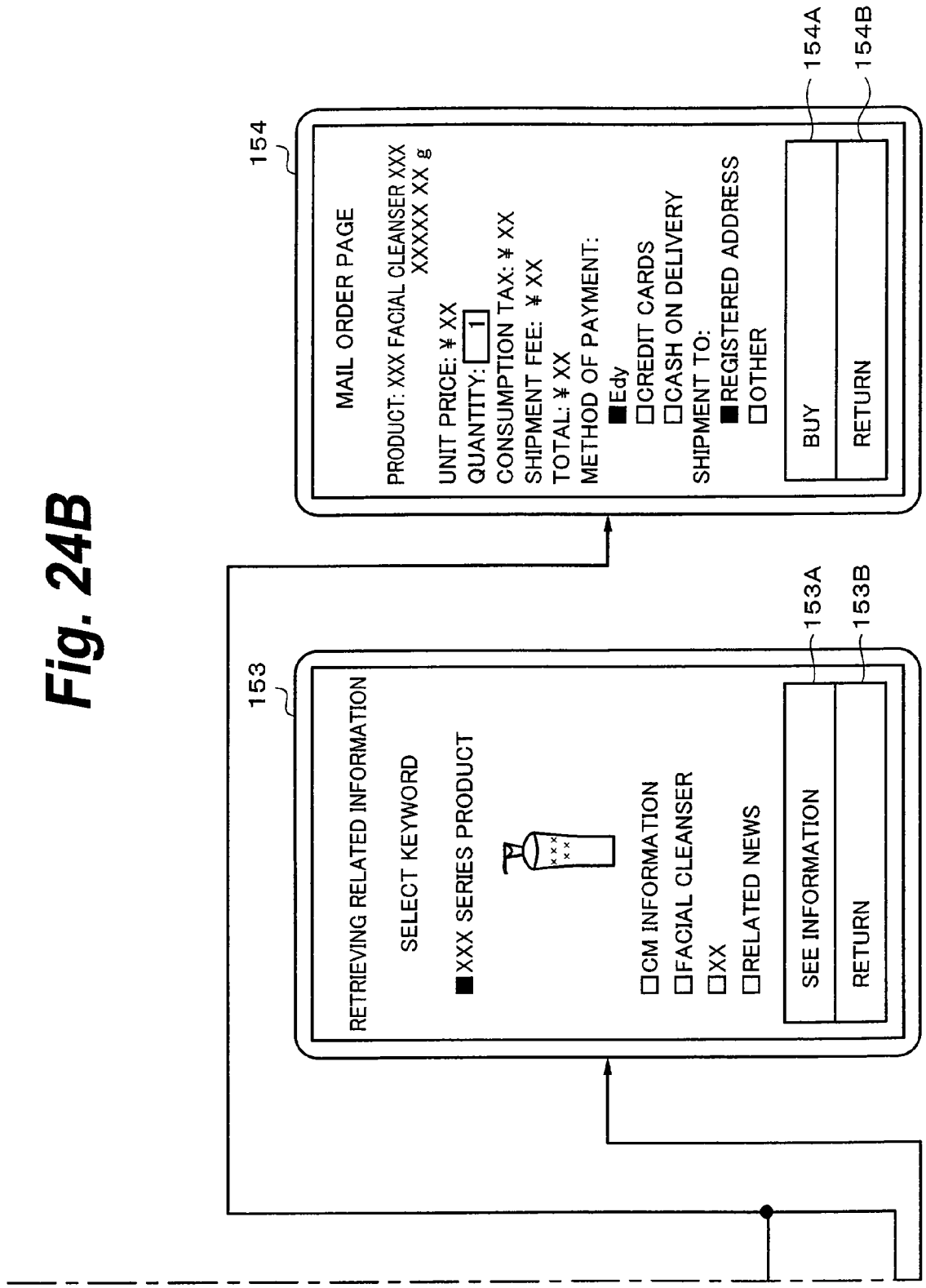

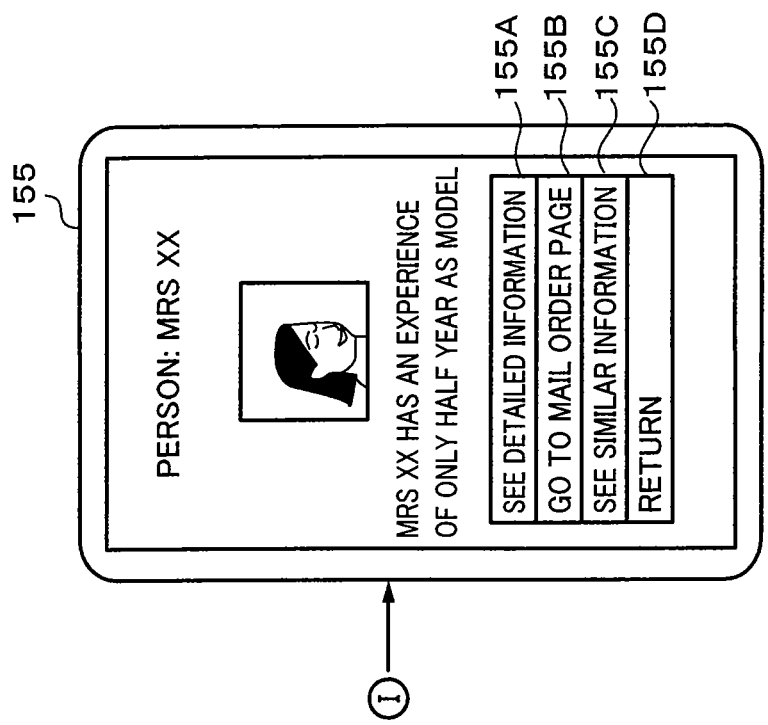

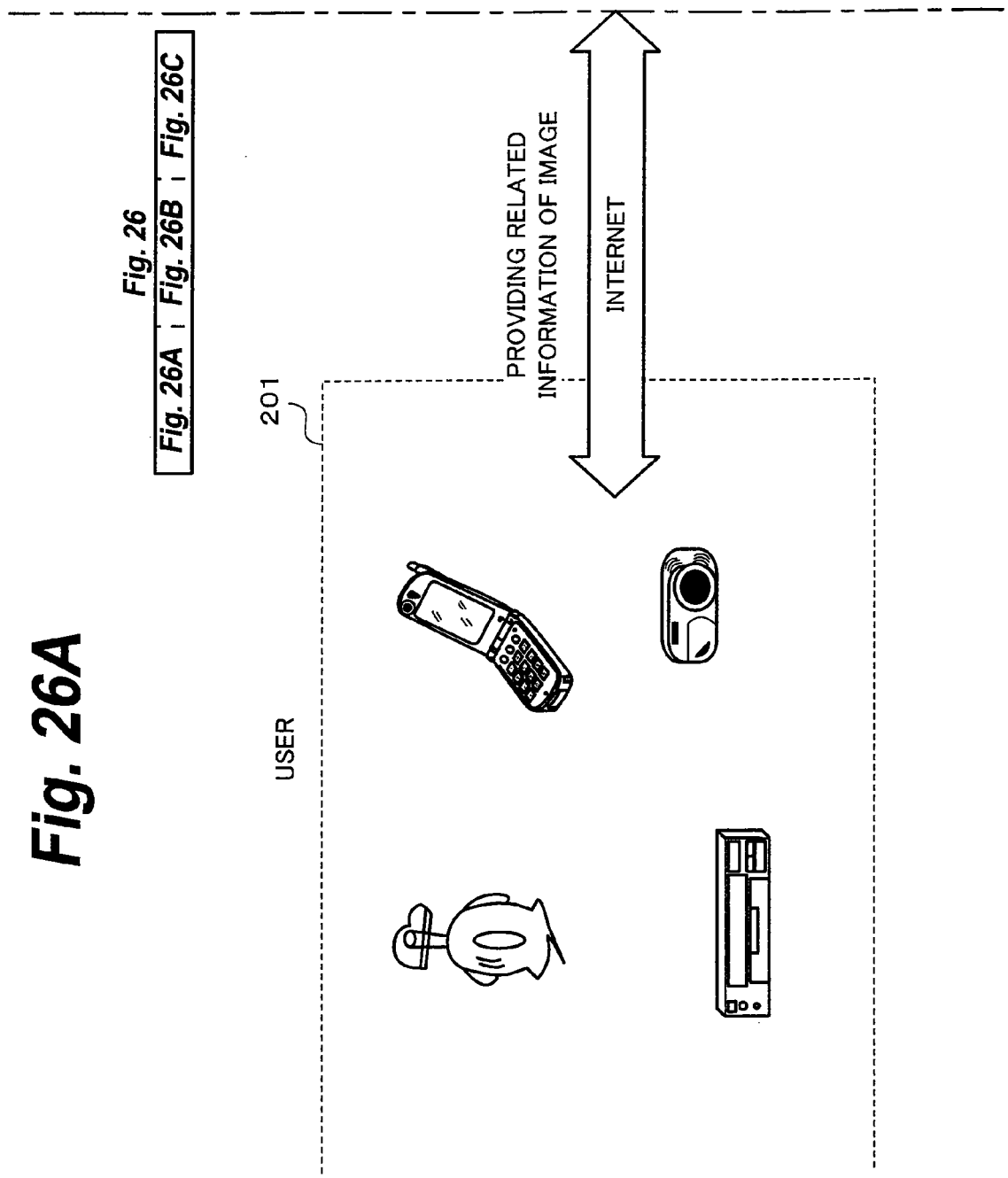

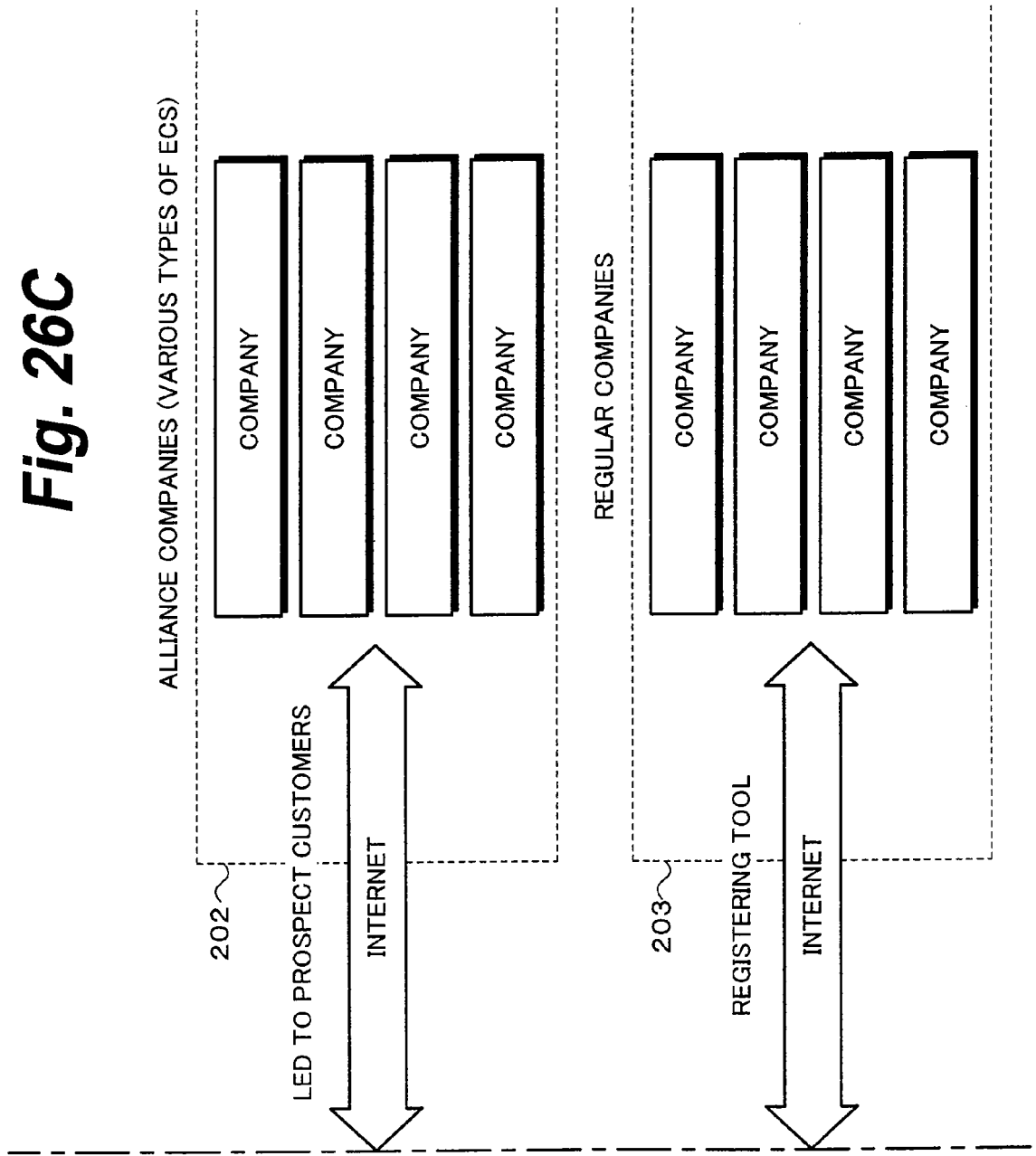

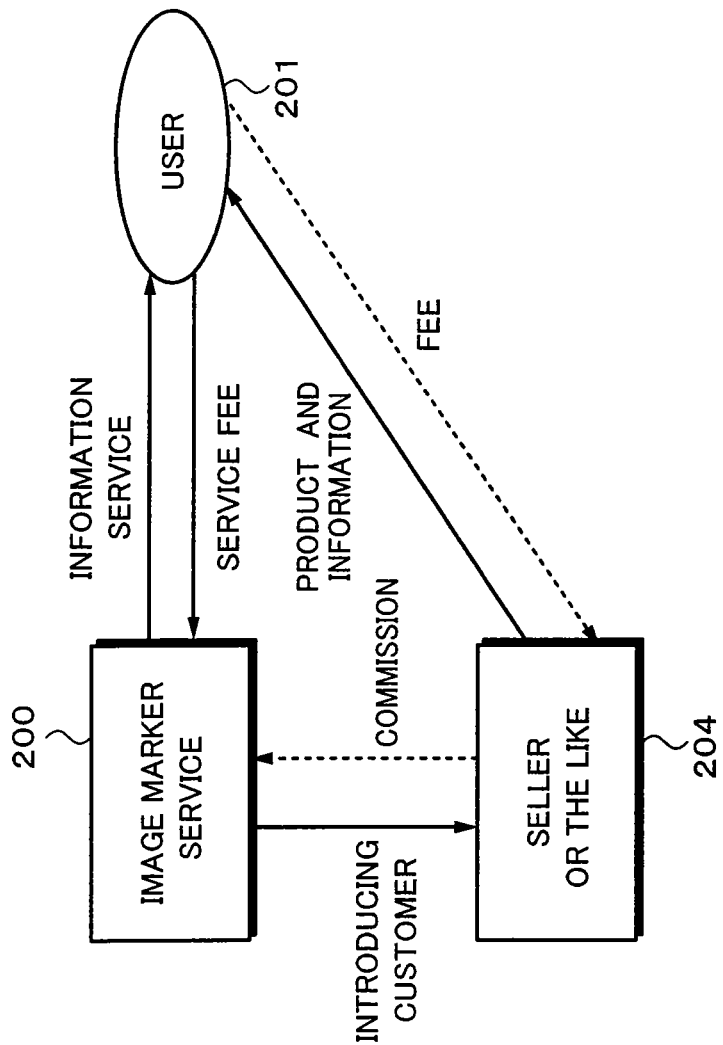

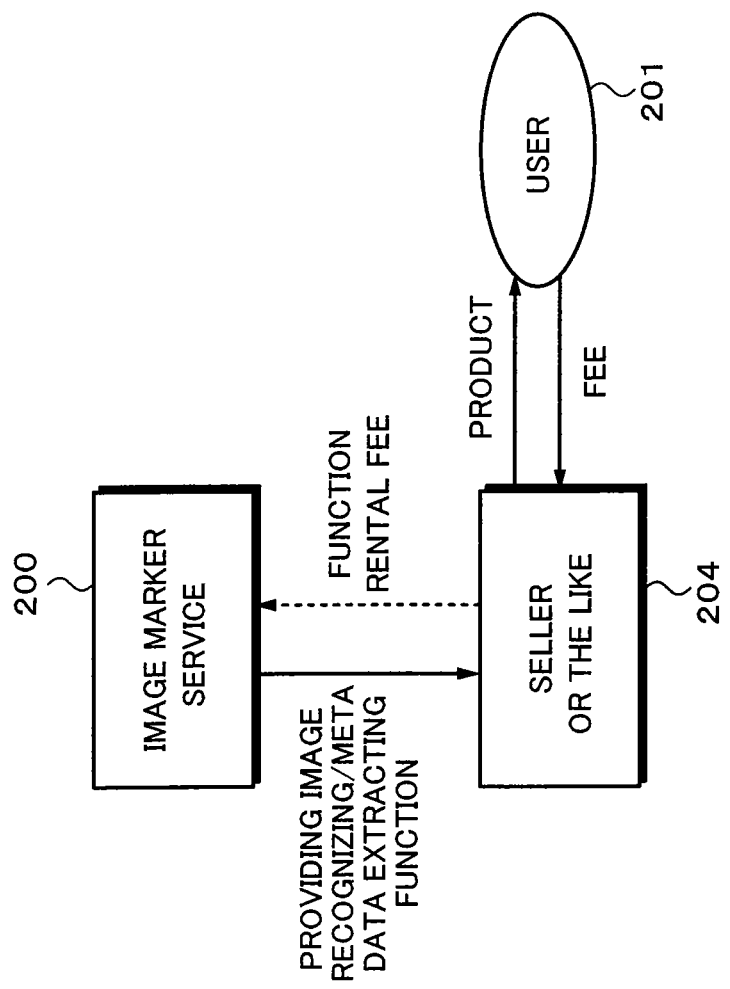

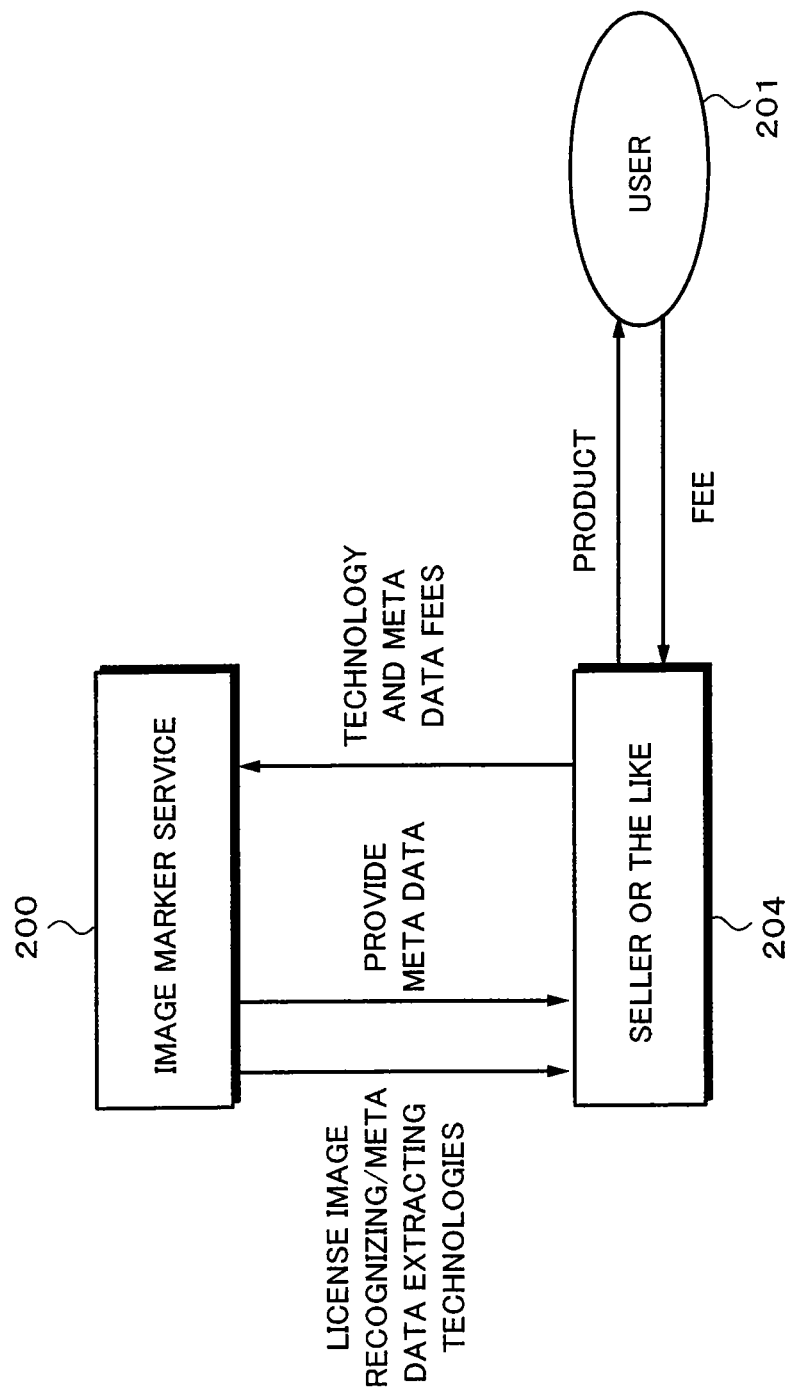

INFORMATION RETRIEVING SYSTEM, INFORMATION RETRIEVING METHOD, INFORMATION RETRIEVING APPARATUS, INFORMATION RETRIEVING PROGRAM, IMAGE RECOGNIZING APPARATUS IMAGE RECOGNIZING METHOD IMAGE RECOGNIZING PROGRAM AND SALES

CROSS REFERENCE TO RELATED APPLICATIONS

The present application claims priority to Japanese Patent Document Nos. P2004-020852 filed on Jan. 29, 2004, the disclosure of which is herein incorporated by reference.

BACKGROUND

The present invention relates to an information retrieving system, an information retrieving method, an information retrieving apparatus, an information retrieving program, an image recognizing apparatus, an image recognizing method, an image recognizing program, and a sales system that allow a user to retrieve his or her interested information and for example easily order a product according to the retrieved information.

It is assumed that a user found his or her interested product in advertisement of print media such as posters and magazines and advertisement of broadcast media such as commercials of television broadcasts and radio broadcasts. At this point, if the advertisement contains store information indicating a store that the user can buy the product, he or she can directly go to the store and buy the product at the store. In contrast, if the advertisement does not contain store information indicating a store that he or she can buy the product, he or she needs to estimate a store that he or she can buy the product and look for it.

In recent years, networks such as the Internet have been outspread. The user can easily search for detailed information about his or her desired product and store information indicating a store that he or she can buy product from a network. The user accesses a search site on the Internet with for example a personal computer and retrieves desired information with a keyword that he or she thinks that it indicates the product. If the retrieved information contains store information that indicates a store that he or she can buy the product, he or she can go to the store and buy the product at the store.

EC (Electronic Commerce) has emerged as the Internet has grown. Thus, the user can order his or her favorite product and pay the money for the product through the Internet according to the retrieved result from the information search site on the Internet without need to actually go to the store. As a result, the user can obtain his or her favorite product at home.

Moreover, in recent years, portable telephone terminals having an Internet connection function have been widespread. In addition, portable telephone terminals having a camera function (hereinafter sometimes referred to as portable camera telephone terminals) have been widespread. The user can easily photograph an object and transmit image data of the photographed object to the Internet. In the circumstance, a method of obtaining store information indicating a store that a user can buy his or her desired product according to image data that he or she photographed with a camera has been proposed in Japanese Patent Application Unexamined Publication No. 2003-122757.

In this method, the user photographs his or her desired product with a portable camera telephone terminal and transmits the photographed image to a server through the Internet. The server analyzes the received photographed image, obtains feature amount information, retrieves detailed information of the product, store location information of the product, and so forth from a database according to the obtained feature amount information, outputs them, and returns them to user's portable camera telephone terminal. Even if the user does not know the name of the product, he or she can obtain information necessary for ordering the product.

With respect to information retrieval for contents of a television broadcast and a radio broadcast that are on the air, a method of receiving a television broadcast with an Internet connection type television receiver and retrieving data transmitted through the Internet corresponding to the received television broadcast has been practically implemented for a digital BS broadcast and a terrestrial digital television broadcast.

For a regular television receiver, a system that uses a personal computer or a portable telephone terminal having an Internet communication function has been practically implemented. In this system, a user transmits time information indicating time at which his or her interested program or a commercial was on the air to a server through a network such as the Internet with the personal computer or the portable telephone terminal having the Internet communication function. The server side retrieves information from a prepared database that stores related information (program name, commercial information, performers, song names, artist names, and so forth) of broadcast contents at each time of each broadcasting station according to the received time information, and returns the retrieved result to the user.

In the method of which the user sees advertisement and goes to a store according to information in the advertisement and he or she retrieves his or her desired product from a search site on the Internet (hereinafter this method is referred to as the first method), in many cases, the user needs to remember information about a product as character information such as the name of the product. If the user does not know the character information, it is very difficult to obtain necessary information with which he or she can buy his or her desired product.

Now, it is assumed that the user saw a poster of a newly released movie and wanted to know a movie theater and show times at which it performs the movie. Conventionally, the user needs to memorize or take a note of character information such as the title of the movie on the poster and retrieve necessary information from an information search site according to the character information. In this case, if the user retrieves the necessary information according to information he or she memorizes, he or she may not retrieve the necessary information or may retrieve an improper result because he or she mistakenly memorizes character information or forgot them. If the user takes a note of the character information, he or she needs to take a time to prepare a writing tool and a notebook.

When the user found his or her favorite shoes that a person in advertisement of a magazine worn, if the user does not know the maker and the model of the shoes, he or she cannot obtain even character information as a keyword with which he or she retrieve information from the information search site.

When the user buys wine, he or she may not determine whether to buy it without necessary information about what taste the win has, where it was produced, and what grape species was used for the wine. If character information on the label of the wine bottle is written in for example French, it is difficult for a non-French-speaking user to input a keyword in an input field in the foregoing conventional retrieving method. Moreover, in the conventional method, it is difficult to satisfy needs of the user to quickly obtain information on the spot.

FIG. 1A and FIG. 1B show an example of a procedure of retrieving information and buying a product according to the first method. First, a user obtains information about a product from so-called push media such as paper media, a television broadcast, or a radio broadcast (at step S100). In this stage, the user is interested in the product in an "attractive" level. The user checks detailed information about the product such as the price and specifications with so-called pull media such as paper media e.g. an information magazine or an information search site on the Internet (at step S101).

When the user has obtained the detailed information about the product, he or she checks the information. If the user has obtained information about a plurality of stores for the product, he or she compares their prices (at step S102) and checks the location of the store that he or she can buy the product (at step S103). When the store is a real store, the user checks the location of the store on a map. If the store supports the EC and is a store as a web site on the Internet, the user checks the URL (Uniform Resource Locator) of the store. The user determines whether to actually buy the product according to his or her budget and the priority of the product in a product list (wish list) (at step S104). When the user has decided to buy the product, he or she performs the buying process for it (at step S105).

When the user buys a product according to the first method, he or she needs to retrieve information and make a decision at each step from S100 to S105. Thus, the method involves the user's effort. Further, since these steps are incontinuous and independent processes, it takes time to buy the product after the user finds an attractive product. Thus, before the user buys the product, he or she may be tired, which may discourage the user from buying the product. This means that the sales side may lose a business chance.

In contrast, in the method described in Japanese Patent Application Unexamined Publication No. 2003-122757, where the user photographs his or her desired product with the portable camera telephone terminal, transmits the photographed image to the server, and obtains product information, (hereinafter this method is referred to as the second method), there is a problem of which the user needs to actually photograph the product for example his or her acquaintance has the product and he or she can photograph it or a show window exhibits the product. Of course, an image of advertisement of paper media and a commercial of a television broadcast may be used. In this case, the product needs to appear independently or nearly independently. Thus, the second method also has many restrictions.

On the other hand, in the method using the network connection type television receiver (hereinafter this method is referred to as the third method), there is a problem of which a dedicated television receiver is required. In addition, since related information is broadcast using a data channel, when a recorded television broadcast is reproduced, a unit that records and reproduces the television broadcast needs to correspond to recording of the data channel. In addition, the user can retrieve only information that the broadcasting station has prepared. Moreover, since the related information is broadcast through the data channel, the related information that was recorded is not updated. Thus, when the recorded information is reproduced, it may become old and useless.

On the other hand, in the method of which while the user is seeing a television broadcast received by a regular television receiver, he or she transmits time information to a server using a personal computer or a portable telephone terminal and receives information from the server (this method is referred to as the fourth method), while he or she is accessing the server using the personal computer or the portable telephone terminal, the desired image may disappear. In addition, the user needs to register information about the broadcasting station that he or she sees to the server in advance. Thus, the user needs to take time. In addition, when the user wants to obtain related information from a reproduced image of a recorded broadcast, it is necessary to record information about the broadcasting station and broadcasting time of the image along with the image in advance. Thus, the user needs to prepare a special recording unit.

On the other hand, when the product related information retrieving and buying system is used through the Internet, for example the following services have been performed.

(1) A service of which a related information provider provides information to a pay user who retrieves the information.

(2) A business that publishes information that a particular company requests and gets compensation for an advertisement effect of the disclosed information from the particular company regardless of whether the disclosed information is concerned with related information that a user requests.

(3) A business that licenses a company to use a retrieving system and related databases and gains compensation from the licensee company.

(4) A business that introduces a user who has retrieved information and who wants to buy a product according to the retrieved information to a mail order company and gets a commission from the mail order company.

(5) A business of which a user who retrieves information sells a product to another user.

However, conventionally, there are many problems as described above. Thus, these services and businesses cannot be smoothly carried out. As a result, many companies and users lose their business chances.

SUMMARY

Therefore, an object of the present invention is to provide an information retrieving system, an information retrieving method, an information retrieving apparatus, an information retrieving program, an image recognizing apparatus, an image recognizing method, an image recognizing program, and a sales system that allow steps after a user finds an attractive product until he or she buys it to be successively performed so that he or she can buy it stressfreely.

To solve the foregoing problem, the present invention in an embodiment is an information retrieving system, which retrieves information according to image data, comprising a terminal unit having image data obtaining means for obtaining image data; transmitting means for transmitting the image data obtained by the image data obtaining means to a communication network, and a server unit having a first database in which retrievable recognizing image data are registered; a second database in which meta data corresponding to the recognizing image data registered to the first database are registered; receiving means for receiving the image data transmitted from the terminal unit through the network; retrieving means for retrieving the recognizing image data that match an image element of the image data with a high match rate from the first database according to the image data received by the receiving means; and meta data extracting means for extracting the meta data from the second database according to a retrieved result of the retrieving means, wherein the server unit allows the terminal unit to browse the meta data extracted by the meta data extracting means through the communication network.

In addition, the present invention in an embodiment is an information retrieving method of retrieving information according to image data, comprising the steps of causing a terminal unit to obtain image data; transmitting the image data obtained at the image data obtaining step from the terminal unit to a communication network; receiving the image data transmitted at the transmitting step through the network; retrieving recognizing image data that match an image element of the image data with a high match rate from a first database according to the image data received at the receiving step, retrievable recognizing image data being registered in the first database; and extracting meta data from a second database according to a retrieved result at the retrieving step, the meta data corresponding to the recognizing image data registered in the first database being registered in the second database, wherein the terminal unit can browse the meta data extracted at the meta data extracting step through the communication network.

In addition, the present invention in an embodiment is an information retrieval apparatus which retrieves information according to image data, comprising a first database in which retrievable recognizing image data are registered; a second database in which meta data corresponding to the recognizing image data registered to the first database are registered; receiving means for receiving image data transmitted from a terminal unit through a communication network; retrieving means for retrieving the recognizing image data that match an image element of the image data with a high match rate from the first database according to the image data received by the receiving means; and meta data extracting means for extracting the meta data from the second database according to a retrieved result of the retrieving means, wherein the terminal unit can browse the meta data extracted by the meta data extracting means through the communication network.

In addition, the present invention in an embodiment is an information retrieval method of retrieving information according to image data, comprising the steps of receiving image data transmitted from a terminal unit through a communication network; retrieving recognizing image data that match an image element of the image data with a high match rate from a first database according to the image data received at the receiving step, retrievable recognizing image data being registered in the first database; and extracting meta data from a second database according to a retrieved result at the retrieving step, the meta data corresponding to the recognizing image data registered to the first database being registered in the second database, wherein the terminal unit can browse the meta data extracted at the meta data extracting step through the communication network.

In addition, the present invention in an embodiment is an information retrieving program which causes a computer unit to execute an information retrieving method of retrieving information according to image data, the information retrieving method comprising the steps of receiving image data transmitted from a terminal unit through a communication network; retrieving recognizing image data that match an image element of the image data with a high match rate from a first database according to the image data received at the receiving step, retrievable recognizing image data being registered in the first database; and extracting meta data from a second database according to a retrieved result at the retrieving step, the meta data corresponding to the recognizing image data registered to the first database being registered in the second database, wherein the terminal unit can browse the meta data extracted at the meta data extracting step through the communication network.

In addition, the present invention in an embodiment is an image recognizing apparatus which recognizes a predetermined shape from image data, comprising a first database in which retrievable recognizing image data are registered; a second database in which meta data of the recognizing image data registered to the first database are registered; retrieving means for retrieving the recognizing image data that match an image element of the image data with a high match rate from the first database according to input image data; and meta data extracting means for extracting the meta data from the second database according to a retrieved result of the retrieving means.

In addition, the present invention in an embodiment is an image recognizing method of recognizing a predetermined shape from image data, comprising the steps of retrieving recognizing image data that match an image element of input image data with a high match rate from a first database according to the input image data, the retrievable recognizing image data being registered in the first database; and extracting meta data from a second database according to a retrieved result at the retrieving step, the meta data of the recognizing image data registered to the first database being registered in the second database.

In addition, the present invention in an embodiment is an image recognizing program which causes a computer unit to execute an image recognizing method of recognizing a predetermined shape from image data, comprising the steps of retrieving recognizing image data that match an image element of input image data with a high match rate from a first database according to the input image data, the retrievable recognizing image data being registered in the first database; and extracting meta data from a second database according to a retrieved result at the retrieving step, the meta data of the recognizing image data registered to the first database being registered in the second database.

In addition, the present invention in an embodiment is a sales system, comprising a terminal unit which obtains image data and transmits them to a communication network; a server unit which can communicate with the communication network and outputs meta data of image data according to the image data; and a product sales section which can provide related information of the meta data and/or a product, wherein the server unit charges the terminal unit, outputs the meta data according to the image data transmitted from the terminal unit so that it can brose the meta data, and introduces the terminal unit as a customer to the product sales section, wherein the product sales section provides related information that the terminal unit can browse and/or a product to the terminal unit introduced as the customer, and wherein the terminal unit pays the product sales section for the provided information and/or product.

In addition, the present invention in an embodiment is a sales system, comprising a terminal unit which obtains image data and transmits them to a communication network; a server unit which can communicate with the communication network and outputs meta data of image data according to the image data; and a product sales section which can provide related information of the meta data and/or a product, wherein the server unit outputs the meta data according to the image data transmitted from the terminal unit so that it can brose the meta data, wherein the terminal unit pays the server unit for related information of the meta data that the terminal unit can brose and/or a product, wherein the server unit pays the product sales section for a part of the related information and/or the product, and wherein the product sales section provides the related information and/or the product to the terminal unit.

In addition, the present invention in an embodiment is a sales system, comprising a terminal unit which obtains image data and transmits them to a communication network; a server unit which can communicate with the communication network and outputs meta data of image data according to the image data; and a product sales section which can provide related information of the meta data and/or a product, wherein the terminal unit transmits the image data to the product sales section, wherein the product sales section obtains meta data according to the image data transmitted from the terminal unit through the server unit and pays the server unit for a rental fee, wherein the product sales section allows the terminal unit to browse the meta data corresponding to the image data transmitted from the terminal unit through the server unit, and wherein the terminal unit pays the product sales section for related information of the meta data that the terminal unit can browse and/or a product.

As was described above, according to an embodiment of the present invention, image data transmitted from a terminal unit are received through a communication network. Recognizing image data that match an image element of the image data with a high match rate are retrieved from a first database according to the received image data. Retrievable recognizing image data are registered in the first database. Meta data are extracted from a second database according to a retrieved result. The meta data corresponding to the recognizing image data registered to the first database are registered in the second database. The terminal unit can browse the extracted meta data through the communication network.

Thus, by only transmitting image data from the terminal unit, the user can browse meta data corresponding to the transmitted image data on the terminal unit. Thus, the user can quickly obtain necessary information without need to have the knowledge of the object on the spot.

Moreover, according to an embodiment of the present invention, recognizing image data that match an image element of input image data with a high match rate are retrieved from a first database according to the input image data. The retrievable recognizing image data are registered in the first database. Meta data are extracted from a second database according to a retrieved result. The meta data of the recognizing image data registered to the first database are registered in the second database. Thus, when image data are input, meta data corresponding to the input image data can be obtained. Thus, the user can obtain related information of the image data without need to have the knowledge of the image data.

Moreover, according to an embodiment the present invention, the sales system has a terminal unit which obtains image data and transmits them to a communication network, a server unit which can communicate with the communication network and outputs meta data of image data according thereto, and a product sales section which can provide related information of the meta data and/or a product. The server unit charges the terminal unit, outputs the meta data according to the image data transmitted from the terminal unit so that it can brose the meta data, and introduces the terminal unit as a customer to the product sales section. The product sales section provides related information that the terminal unit can browse and/or a product to the terminal unit introduced as the customer. The terminal unit pays the product sales section for the provided information and/or product. Thus, when the user of the terminal unit pays the server unit for a fee, he or she can transmit image data photographed by the terminal unit to the server unit and obtain a product and information corresponding to the image data. The server unit can obtain a fee from the user. The product sales section can obtain a fee for a product and information from a customer introduced by the server unit. In addition, the user can obtain the product and information without need to have the knowledge of the photographed product and information. The product sales section can obtain a new customer who does not have the knowledge of the product and information the product sales section sells.

Moreover, according to an embodiment of the present invention, the sales system has a terminal unit which obtains image data and transmits them to a communication network, a server unit which can communicate with the communication network and outputs meta data of image data according thereto, and a product sales section which can provide related information of the meta data and/or a product. The server unit outputs the meta data according to the image data transmitted from the terminal unit so that it can brose the meta data. The terminal unit pays the server unit for related information of the meta data that the terminal unit can brose and/or a product. The server unit pays the product sales section for a part of the related information and/or the product. The product sales section provides the terminal unit with the related information and/or the product. Thus, when the user of the terminal unit pays the server unit for a fee, he or she can transmit image data photographed by the terminal unit to the server unit and obtain a product and information relating to the image data. The server unit can obtain a part of the fee of the product and information that the server unit has provided to the user. The product sales section can obtain the rest of the fee of the product and the information that the product sales section has provided to the user. In addition, the user can obtain the product and information without the knowledge of the photographed product and information. The product sales section can obtain a new customer who does not have the knowledge of the product and information the product sales section sells.

Moreover, according to an embodiment of the present invention, the sales system has a terminal unit which obtains image data and transmits them to a communication network, a server unit which can communicate with the communication network and outputs meta data of image data according thereto, and a product sales section which can provide related information of the meta data and/or a product. The terminal unit transmits the image data to the product sales section. The product sales section obtains meta data corresponding to the image data transmitted from the terminal unit through the server unit and pays the server unit for a rental fee. The product sales section allows the terminal unit to browse the meta data corresponding to the image data transmitted from the terminal unit through the server unit. The terminal unit pays the product sales section for related information of the meta data that the terminal unit can browse and/or a product. Thus, when the user of the terminal unit pays the server unit for a fee, he or she can transmit image data photographed by the terminal unit to the product sales section and obtain a product and information relating to the image data. The product sales section can obtain a fee for the product and information that the product sales section has provided to the user. The server unit can obtain a function rental fee from the product sales section. In addition, the user can obtain the product and information without the knowledge of the photographed product and information. The product sales section can obtain a new customer who does not have the knowledge of the product and information the product sales section sells.

Additional features and advantages of the present invention are described in, and will be apparent from, the following Detailed Description of the Invention and the figures.

BRIEF DESCRIPTION OF THE FIGURES

FIG. 1A and FIG. 1B are schematic diagrams showing an example of a procedure in the case that information is retrieved and a product is bought according to the conventional first method.

FIG. 2A and FIG. 2B are schematic diagrams showing a buying process according to the present invention.

FIG. 3 is a schematic diagram showing an example of a structure of a system according to the embodiment of the present invention.

FIG. 4A and FIG. 4B are block diagrams showing an example of a structure of a user side system and a server side system.

FIG. 5A and FIG. 5B are schematic diagrams describing a method of collecting image data and related information according to a commercial of a television broadcast.

FIG. 6A and FIG. 6B are schematic diagrams describing a method of collecting image data and related information from media other than a television broadcast.

FIG. 9A, FIG. 9B, FIG. 9C, FIG. 9D, and FIG. 9E are schematic diagrams showing examples of information obtained from image data.

FIG. 10A, FIG. 10B, and FIG. 10C are schematic diagrams showing a more specific example of the image recognizing process and the meta data extracting process.

FIG. 11A and FIG. 11B are schematic diagrams describing examples of various services provided using meta data according to the embodiment of the present invention.

FIG. 12A and FIG. 12B are schematic diagrams describing an example of which a service is received according to image data of an attractive photo or article in a magazine or a newspaper.

FIG. 13A and FIG. 13B are schematic diagrams describing an example of which a service is received according to image data of an attractive photo or article in a magazine or a newspaper.

FIG. 15A and FIG. 15B are schematic diagrams describing an example of which a service is received according to image data of a part or whole of a building.

FIG. 16A and FIG. 16B are schematic diagrams describing an example of which a service is received according to image data of a part or whole of a building.

FIG. 17A and FIG. 17B are schematic diagrams describing an example of which a service is received according to image data of a label of a wine bottle or the like.

FIG. 18A and FIG. 18B are schematic diagrams describing an example of which a service is received according to image data of a label of a wine bottle or the like.

FIG. 19A and FIG. 19B are schematic diagrams describing an example of which a service is received according to image data of a person.

FIG. 20A and FIG. 20B are schematic diagrams describing an example of which a service is received according to image data of a person.

FIG. 21A and FIG. 21B are schematic diagrams describing an example of which a service is received according to image data of an advertisement image.

FIG. 22A and FIG. 22B are schematic diagrams describing an example of which a service is received according to image data of an advertisement image.

FIG. 23A and FIG. 23B are schematic diagrams describing an example of which a service is received according to image data of an advertisement image.

FIG. 24A and FIG. 24B are schematic diagrams describing an example of which a service is received according to image data of an advertisement image.

FIG. 25 is a schematic diagram describing an example of which a service is received according to image data of an advertisement image.

FIG. 26A, FIG. 26B, and FIG. 26C are schematic diagrams conceptually showing the relationship of a service, a user, and each company according to the embodiment of the present invention.

FIG. 27 is a schematic diagram showing an example of a membership pay service that charges each user.

FIG. 29 is a schematic diagram showing an example of which an image marker service operates as a functional ASP that provides an image marker service engine function to a sales company or the like.

FIG. 30 is a schematic diagram showing an example of which an image marker service licenses a sales company to use an image marker service engine.

DETAILED DESCRIPTION

Next, an embodiment of the present invention will be described. Before the present invention is described, a service that the applicant of the present invention is carrying out will be described in brief.

In this service, related information of songs and commercials that will be aired in television broadcasts and radio broadcasts are correlated with broadcast time information and registered on the server side in advance. When an attractive song or commercial is aired in a television broadcast or a radio broadcast that a user is watching or listening to outdoor or at home, he or she transmits time information to the server using for example a portable telephone terminal having an Internet communication function. The server retrieves related information about the song or commercial that was aired according to the received time information and returns the retrieved result to him or her. Thus, the user can easily obtain the related information about an attractive song and commercial. In addition, the server side can promote a business associated with song and commercial information that the server side has provided to the user.

Figure 2B:
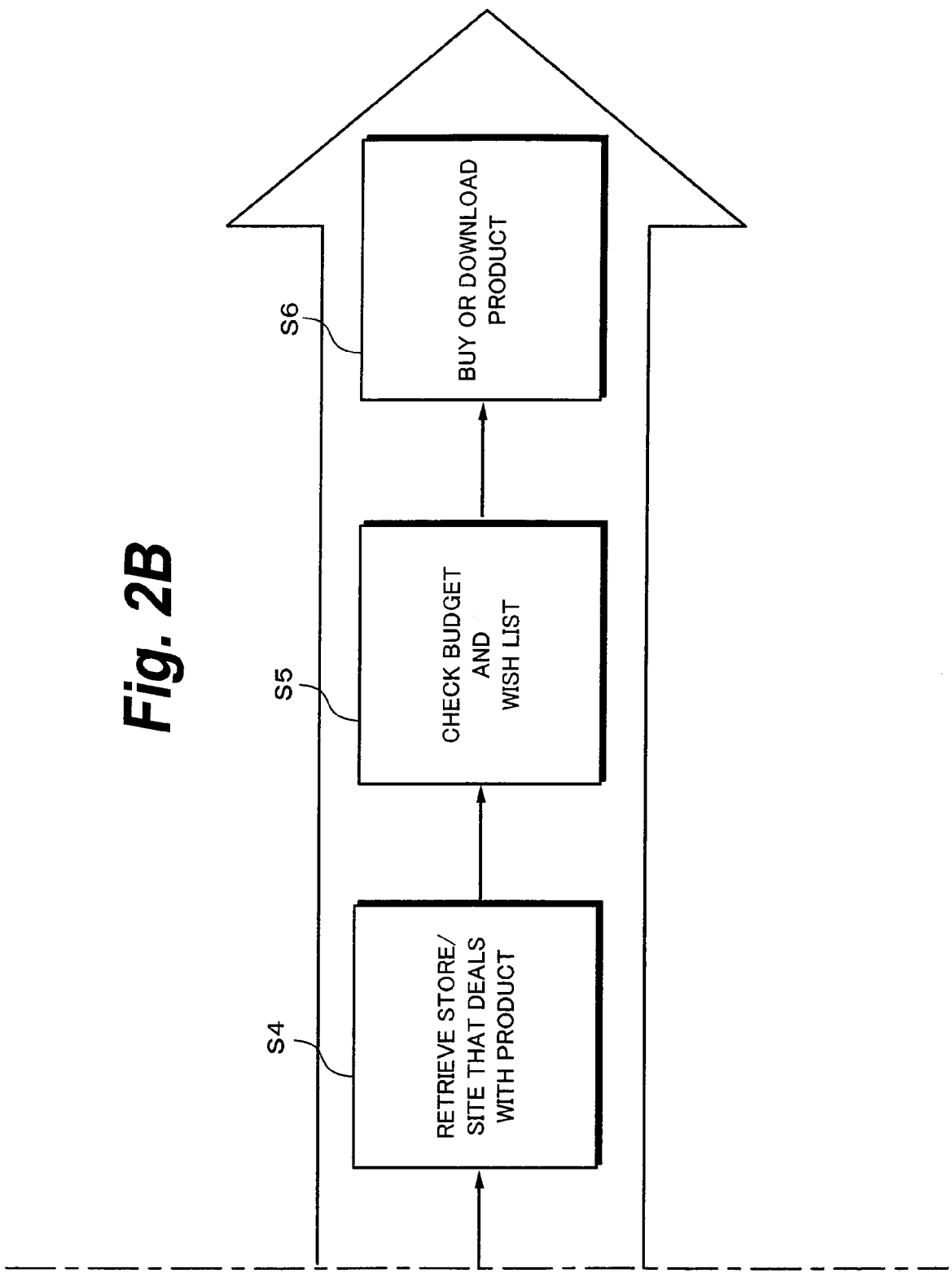

The present invention aims to apply the on-going service to image data and provide a successive buying process to the user. In other words, in the first method described in the related art section, step S100 to step S105 after the user obtains information until he or she buys a product are not successive as shown in FIG. 1A and FIG. 1B. In contrast, as shown in FIG. 2A and FIG. 2B, according to the present invention, steps of obtaining information (at step S1), retrieving information (at step S2), checking information and comparing prices (at step S3), retrieving store or site that deals with the product (at step S4), checking budget (at step S5), and buying or downloading the product (at step S6) are performed as successive processes.

FIG. 3 shows an example of a structure of a system according to the embodiment of the present invention. When the user found attractive information, he or she photographs it with for example a portable camera telephone terminal 1. For example, it is assumed that the user found that a cover of a magazine "ABCD" had a photo of an attractive product. The user photographs the cover of the magazine ABCD with the portable camera telephone terminal 1 and transmits the obtained image data 7 to a server 3 through the Internet 2.

The server 3 is a unit that has the same structure as for example an ordinary computer unit. The server 3 has an image data analyzing function. In addition, the server 3 has an image database 4 and a related information database 5. Various types of image data such as images of various types of products, images of persons, images of logo marks, and images indicating character information are registered in the image database 4. Hereinafter, images registered in the image database 4 are referred to as registered images. Related information of images registered in the image database 4 are registered as meta data of the images in the related information database 5.

The server 3 is not limited to a unit composed of a single computer unit. Instead, the server 3 may be composed of a plurality of computers connected through a network. Functions of the server 3 are executed by a program installed therein. The program is supplied through a record medium such as a CD-ROM (Compact Disc-Read Only Memory) or a network.

When the server 3 receives the image data 7, the server 3 performs an image recognizing process for the received image data 7. In the image recognizing process, the server 3 checks whether an image that matches or is very similar to an image element contained in the image data 7 has been registered in the image database 4. When the image has been registered in the image database 4, the server 3 retrieves related information corresponding to the registered image of the image database 4 from the related information database 5. The server 3 transmits information according to the related information as the retrieved result to the portable camera telephone terminal 1 through the Internet 2.

An image element is a meaningful element that composes one image. Assuming that one image is composed of a person who wears a cap and an image of a logo mark, an image of the cap, an image of the person, and the image of the logo mark are image elements of the image.

Related information registered in the related information database 5 may contain the URL (Uniform Resource Locator) of a related site 6 on the Internet 2. The user can access the related site 6 with the URL contained in the related information transmitted from the server 3. When the related site 6 supports the EC and the user can buy a product through the Internet 2, he or she can access the related site 6 according to the URL contained in the related information transmitted from the server 3 and buy the product from the related site 6.

Next, the structure of the system according to the embodiment of the present invention will be described in detail. FIG. 4A and FIG. 4B show an example of a structure of a user side system and a server side system. On the user side, the portable camera telephone terminal 1 has a camera section 10, a display section 11, and an interface (I/F) section 12. The camera section 10 uses for example a CCD (Charge Coupled Device) as an image device. The camera section 10 converts a photographed signal into image data in a predetermined manner and outputs the image data. The image data are supplied to the display section 11 that uses for example an LCD (Liquid Crystal Display) as a display device.

In addition, the image data, which are output from the camera section 10, are gray-scaled and supplied to the interface section 12. The image data can be gray-scaled for example by extracting only a luminance component from the image data.

The interface section 12 controls communication between the portable camera telephone terminal 1 and the Internet 2 according to a predetermined protocol. The image data supplied to the interface section 12 are transmitted as image data 7 to the server 3 through the Internet 2. At this point, it is preferred that ID information that identifies the user be transmitted along with the image data.

As denoted by a dotted line block in the drawing, a feature extraction processing section 13 may be disposed so as to extract a feature from the image data that are output from the camera section 10 in a predetermined manner and supply only the extracted feature data to the interface section 12. In this case, only the feature data are transmitted to the Internet 2.

On the user side, means that obtains image data and transmits them is not limited to the portable camera telephone terminal 1. Instead, as long as an image supplied from the information provider side can be obtained, any means may bee used.

For example, when image data photographed by a digital camera 1B are transferred to a personal computer (PC) 15 and then the personal computer 15 communicates with the Internet 2, image data 7 can be transmitted to the server 3. In this case, a feature extracting section 16 pre-extracts a feature from image data photographed by the digital camera 1B and transmits only the extracted feature data as image data 7 to the server 3. The feature extracting section 16 may be composed of software on the personal computer 15.

In addition, image data of a digital television broadcast received by for example a digital television receiver 1C can be transmitted as image data 7 to the server 3. A digital television broadcast signal received by an antenna 20 is processed by a receiving section 21 in a predetermined manner. As a result, a digital video signal is obtained. The digital video signal is displayed on a displaying section 22. In addition, frames for a predetermined period for which the user sets an operating section (not shown) or one particular frame is extracted from the digital video signal. An interface section 23 transmits the extracted frames or frame as image data 7 to the server 3 through the Internet 2.

Like the portable camera telephone terminal 1, the digital television receiver 1C may have a feature extraction processing section 24 as denoted by a dotted line block in the drawing so as to pre-extract a feature of image data that are output from the receiving section 21 and transmit only the feature data as image data 7 to the server 3.

In addition, a digital video signal received by a digital television receiver 25 and recorded by a video recorder 26 can be transmitted as image data 7 to the server 3 in the same manner. The video recorder 26 reproduces frames in a particular period or one particular frame of the digital video signal. When the frames or frame reproduced by the video recorder 26 is transferred to for example a personal computer 27 and then the personal computer 27 communicates with the Internet 2, the frames or frame can be transmitted as image data 7 to the server 3.

In this case, a feature extracting section 28 pre-extracts a feature from the frames or frame that are output from the video recorder 26 and transmits only the extracted feature data as image data 7 to the server 3. The feature extracting section 28 may be composed of software on the personal computer 27.

In stead, on the user side, means that obtains the image data and transmits them may be a home robot having an image recognizing function.

In any of the foregoing examples, gray-scaled image data are transmitted as image data 7 to the server 3. The user side extracts a feature from image data that has been gray-scaled.

In the foregoing examples, the digital television receiver 1C receives a television broadcast as a digital television broadcast. Of course, an analog television broadcast signal that an analog television receiver receives as an analog television broadcast may be converted into a digital signal.

Next, the server side system will be described. The server side system has the server 3, an image database 4, a related information database 5, and a data registering section. Interface sections 40 and 41 control communication between the server 3 and the Internet 2 according to a predetermined protocol in a predetermined manner. The interface section 40 receives image data transmitted from the user side through the Internet 2 and supplies the image data to the server 3.

The data registering section collects commercials extracted by an automatic CM (commercial) extracting system 51 from television broadcasts of individual channels, information published in regular web sites 52 on the Internet 2, and so forth. A data registering tool 50 registers images to the image database 4. When images are registered to the image database 4, the images are assigned unique image IDs. The data registering tool 50 is software structured so that data are effectively registered to the image database 4 and the related information database 5.

Images that the user may retrieve are pre-registered to the image database 4. For example images of logo marks, partial or whole images of articles and buildings, images of persons, and so forth are registered to the image database 4. Character information is also registered to the image database 4 so that character strings can be analyzed.

In addition, the data registering section collects related information that relates to images registered to the image database 4 from the automatic CM extracting system 51 and the general web sites 52. The data registering tool 50 correlates the collected related information, the images, and the image IDs and register the correlated data to the related information database 5.

The server 3 has an image feature extracting section 30, an image feature comparing section 31, a related information retrieving section 32, and a related information outputting section 33. The image data 7 from which a feature has not been extracted on the user side are received by the interface section 40 and supplied to the image feature extracting section 30. In contrast, the image data 7 from which a feature has been extracted on the user side are received by the interface section 40 and supplied to the image feature comparing section 31. The feature extracting sections 13, 16, 24, and 28 on the user side perform the same feature extracting process as the image feature extracting section 30 on the server side.

The image feature extracting section 30 extracts a feature from the supplied image data 7 and outputs the obtained feature data. The image feature extracting section 30 may perform the feature extracting process in various manners. For example, the image feature extracting section 30 may perform an edge detecting process for the image data in such a manner that the image feature extracting section 30 extracts sharp edge portions as feature points and uses the relationship of the positions of the extracted feature points as feature data.

The feature data are supplied to the image feature comparing section 31. The image feature comparing section 31 extracts a feature from an image registered in the image database 4 and compares the extracted feature data with the feature data supplied from the image feature extracting section 30. The image feature comparing section 31 retrieves an image from the image database 4 according to the compared result in such a manner that the image matches the whole or a part of the feature data supplied from the image feature extracting section 30 with a high much rate. At this point, if the image feature comparing section 31 has retrieved a plurality of images that have a higher match rate, the image feature comparing section 31 outputs the image IDs of the registered images.

The image ID that is output from the image feature comparing section 31 is supplied to the related information retrieving section 32. The related information retrieving section 32 retrieves related information from the related information database 5 according to the supplied image ID. The related information corresponding to the image identified by the image ID is supplied to the related information outputting section 33.

The related information outputting section 33 converts related information supplied from the related information retrieving section 32 into data so that the user can browse them. The converted meta data are supplied to the interface section 41 and returned to the user through the Internet 2. For example, when the image data 7 is transmitted from the portable camera telephone terminal 1 to the server, related information of the image data 7 is returned to the portable camera telephone terminal 1 through the Internet 2.

In the foregoing example, the related information outputting section 33 transmits related information to the user. However, the present invention is not limited to such an example. For example, the related information outputting section 33 may create a web site that publishes related information supplied from the related information retrieving section 32 to the user through the Internet 2. The server 3 informs the user (portable camera telephone terminal 1) of the URL of the created web site so as to present the web site to him or her. When the user who received the information accesses the URL, he or she can browse the related information of the image data 7 that he or she transmitted.

In addition, in the foregoing, the image feature extracting section 30 performs the feature extracting process of gray-scaled image data. However, the present invention is not limited to such an example. In other words, the image feature extracting section 30 may perform a feature extracting process for image data containing color information. In this case, the user side transmits image data that are not gray-scaled to the server 3. When the user side performs the feature extracting process using the feature extracting section 13, 16, 24, or 28, it can perform the feature extracting process for image data containing color information. In addition, when the user side performs the feature extracting process, it can perform the feature extracting process for gray-scaled data. When the server side 3 performs the feature extracting process, it may perform the feature extracting process for image data containing color information.

Next, data registration to the image database 4 and the related information database 5 will be described. First, with reference to FIG. 5A and FIG. 5B, a method of collecting image data and related information according to a commercial of a television broadcast will be described. The automatic CM extracting system 51 has a plurality of tuners 511, 511, . . . , corresponding to individual channels of television broadcasts and a CM detector 512. Television broadcasts received by the tuners 511, 511, . . . are supplied to the CM detector 512. The CM detector 512 automatically detects and extracts commercials from the supplied television broadcasts. A commercial of a television broadcast can be detected from the difference between audio data of a non-commercial broadcast program and that of a commercial, a scene change, a program guide, and so forth.

The automatic CM extracting system 51 creates a list of new commercials aired on the day according to the detected commercials. The list of new commercials is supplied to a data center 60 along with image data (video data) of new commercials detected on the day by the automatic CM extracting system 51. The automatic CM extracting system 51 also extracts program guides of broadcasting stations, event announcements from the television broadcasts, and so forth and supplies the extracted guides, announcements, and so forth to the data center 60.

The data center 60 checks related information about individual commercials according to the list of new commercials and video data of the new commercials supplied from the automatic CM extracting system 51. For example, the data center 60 checks a sponsor, a sales representative, a production company, a music production company as a copyright owner for a song that is used for a commercial, a related web site, a general web site that publishes related information, and so forth for each commercial. The checked results are registered as related information of commercials to a commercial (CM) information database 61 along with video data.

In the example shown in FIG. 5A and FIG. 5B, a first broadcast time, a broadcasting station, a commercial duration, and version information are registered as related information (meta data) of a broadcast to the CM information database 61. As information about a sponsor, a company name, a company category, and a URL of a company's web site are registered. As information about a product, a product name, a product category, and product information (or a URL of a related web site that publishes product information) are registered to the CM information database 61. As information about a performer, a performer's name and his or her word are registered to the CM information database 61. As information about direction of a picture, a catch copy, a scene, a feature of a picture, and so forth are registered to the CM information database 61. As information about a song, a song name, a performer, a song writer, a composer, and if the song is recorded on a CD, a CD number are registered to the CM information database 61.

A match retrieving file is registered to the CM information database 61. Features of images and audio of video data supplied from the data center 60 are extracted. As a result, feature data files are obtained. Feature data files of images and sound are correlated with commercials and registered as a match retrieving file.

Each unit of information registered in the CM information database 61 is registered in the related information database 5. Recorded video data of commercials are registered to the image database 4. It is preferred that the feature data file of image data be registered to the image database 4 because image data can be more easily retrieved.

Next, with reference to FIG. 6A and FIG. 6B, a method of collecting image data and related information from media other than television broadcasts will be described. In this example, it is assumed that information sources are web sites on the Internet. For example, web sites that publish various types of advertisement messages, various news sites, various types of information sites, web sites of newspaper companies, web sites of publishing companies (in particular, web sites related to magazines they publish), related web sites, general web sites may be information sources. Instead, paper media such as various types of magazines and newspapers may be information sources.

The data center 60 observes these web sites for example on daily basis. When the data center 60 found a new product, a topical product, an event, and so forth that were released on the day, the data center 60 creates a list of information that it found. The data center 60 inquires of information sources and sales representatives detailed information and checks related web sites and general web sites that publish the related information according to the list. The data center 60 registers information to a product (content) information database 62 according to the inquired results and checked results.

Figure 6B:
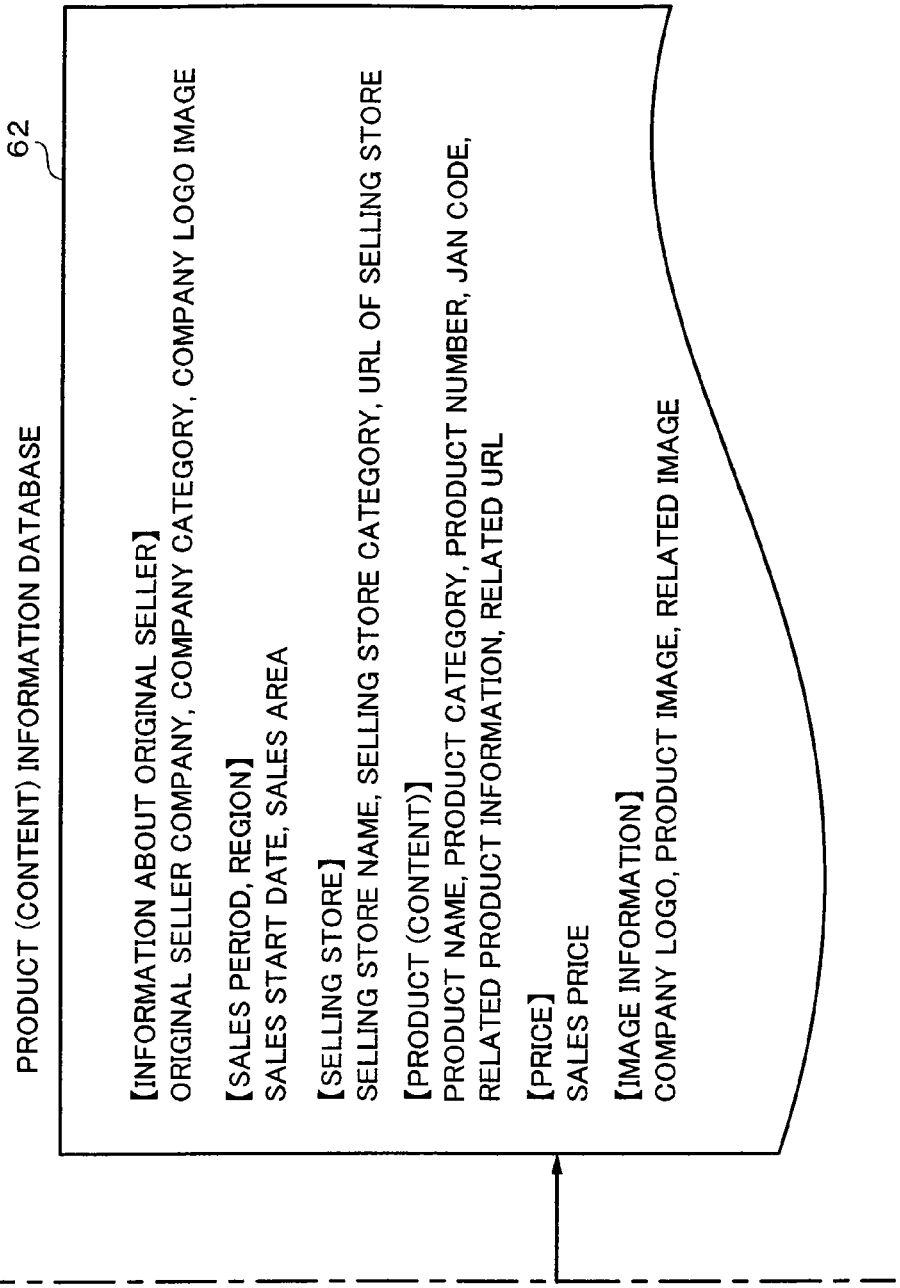

In the example shown in FIG. 6A and FIG. 6B, as related information (meta data) of an original seller, an original seller company, its category, and its logo mark image are registered to the product (content) information database 62. As related information of a sales period and a sales region, a sales start date and a sales area are registered to the product (content) information database 62. As related information of a selling store, a selling store name, a category of the selling store, and a URL of a web site of the selling store are registered to the product (content) information database 62. As related information of a product (content), a product name, a category of the product, a product number, a JAN code, information about a related product, and a URL of a web site of the relevant product are registered to the product (content) information database 62. As related information of a price, a sales price is registered to the product (content) information database 62.

An image of each company's log mark, image data of each product, and related image data of each product are registered to the product (content) information database 62.

Each unit of information registered in the product (content) information database 62 is registered to the related information database 5. Each image data registered in the product (content) information database 62 are registered to the image database 4. It is preferred that a feature data file as a feature extracted from each image be registered to the image database 4 because image data can be easily retrieved.

The structures of the foregoing CM information database 61 and the product (content) information database 62 are just examples. Thus, items registered to these databases are not limited to the foregoing examples. In addition, in the foregoing examples, the CM information database 61, the product (content) information database 62, the image database 4, and the related information database 5 are described as independent databases. However, the structures of these databases are not limited to these examples. Instead, these four databases may be integrated into one database.

Figure 7:
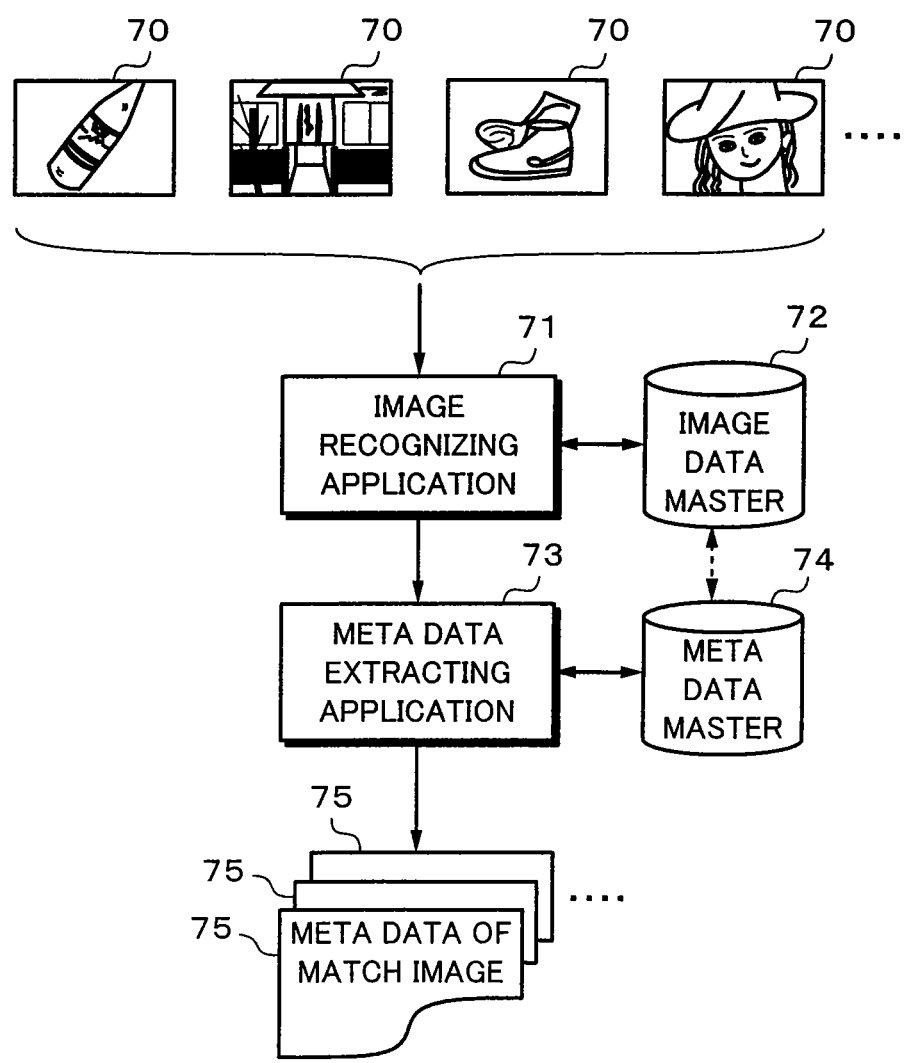
FIG. 7 is a schematic diagram describing a process that recognizes image data transmitted from a user and extracts meta data therefrom.

Next, with reference to FIG. 7, a process that recognizes image data transmitted from the user and extracting meta data therefrom will be described. In FIG. 7, an image recognizing application 71 and a meta data extracting application 73 are application programs that are executable on the server 3.

The user transmits image data 70, 70, . . . to the server 3. In the server 3, the image recognizing application 71 performs a feature extracting process for the image data 70, 70, . . . transmitted from the user and extracts feature data. The image recognizing application 71 retrieves from an image data master 72 (corresponding to the image database 4) an image that matches or is very similar to the feature data extracted from the image data 70 and outputs an image ID as a retrieved result. Character information may be output as text data. If the image data 70 contain a plurality of image elements such as a person and a product, the image recognizing application 71 outputs an image ID of an image that matches or is very similar to each of the plurality of image elements. The image recognizing application 71 supplies the image ID to the meta data extracting application 73.

The meta data extracting application 73 retrieves meta data from the meta data master 74 corresponding to the received ID and outputs meta data 75 of the match image. When the meta data extracting application 73 receives a plurality of image IDs, the meta data extracting application 73 retrieves meta data from the meta data master 74 corresponding to the plurality of image IDs and outputs meta data 75, 75, ... of the match images. The meta data master 74 corresponds to the related information database 5. The meta data correspond to related information.

Next, with reference to FIG. 8A and FIG. 8B, the image recognizing process and the meta data extracting process will be described in more detail. When moving picture data 70' composed of a plurality of frames have been transmitted from the user, the moving picture data 70' are processed as image data 70, 70, ... of individual frames. At this point, when necessary, frames may be partly removed from the moving picture data 70' in a predetermined manner so as to obtain image data 70, 70, ... for individual frames.

In this example, image elements contained in the image data 70 can be categorized as three types that are different in characteristics, namely a shape of a general article, a person (physiognomy), and characters. The image recognizing application 71 has a pattern recognizing engine 71A, a person recognizing engine 71B, and a character recognizing engine 71C to perform recognizing processes for these three different types of image elements. In addition, the image data master 72 has a general image master 72A, a person image master 72B, and a character string master 72C that support these three types of data elements. The image data 70, 70, ... are input to the pattern recognizing engine 71A, the person recognizing engine 71B, and the character recognizing engine 71C, respectively.

The pattern recognizing engine 71A performs an image recognizing process for the shape of a general article. The pattern recognizing engine 71A compares a pattern of feature points of an image registered in the general image master 72A with a pattern of feature points of the image data 70 transmitted from the user and extracts from the general image master 72A an image that matches or is similar to the image data 70, namely, an image that has a match rate higher than a predetermined value. For example, the pattern recognizing engine 71A compares feature points of a registered image with those of the image data 70 and calculates a score of a match rate of a registered image. When the score of a registered image exceeds the predetermined value, the pattern recognizing engine 71A extracts the image as a registered image with a high match rate. If the pattern recognizing engine 71A has obtained a plurality of registered images having a high match rate exceeding the predetermined value corresponding to the image data 70, the pattern recognizing engine 71A extracts all the obtained registered images from the general image master 72A.

The pattern recognizing engine 71A outputs image IDs 76, 76, ... of the registered images that have been extracted. According to these image IDs 76, 76, ... , the names of alternatives of a general article contained in the image data 70 can be obtained.

In the image data 70 transmitted from the user, an object may not have been photographed at a proper angle. Thus, when the image recognizing application 71 compares patterns, it calculates the relationship of the positions of a plurality of feature points. Thus, even if the angle of the image photographed by the user is different from the angle of a registered image by a predetermined angle, for example 45°, the pattern recognizing engine 71A can retrieve the image according to the foregoing pattern-matching method.

In addition, as was described above, since the image data 7 transmitted from the user have been gray-scaled on the user side, the image data 7 are not affected by a camera unit that has photographed it and lighting color, the image data 7 can be accurately recognized.

In addition, the pattern recognizing engine 71A compares the image data 70 transmitted from the user with a registered image, calculates a score of a match rate, and determines a match rate of a feature point according to the score. Thus, even if a part of the image data 7 is different from a registered image, the pattern recognizing engine 71A can extract the image as an image with a high match rate. Even if the image data 70 that the user photographed contains for example a signboard that a corresponding registered image does not contain, the pattern recognizing engine 71A can extract the image as an image with a high match rate. In addition, even if the range of a photographed object of the image data 70 transmitted from the user is different from that of a registered image, the pattern recognizing engine 71A can extract the registered image as an image with a high match rate.

The person recognizing engine 71B performs a person recognizing process for the image data 70. When the person recognizing engine 71B recognizes a face-like image, the person recognizing engine 71B recognizes physiognomy. Several technologies that recognize a face-like image from the image data 70 have been practically implemented. When the person recognizing engine 71B recognizes physiognomy, it assigns a plurality of feature points to a portion recognized as a human face and calculates a score of a face-like image registered in the person image master 72B according to the relationship of positions of the feature points. The person recognizing engine 71B extracts a registered image having a score that exceeds a predetermined value as a physiognomy image with a high match rate. If the person recognizing engine 71B has obtained a plurality of physiognomy images having a match rate exceeding the predetermined value according to the image data 70, the person recognizing engine 71B extracts all the plurality of registered images that have been obtained.

The person recognizing engine 71B outputs image IDs 77, 77, ... of the registered images that have been extracted. According to the image IDs 77, 77, ... , the names of alternatives of a person contained in the image data 70 can be obtained.

Several physiognomy image extracting technologies have been practically implemented. For example, a face authenticating technology using both Gabor wavelet transform and graph matching method or another face authenticating technology using both perturbation space method and adaptive regional blend matching method may be used.

Like the foregoing, since the image data 70 transmitted from the user have been gray-scaled on the user side, the image data 7 are not affected by a camera unit that has photographed it and lighting color, the image data 7 can be accurately recognized.

In addition, the pattern recognizing engine 71A compares the image data 70 transmitted from the user with a registered image, calculates a score of a match rate, and determines a match rate according to the score. Thus, even if a part of the image data 70 is different from a registered image, the person recognizing engine 71B can extract the image as an image with a high match rate. Even if the image data 70 that the user photographed contains for example a person who wears a cap and glasses that a corresponding registered image does not contain, the person recognizing engine 71B can extract the image as an image with a high match rate.

The character recognizing engine 71C performs a character recognizing process for the image data 70 and extracts character information. Character information can be extracted using an ordinary OCR (Optical Character Reader) technology. The character string master 72C may compose for example a word dictionary and detect words according to detected characters. The character recognizing engine 71C references the character string master 72C according to the recognized results and determines whether the image data 70 contain a character string having a match rate exceeding a predetermined value. When the image data 70 contain a character string that matches a character string registered in the character string master 72C, the character recognizing engine 71C outputs character string data 78. If the character recognizing engine 71C has obtained a plurality of character strings having a match rate exceeding the predetermined value from the image data 70, the character recognizing engine 71C outputs the plurality of character string data 78, 78, . . . as alternatives.

Since the image IDs 76, 76, . . . that have been output from the pattern recognizing engine 71A, the image IDs 77, 77, . . . that have been output from the person recognizing engine 71B, and the character strings 78, 78, . . . as alternatives that have been output from the character recognizing engine 71C may be alternatives of one image, it can be said that they are ambiguous results. A meta data extracting engine 73A retrieves meta data 75, 75, . . . from the meta data master 74 according to the plurality of recognized ambiguous results recognized by the engines 71A, 71B, and 71C. The meta data extracting engine 73A determines that the meta data 75, 75, . . . that have a common part correspond to an image contained in the image data 70.

When the moving picture data 70' has been transmitted from the user and divided into the image data 70, 70, . . . according to frames, the meta data extracting engine 73A determines that a recognized result contained in many of the image data 70, 70, . . . correspond to an image contained in the moving picture data 70'. For example, the meta data extracting engine 73A determines that a recognized result contained in the image data 70, 70, . . . of frames with a ratio exceeding a predetermined value correspond to an image contained in the moving picture data 70'.

Figure 9E:
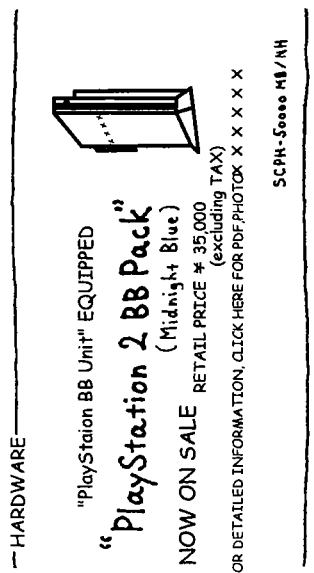

FIG. 9A, FIG. 9B, FIG. 9C, FIG. 9D, and FIG. 9E show examples of information obtained from the image data 70 by the engines 71A, 71B, and 71C. FIG. 9A shows an example of which the image data 70 contain a logo mark image and a text image as image elements. The pattern recognizing engine 71A recognizes a logo mark image. However, the pattern recognizing engine 71A does not recognize the shape of an article. Since the image data 70 do not contain a face-like image, the person recognizing engine 71B does not output a recognized result. The character recognizing engine 71C recognizes a character string at a lower portion of the logo mark image.

FIG. 9B is an example of which the image data 70 contain an image of an article (shoes) as an image element and the article is accompanied by a logo mark image. The pattern recognizing engine 71A recognizes that the shape of the article is shoes. In addition, the pattern recognizing engine 71A recognizes a logo mark image on the front surface of the article recognized as shoes. Since the image data 70 do not contain characters, the character recognizing engine 71C outputs "none" as a recognized result. FIG. 9C is an example of which the image data 70 contain a part of a building as an image element and its appurtenance describes a logo mark image. The pattern recognizing engine 71A recognizes that the image data 70 contain an image element that is a building. In addition, the pattern recognizing engine 71A recognizes that the building contains a logo mark image. The pattern recognizing engine 71A may identify the building with an image element of the recognized building. In any of FIG. 9B and FIG. 9C, since the image data 70 do not contain a face-like image, the person recognizing engine 71B does not recognize the image data 70. In the examples shown in FIG. 9B and FIG. 9C, the pattern recognizing engine 71A may recognize image elements in the reveres order.

FIG. 9D is an example of which the image data 70 contain an image of a person as an image element. The person recognizing engine 71B recognizes a face-like image contained in the image data 70. In addition, the person recognizing engine 71B recognizes physiognomy. Since the image data 70 do not contain characters, the character recognizing engine 71C does not output a meaningfully recognized result. Since the image data 70 do not contain an image element other than a person and an article she wears, the pattern recognizing engine 71A does not output a meaningfully recognized result. In the example shown in FIG. 9D, the pattern recognizing engine 71A may output a recognized result of an article that a person wears.

FIG. 9E is an example of which the image data 70 contain an image of an article and a character string as image elements. The front surface of the article contains a logo mark image. The character string is hand-written or written with a hand-written style typeface. The pattern recognizing engine 71A recognizes that an article contained in an image element of the image data 70 is a game machine made by OO company. In addition, the pattern recognizing engine 71A recognizes a logo mark image on the front surface of the recognized article. The character recognizing engine 71C recognizes a character string contained in the image data 70. Thus, even if characters are not perfectly recognized because they are written with a hand-written style typeface, a correct character string can be estimated with the word dictionary of the character string master 72C. Since the image data 70 do not contain a face-like image, the person recognizing engine 71B does not recognize the image data 70.

Figure 8A:
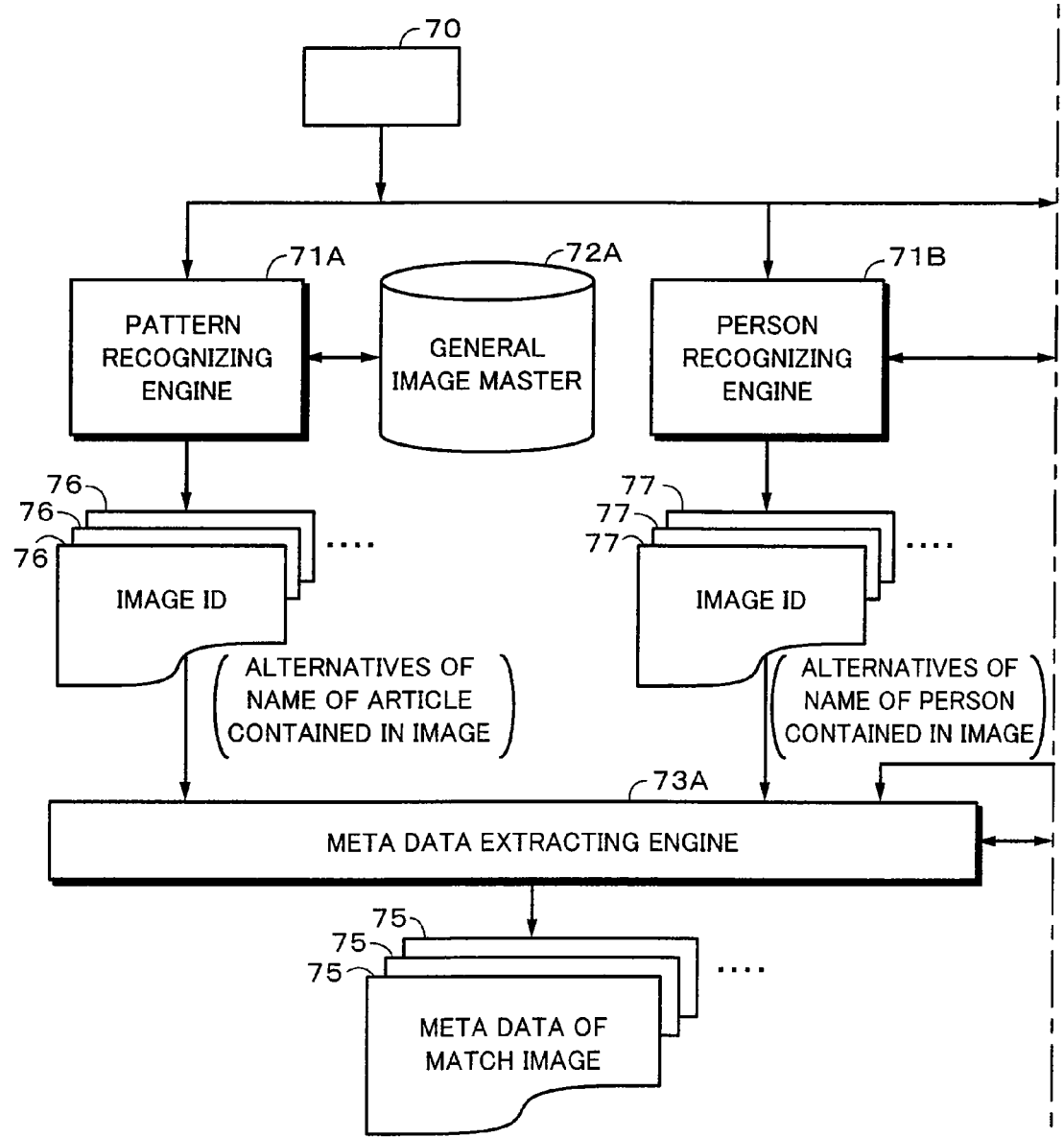
FIG. 8A and FIG. 8B are schematic diagrams describing an image recognizing process and a meta data extracting process in more detail.
Figure 8B:
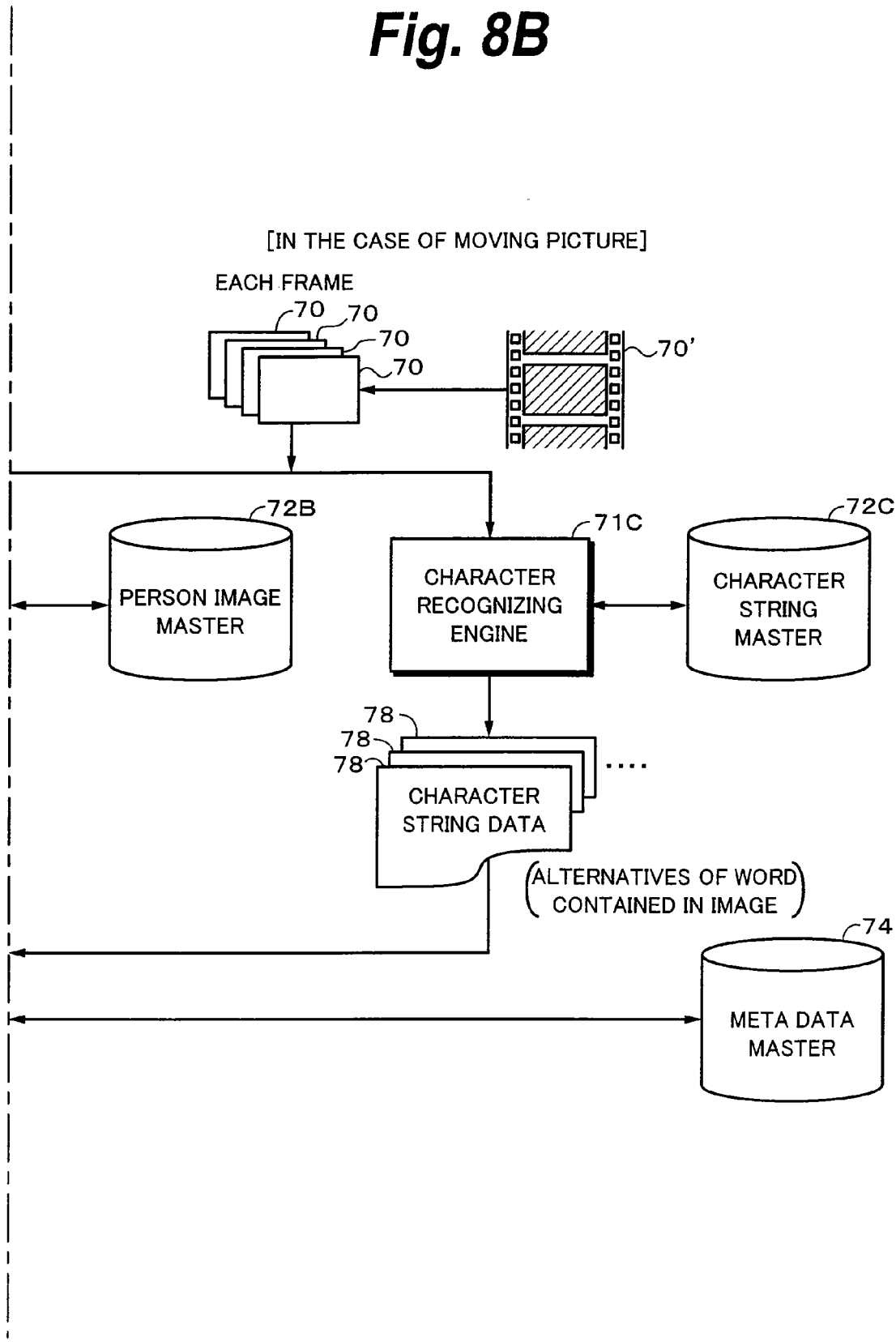
Figure 10C:
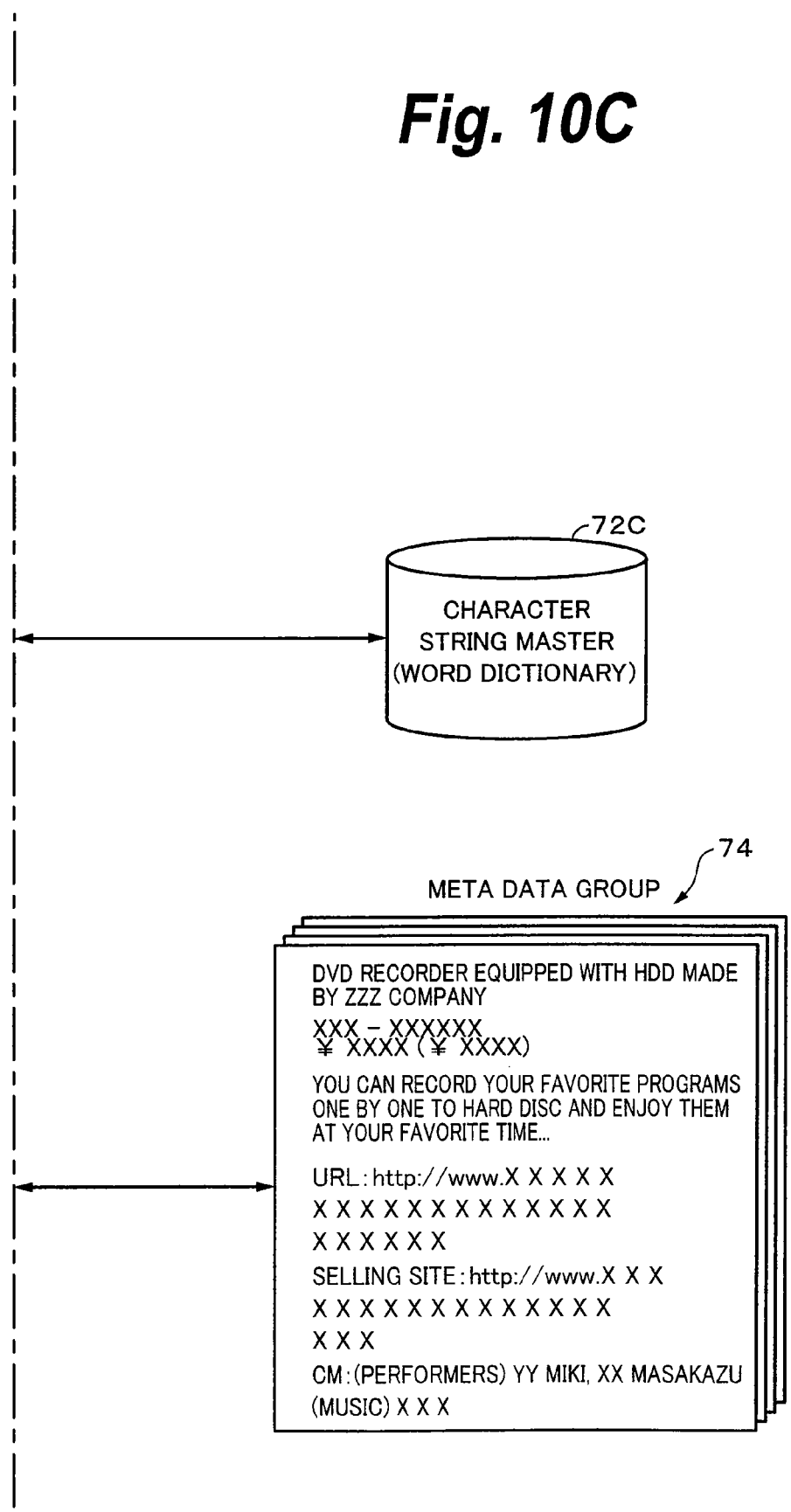
Figure 13A:
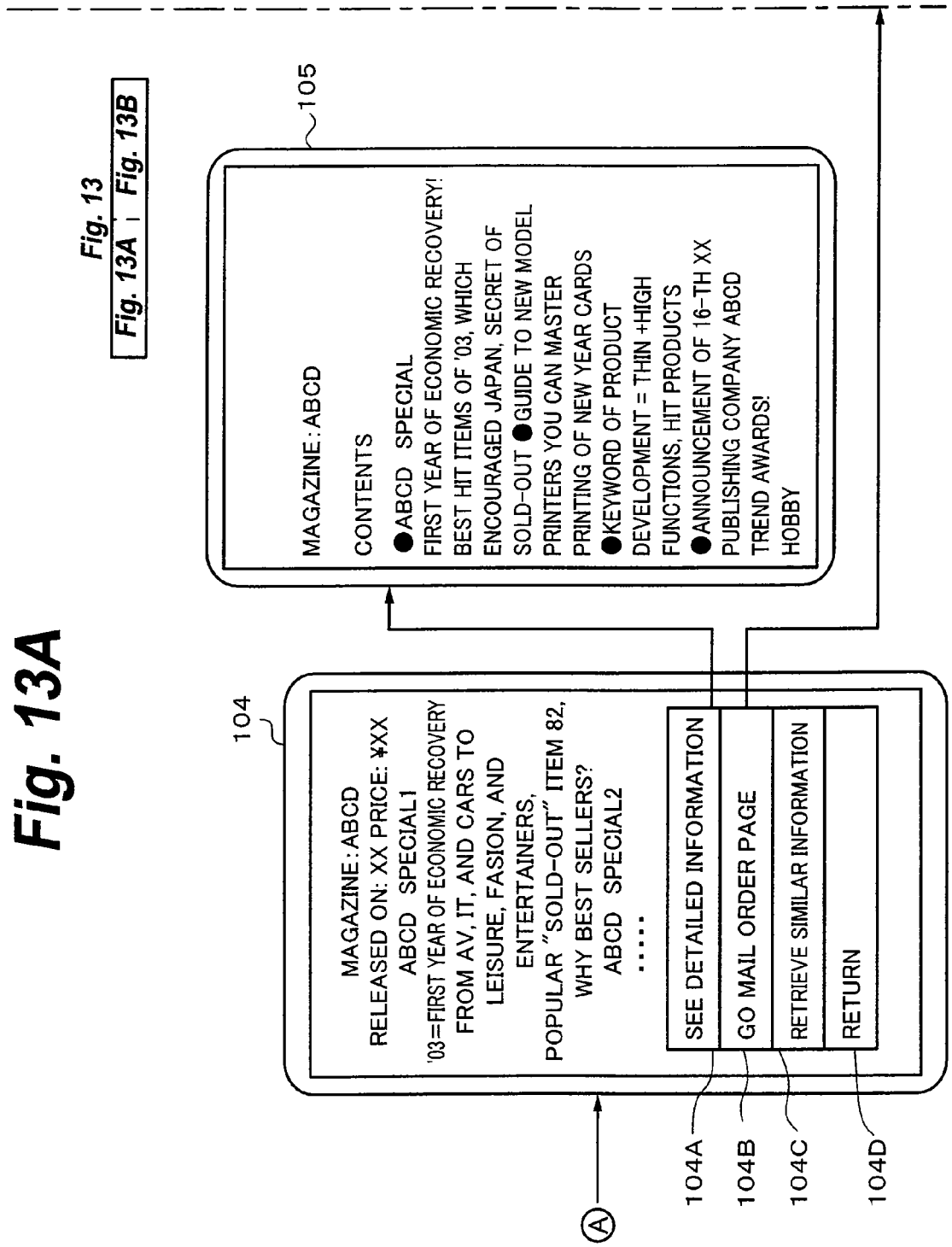
Figure 14:
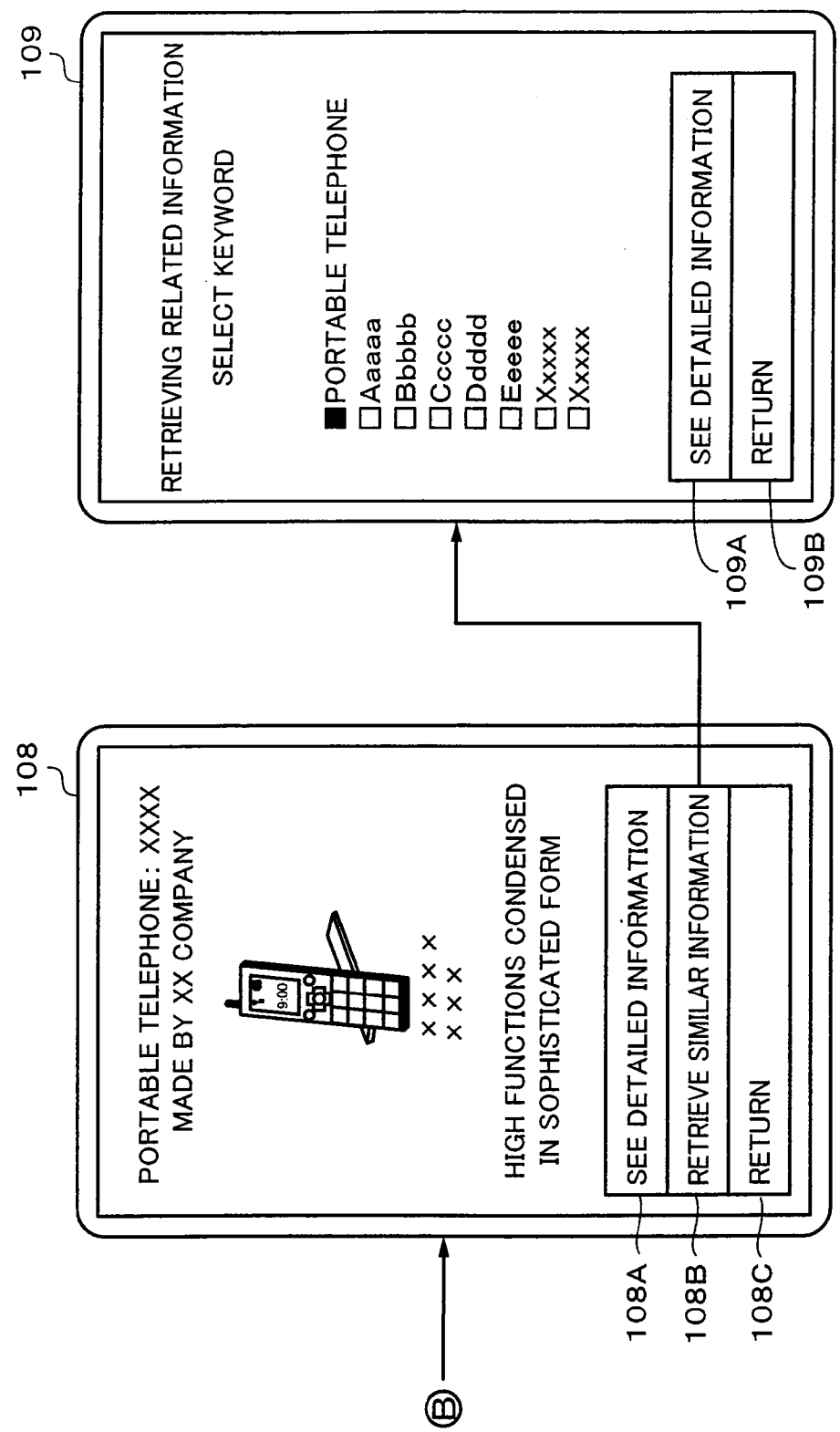
FIG. 14 is a schematic diagram describing an example of which a service is received according to image data of an attractive photo or article in a magazine or a newspaper.

FIG. 10A, FIG. 10B, and FIG. 10C show a more specific example of the image recognizing process and the meta data extracting process shown in FIG. 8A and FIG. 8B. It is assumed that the image data 70 transmitted from the user contains image elements of a plurality of human images, logo mark images, and product images. The image data 70 are supplied to the pattern recognizing engine 71A, the person recognizing engine 71B, and the character recognizing engine 71C.

The pattern recognizing engine 71A retrieves images from the general image master 72A according to feature data of the image data 70. Various types of product images, various types of logo mark images, partial or whole building images (not shown), and so forth are registered in the general image master 72A as registered images as shown in FIG. 10A, FIG. 10B, and FIG. 10C. The pattern recognizing engine 71A compares feature data of the image data 70 with feature data of a registered image of the general image master 72A and retrieves a registered image that matches or is very similar to a part or whole of the image data 70 from the general image master 72A. In the examples shown in FIG. 10A, FIG. 10B, and FIG. 10C, the logo mark image "ABC" and the image of the DVD recorder made by ZZZ company contained in the image data 70 are retrieved from the general image master 72A. Image IDs 76, 76, . . . of the retrieved images are supplied to the meta data extracting engine 73.

In FIG. 10A, FIG. 10B, and FIG. 10C, for convenience, as the image data IDs 76, 76, . . . , the names of the corresponding article (DVD recorder made by ZZZ company) and logo mark ("ABC") are described.

The person recognizing engine 71B recognizes a person according to feature data of the image data 70. The person recognizing engine 71B retrieves a face-like image from the person image master 72B and recognizes physiognomy. As shown in FIG. 10A, FIG. 10B, and FIG. 10C, physiognomy images of various persons are registered in the person image master 72B. The person recognizing engine 71B compares the recognized face-like image with a physiognomy image registered in the person image master 72B and retrieves a registered physiognomy image that matches or is very similar to the face-like image therefrom. In the example shown in FIG. 10A, FIG. 10B, and FIG. 10C, two human images are contained in the image data 70 and retrieved from the person image master 72B. Image IDs 77, 77, . . . of the retrieved images are supplied to the meta data extracting engine 73.

In FIG. 10A, FIG. 10B, and FIG. 10C, for convenience, as image data IDs 77, 77, . . . , the names ("XX MASAKAZU" and "YY MIKI") of the corresponding persons are described.

The character recognizing engine 71C performs a character recognizing process for the image data 70 and detects characters from the image data 70. In the example shown in FIG. 10A, FIG. 10B, and FIG. 10C, "DVD" and "recorder" are retrieved as character strings contained in the image data 70. The retrieved character strings 78, 78, . . . are supplied to the meta data extracting engine 73.

The meta data extracting engine 73 identifies the contents of the image data 70 according to the image IDs 76, 76, . . . and the image IDs 77, 77, . . . supplied from the pattern recognizing engine 71A and the person recognizing engine 71B and character strings supplied from the character recognizing engine 71C.

In the example shown in FIG. 10A, FIG. 10B, and FIG. 10C, the meta data extracting engine 73 retrieves meta data from the meta data master 74 with six keywords of two image IDs 76, 76 according to the recognized results of the pattern recognizing engine 71A, two image IDs 77, 77 according to the recognized results of the person recognizing engine 71B, and two character strings 78, 78 according to the recognized results of the character recognizing engine 71C.

When meta data that are in common with (or that include all) these six keywords have been registered in the meta data master 74, the meta data extracting engine 73 outputs the meta data as meta data corresponding to the image data 70 transmitted from the user. In the example shown in FIG. 10A, FIG. 10B, and FIG. 10C, meta data that contain all the logo mark image "ABC", the image of the DVD recorder made by ZZZ company, the persons "XXX MASAKAZU" and "YY MIKI", and the character strings "DVD" and "recorder" are meta data corresponding to the image data 70.

Instead, meta data 75, 75, . . . of the logo mark image "ABC", the image of the DVD recorder made by ZZZ company, the persons "XX MASAKAZU" and "YY MIKI", and the character strings "DVD" and "recorder" may be separately output.

In the example shown in FIG. 10A, FIG. 10B, and FIG. 10C, meta data corresponding to the image data 70 contain a URL of a web site that publishes the model number, price, introduction, and information of the DVD recorder made by ZZZ company and a URL of a web site that sells the product. When the image data 70 are an image of a commercial of a television broadcast, meta data corresponding to the image data 70 contain the names of performers, song name, information about performers of the song, and so forth. When meta data correspond to for example a product image, meta data 75, 75, . . . of image elements contain a URL of a web site that publishes the model number, price, introduction, and information of a product and a URL of a web site that sells the product. When meta data correspond to a person, the meta data contain the name of the person and profile thereof.

According to the embodiment of the present invention, even if the meta data extracting engine 73 cannot recognize some (for example, one, two, or three) of the six input keywords, the meta data extracting engine 73 can estimate image elements that are contained in the image data 70 and that the engines 71A, 71B, and 71C have not recognized and output the estimated image elements.

Now, it is assumed that the logo mark image "ABC", the person "XX MASAKAZU", and the person "YY MIKI" of the foregoing six keywords obtained as the searched results of the engines 71A, 71B, and 71C were recognized with a high match rate and the other three keywords were not recognized because their match rate was low. In this case, the meta data extracting engine 73 AND-retrieves meta data from the meta data master 74 with the recognized three keywords. It can be expected that the meta data extracting engine 73 can obtain meta data for an advertisement image of the DVD recorder made by ZZZ company with a high probability. The meta data extracting engine 73 references a portion other than information corresponding to the recognized image elements of the meta data of the image data 70. As a result, the meta data extracting engine 73 can obtain meta data of image elements that were not recognized by the engines 71A, 71B, and 71C.

Next, services that can be provided according to the embodiment of the present invention will be described. According to the present invention, as was described above, the server 3 pre-registers image data and meta data thereof to databases. The server 3 performs the image recognizing process for image data transmitted from the user, references the databases, and extracts meta data therefrom. According to the present invention, using meta data, various services can be provided to the user.

Next, with reference to FIG. 11A and FIG. 11B, these services will be described using more specific examples. The user photographs an attractive photo or article in a magazine or a newspaper with the portable camera telephone terminal 1, the digital camera 2, or the like and transmits the photo or article as image data 7A to the server 3. The server 3 performs an image recognizing process for the received image data 7A, recognizes character information, a logo mark image, and an image of an article contained as image elements in the image data 7A and extracts meta data corresponding to individual image elements of the image data 7A from the meta data master 74. Thus, the server 3 can provide services for a news flash of the photographed article, information about a product introduced in the photographed magazine, and mail order of the product. When the photographed magazine or newspaper describes information about for example resort information, ticket sales information, and so forth, the server 3 can provide these information to the user.

Likewise, when image data 7B photographed by the user and transmitted to the server are a part of a building such as a restaurant, the server 3 recognizes the shape of the building, a logo mark image, and so forth contained as image elements in the image data 7B, identifies for example the name of the restaurant, and provides other information about the restaurant such as menu information, business hours, photos of the inside of the restaurant, and reservation information (telephone number) to the user along with the restaurant name.

When image data 7C photographed by the user and transmitted to the server 3 contain a label of a drink for example wine or a food as an image element, the server 3 recognizes a logo mark image and character information of the label image of the image data 7C, identifies for example the name of the wine, and provides information about the taste of the wine, information about retailers, information about prices, and so forth to the user. In addition, the server may provide a wine order service to the user.

When image data 7D photographed by the user and transmitted by the server 3 contain a person as an image element, the server 3 recognizes the person contained in the image data 7D and identifies the name of the person. When the person is for example an athlete, the server 3 can provide information about the team to which the athlete belongs, the score of a match of the team, and so forth to the user along with the information about the athlete. When there are character goods of the athlete and the team, the server 3 may provide a character goods order service to the user.

When image data 7E photographed and transmitted to the server 3 by the user contain an advertisement image of a new release CD (Compact Disc) or a new release movie as image elements, the server 3 identifies the title of the CD that will be released, the artist names, and the movie title according to the advertisement image contained in the image data 7E. When the image data 7E are an advertisement image of for example a new release movie, the server can provide the story of the movie, information about the performers, information about the director, and information about theaters and show times to the user along with the title name. In addition, the server 3 may provide a movie ticket order service to the user. When a DVD (Digital Versatile Disc) that contains the movie is released, the server 3 may provide a DVD order service to the user.

When image data 7F photographed and transmitted to the server 3 by the user contain a product advertisement image of a poster or a commercial of a television broadcast, the server 3 identifies an image of the product contained in the image data 7F, identifies the name of the product, and provides information about the product and a product order service to the user. When the advertisement image contains for example an image of a person as an image element as well as the product as an advertisement object, the server can recognize the person and provide information about the person to the user. When the advertisement image is a commercial of a television broadcast, the server can provide music information used in the commercial to the user.

Next, with reference to FIG. 12A, FIG. 12B, FIG. 13A, FIG. 13B, FIG. 14, FIG. 15A, FIG. 15B, FIG. 16A, FIG. 16B, FIG. 17A, FIG. 17B, FIG. 18A, FIG. 18B, FIG. 19A, FIG. 19B, FIG. 20A, FIG. 20B, FIG. 21A, FIG. 21B, FIG. 22A, FIG. 22B, FIG. 23A, FIG. 23B, FIG. 24A, FIG. 24B, and FIG. 25, examples of an interface on the user side shown in FIG. 11A and FIG. 11B will be described. In the following examples, it is assumed that the user transmits image data 10 photographed by the portable camera telephone terminal 1 to the server 3 through the Internet 2 and the server 3 provides a service corresponding to the image data 10 to the portable camera telephone terminal 1 that transmitted the image data 10. In FIG. 12A, FIG. 12B, FIG. 13A, FIG. 13B, FIG. 14, FIG. 15A, FIG. 15B, FIG. 16A, FIG. 16B, FIG. 17A, FIG. 17B, FIG. 18A, FIG. 18B, FIG. 19A, FIG. 19B, FIG. 20A, FIG. 20B, FIG. 21A, FIG. 21B, FIG. 22A, FIG. 22B, FIG. 23A, FIG. 23B, FIG. 24A, FIG. 24B, and FIG. 25, letters A to I continue to the same letters A to I.

Now, it is assumed that the server 3 has created a web site that provides to the user a service corresponding to the image data 7 transmitted from the user and he or she can access the web site through the Internet 2. The server 3 transmits the URL of the web site to the portable camera telephone terminal 1 that transmitted the image data 7 using for example an electronic mail function.

On the other hand, the portable camera telephone terminal 1 has an electronic mail transmitting and receiving function and an accessing function for web sites on the Internet 2. The portable camera telephone terminal 1 has browser software with which the user can browse web sites. When the user designates the URL of a web site, he or she can access the web site. At this point, the user can select an item with keys on the portable camera telephone terminal 1, input data, and transmit them. When the user accesses a URL received by the portable camera telephone terminal 1, he or she can receive a service that the server 3 provide to him or her. As the interface on the user side, the user can use a personal computer that can communicate with the Internet 2 instead of the portable camera telephone terminal 1. In this case, the user may transmit the image data 7 from the personal computer to the server 3. Instead, the user may transmit the image data 7 to the server 3 by the portable camera telephone terminal 1 and receive the service from the server 3 by the personal computer.

FIG. 12A, FIG. 12B, FIG. 13A, FIG. 13B, and FIG. 14 correspond to the example of the image data 7A. In this example, the user photographs an attractive photo or article in a magazine or a newspaper, transmits it to the server 3, and receives a service from the server 3. In FIG. 12A and FIG. 12B, the user photographs the cover of the magazine that contains the attractive photo or article with the portable camera telephone terminal 1, attaches the photographed image data 7A to electronic mail, and transmits the electronic mail to the server 3. In this case, the image data 7A may not be a photo of the magazine, but a copy thereof, image data of a television broadcast, or the like. A screen 101 is an example of a screen of a display section of the portable camera telephone terminal 1. Hereinafter, an example of a screen is an example of a screen of the display section of the portable camera telephone terminal 1. When the user transmits the image data 7A, he or she does not need to input data in the subject field. When the user presses a send button of the portable camera telephone terminal 1, the image data 7A are transmitted to the server 3.

The server 3 receives the image data 7A, performs an image recognizing process for the image data 7A, and identifies image elements contained therein, and extracts meta data corresponding to the identified image elements. Thereafter, the server 3 creates a web site that provides a service according to the extracted meta data to the user, and returns electronic mail describing the URL of the web site to the portable camera telephone terminal 1. As shown in a screen 102, the returned electronic mail describes a URL 102A of the web site that provides the service to the user. When the user designates the URL 102A in a predetermined manner, the portable camera telephone terminal 1 accesses the web site and displays a screen 103.

On the screen 103, an image 7A' of the magazine of the image data 7A and buttons 103A and 103B appear. In the example of which the user photographed a magazine 100, the server 3 recognizes a logo mark image of a magazine name "ABCD" and a portable telephone terminal from a photo of the cover of the magazine 100 and provides a service regarding the magazine "ABCD" and a service regarding the portable telephone terminal to the user.

The user can select buttons appearing on the screen by a predetermined operation on the portable camera telephone terminal 1. When the user confirms a selected button by a predetermined operation, selection information according to the selected button is transmitted to the server 3. In the following description, an operation that the user selects a button appearing on a screen by a predetermined manner and confirms the selected button is sometimes referred to as "press a button". The server 3 transmits data according to the received selection information to the portable camera telephone terminal 1. The portable camera telephone terminal 1 displays a screen according to the received data.

When the user wants to receive the service regarding the magazine "ABCD" and he or she selects a button 103A, selection information of the button 103A is transmitted to the server 3. As a result, the screen 103 is changed to a screen 104 shown in FIG. 13A and FIG. 13B. An outlined description of the magazine "ABCD" appears on the screen 104 according to meta data of the magazine "ABCD". In addition, buttons 104A, 104B, 104C, and 104D appear on the screen 104. When the user selects the button 104A, the portable camera telephone terminal 1 displays a screen 105. The user can know more detailed information about the magazine "ABCD" on the screen 105.

When the user presses the button 104B on the screen 104, it is changed to a screen 106. The user can mail-order the magazine "ABCD" on the screen 106. When the user inputs necessary information and presses a button 106A on the screen 106, it is changed to a screen 107 on which he or she can confirm the input information. When the user presses a button 107A, he or she can pay for the mail order. When the user presses the button 104C on the screen 104, it is changed to a screen on which he or she can retrieve similar information.

When the user presses the button 103B on the screen 103 shown in FIG. 12A and FIG. 12B, the screen 103 is changed to a screen 108 (refer to FIG. 14) on which he or she can receive a service regarding the portable telephone terminal recognized from the image data 7A of the photographed magazine 100. Outlined information of the portable telephone terminal in the magazine appears on the screen 108 according to meta data. In addition, buttons 108A, 108B, and 108C appear on the screen 108. When the user presses the button 108A, the portable camera telephone terminal 1 displays a screen (not shown) on which he or she can browse more detailed information about the portable telephone terminal.

When the user presses the button 108B on the screen 108, it is changed to a screen 109 on which he or she can retrieve similar information. For example, the server 3 retrieves meta data with a keyword of "portable telephone terminal" and extracts alternatives of similar information. The alternatives of similar information appear on the screen 109. When the user selects an alternative and presses the button 109A on the screen 109, it is changed to a screen (not shown) on which he or she can browse the selected alternative. The selected alternative has the same structure as the portable telephone terminal appearing on the screen 108, but different therefrom in model. When the user presses a predetermined button on the screen, it is changed to a screen on which he or she can browse detailed information or retrieve similar information.

In the foregoing description, for example an information screen and a mail order screen that appear after the screen 104 may be provided by the server 3. Instead, an original seller or the like of the product may provide these screens as a web site on the Internet 2. For example, the button 103A on the screen 103 may be linked to a web site of the magazine "ABCD" of its publisher. When the button 103A is pressed, the web site of the magazine "ABCD" may be accessed.

The button 104D on the screen 104, the button 106B on the screen 106, the button 107B on the screen 107, the button 108C on the screen 108, and the button 109B on the screen 109 are buttons with which the current screen is returned to the immediately preceding screen.

FIG. 15A, FIG. 15B, FIG. 16A, and FIG. 16B show an example of the foregoing image data 7B. In this case, the user photographs the whole or a part of a building, transmits the photographed image to the server 3, and receives a service therefrom. In FIG. 15A and FIG. 15B, the user photographs a portion about an entrance of an attractive restaurant "XXX" with the portable camera telephone terminal 1, attaches the photographed image data 7B to electronic mail on the screen 101, and transmits the electronic mail to the server 3. The image data 7B may not be a photo of the restaurant "XXX", but a copy of a magazine, image data of a television broadcast, or the like.

The server 3 performs an image recognizing process and a meta data extracting process for the received image data 7B, identifies image elements contained in the image data 7B, and retrieves meta data corresponding to the image elements. The server 3 creates a web site that provides a service according to the extracted meta data to the user and returns electronic mail describing the URL of the web site to the portable camera telephone terminal 1. When the user designates the URL 102A appearing on the screen 102 in a predetermined manner, the portable camera telephone terminal 1 accesses the web site and displays a screen 111.

An image 7B' of the restaurant "XXX" according to the image data 7B and a button 111A appear on the screen 111. When the user presses the button 111A on the screen 111, it is changed to a screen 112 shown in FIG. 16A and FIG. 16B. An outlined description of the restaurant "XXX" and buttons 112A, 112B, 112C, and 112D appear on the screen 112. When the user presses the button 112A on the screen 112, it is changed to a screen 113. Detailed information about the restaurant "XXX" appears on the screen 113.

When the user presses the button 112B on the screen 112, it is changed to a screen 114 on which a map indicating the location of the restaurant "XXX" appears. When the user presses a button 114A on the screen 114, the user can call the restaurant "XXX" with the telephone function of the portable camera telephone terminal 1. The user can talk to a person of the restaurant "XXX" for a reservation or the like. Instead, when the user selects a telephone number portion on the screen 112, he or she can call the restaurant "XXX" using the telephone function of the portable camera telephone terminal 1.

When the user presses the button 112C on the screen 112, it is changed to a screen on which he or she can retrieve similar information. For example, the server 3 retrieves meta data according to the category (for example, "Japanese restaurants") to which the restaurant "XXX" belongs. A list of restaurants that belong to categories similar to the category of the restaurant "XXX" appears on the screen.

In the foregoing example, information appears after for example the screen 112 may be provided by the server 3. Instead, the information may be provide by the restaurant "XXX" side as a web site on the Internet 2. In this case, when the user presses the button 111A on the screen 111, the portable camera telephone terminal 1 is linked to the web site.

The button 112D on the screen 112 and the button 114B on the screen 114 are buttons with which the current screen is returned to the immediately preceding screen.

FIG. 17A, FIG. 17B, FIG. 18A, and FIG. 18B show an example of the foregoing image data 7C. In this case, the user photographs for example a label of a wine bottle, transmits the photographed image to the server 3, and receives a service therefrom. In FIG. 17A and FIG. 17B, the user photographs a label of an attractive wine bottle with the portable camera telephone terminal 1, attaches the photographed image as the image data 7C to electronic mail on the screen 101, and transmits the electronic mail to the server 3. The image data 7C may not be a photo of the label, but a photo of a magazine, image data of a television broadcast, or the like.

The server 3 performs an image recognizing process and a meta data extracting process for the received image data 7C, identifies image elements contained in the image data 7C, and retrieves meta data corresponding to the image elements. The server 3 creates a web site that provides a service according to the meta data to the user and returns electronic mail describing the URL of the web site to the portable camera telephone terminal 1. When the user designates a URL 102A of the return electronic mail on the screen 102 in a predetermined manner, the portable camera telephone terminal 1 accesses the web site and displays a screen 120.

An image 7C' of the label of the image data 7C and a button 120A appear on the display screen 120. When the user presses the button 120A on the screen 120, it is changed to a screen 121 shown in FIG. 18A and FIG. 18B. An outlined description of the wine and buttons 121A, 121B, 121C, and 121D appear on the screen 121. When the user presses the button 121A on the screen 121, it is changed to a screen 122 on which detailed information of the wine appears.

When the user presses the button 121B on the screen 121, it is changed to a screen 123 on which he or she can mail-order the wine. When the user inputs necessary information on the screen 123 and presses the button 123A, the screen 123 is changed to a screen 124 on which he or she can confirm the input information. When the user presses the button 124A on the screen 124, he or she can pay for the mail order.

When the user presses the button 121C on the screen 121, it is changed to a screen on which similar information appears. For example, the server 3 retrieves meta data of other wines according to the meta data of the wine and obtains a list of wines similar to the wine. The list of similar wines appears on the screen.

Information that appears after for example the screen 121 may be provided by the server 3. Instead, the information may be provided by the original seller, importer, or the like of the wine as a web site on the Internet 2. In this case, when the user presses the button 120A on the screen 120, the portable camera telephone terminal 1 is linked to the web site.

The button 121D on the screen 121, the button 123B on the screen 123, and the button 124B on the screen 124 are buttons with which the current screen is changed to the immediately preceding screen.

Figure 19B:
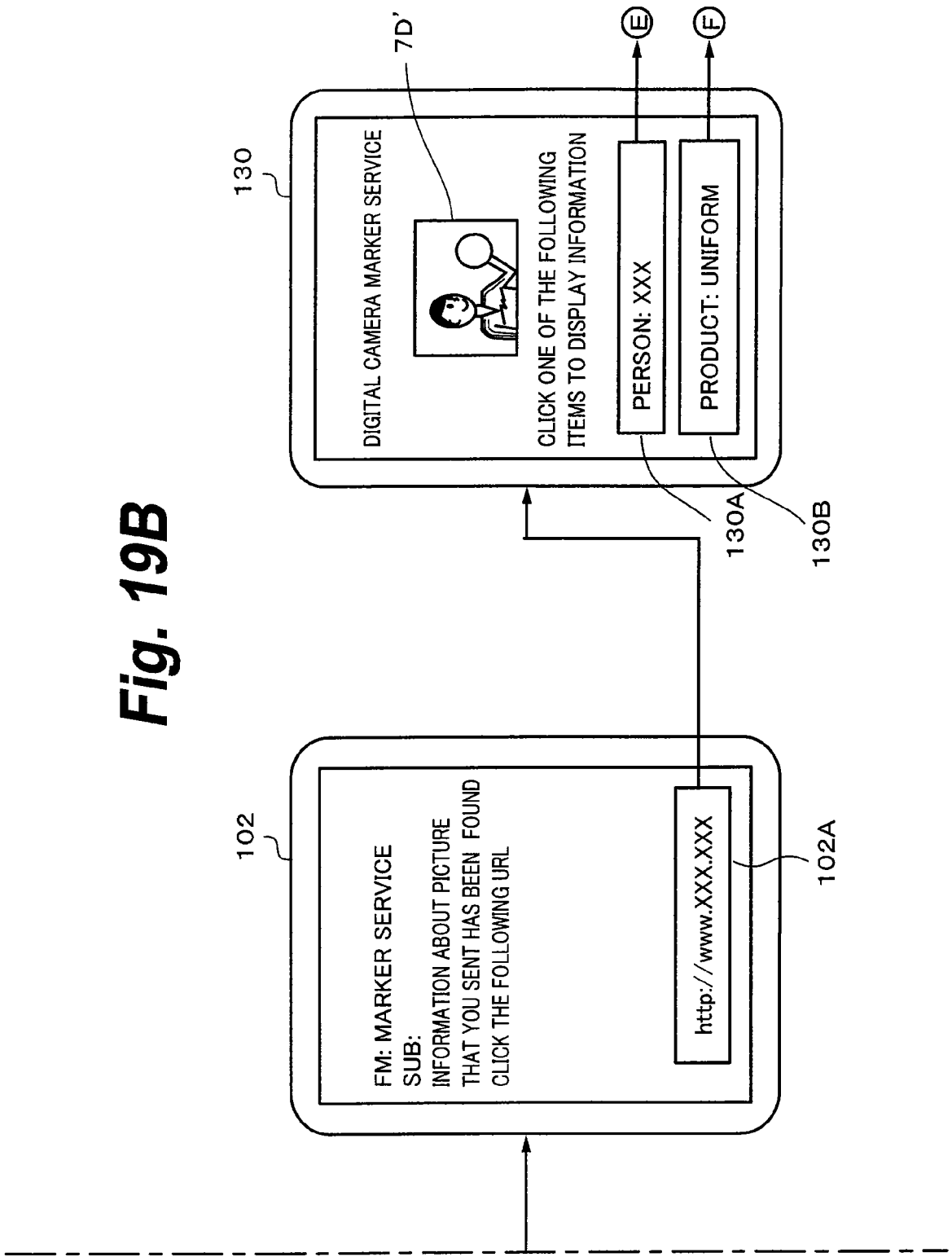
Figure 22B:
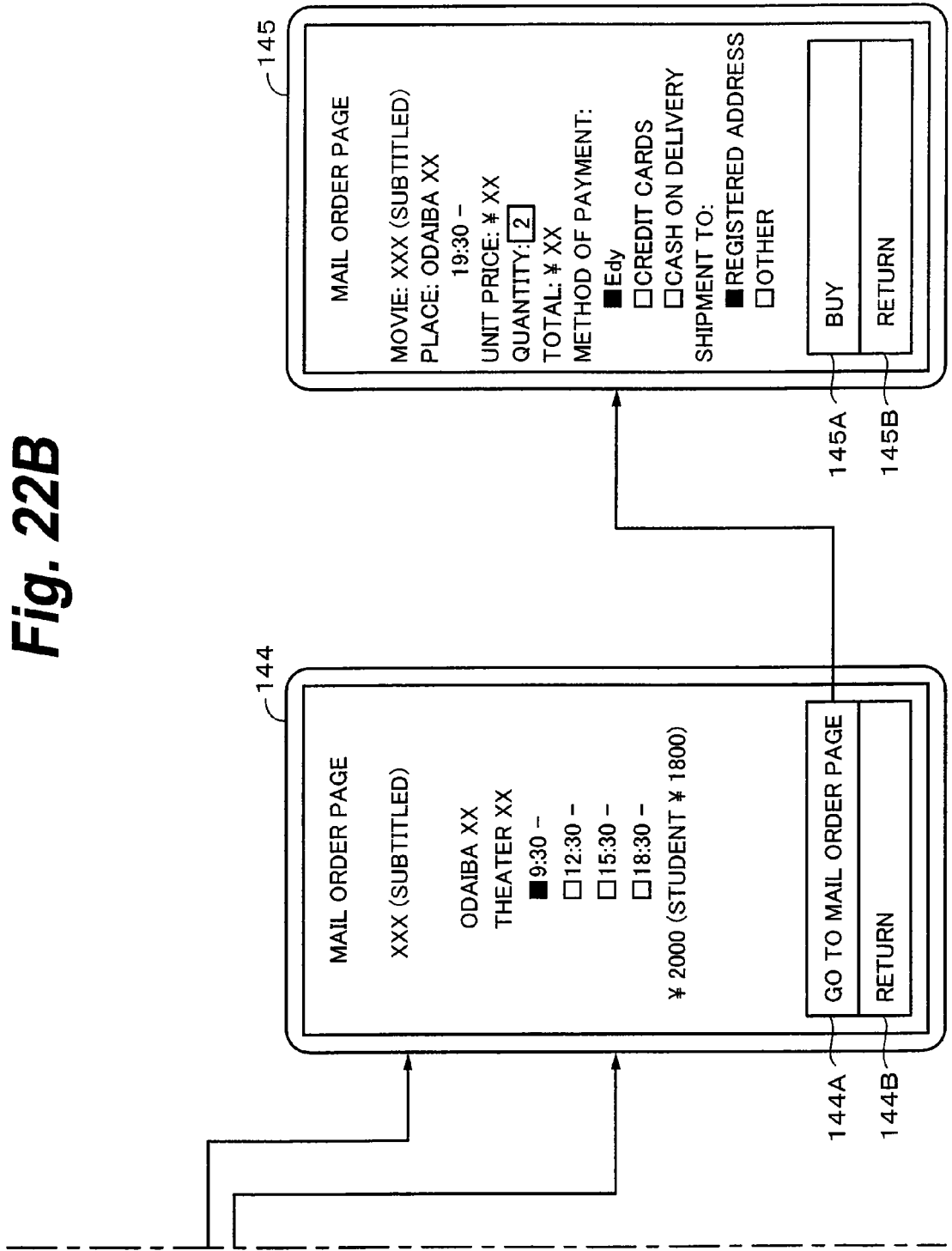

FIG. 19A, FIG. 19B, FIG. 20A, and FIG. 20B show an example of the image data 7D. In this case, the user photographs a person (professional athlete), transmits the photographed image to the server 3, and receives a service therefrom. In FIG. 19A and FIG. 19B, the user photographs an attractive athlete with the portable camera telephone terminal 1, attaches the photographed image as the image data 7D to electronic mail on the screen 101, and transmits the electronic mail to the server 3. The image data 7D may not be a photo of a person, but image data of a television broadcast, a photo of a magazine, or the like.

The server 3 performs an image recognizing process, a physiognomy process, and a meta data extracting process for the received image data 7D, identifies a person of an image element contained in the image data 7D, and retrieves meta data corresponding to the person. The server 3 creates a web site that provides a service according to the meta data to the user and returns electronic mail describing the URL of the web site to the portable camera telephone terminal 1. When the user designates a URL 102A of the return electronic mail on the screen 102 in a predetermined manner, the portable camera telephone terminal 1 accesses the web site and displays a screen 130.

An image 7D' corresponding to the image data 7D and buttons 130A and 130B appear on the screen 130. In the example of which the user photographed an athlete, the server 3 recognizes the image of the athlete and a logo mark image of a uniform that he wears and provides a service regarding the athlete and a service regarding the uniform that he wears to the user.

When the user wants to receive the service regarding the athlete and the user presses the button 130A on the screen 130, it is changed to a screen 131 (refer to FIG. 20A). An outlined description about the athlete appears on the screen 131. In addition, buttons 131A, 131B, 131C, and 131D appear on the screen 131. When the user presses the button 131A on the screen 131, it is changed to a screen 132 on which detailed information about the athlete appears on the screen 132.

When the user presses the button 131C on the screen 131, it is changed to a screen 133 on which similar information is retrieved. For example, the server 3 retrieves meta data with a keyword of the name of the athlete. Alternatives of similar information appear on the screen 133. In this example of which an object is an athlete, information about a game of the team to which the athlete belongs and information about other athletes of the team appear as similar information on the screen 133. When the user selects his or her desired similar information and presses the button 133A on the screen 133, it is changed to a screen corresponding to the selected similar information.

Wallpaper image data using photographed image data of the athlete (image data used as a background of a screen of the display section) and call alert audio data of his voice may be used as similar information. In this case, when the user presses the button 133A on the screen 133, it is changed to a screen (not shown) on which the portable camera telephone terminal 1 downloads the wallpaper image data and call alert audio data through the Internet 2.

When the user presses the button 131B on the screen 133, it is changed to a screen 134 on which he or she can mail-order a product. Instead, when the user wants to receive a service regarding a uniform and presses the button 130B on the screen 130, it is changed to the screen 134.

As described above, in the example shown in FIG. 19A, FIG. 19B, FIG. 20A, and FIG. 20B, in addition to the image of the athlete, the logo mark image of the uniform that he wears is recognized from the image data 7D. Thus, the user can mail-order sportsware relating to the recognized logo mark image. In this example, images 134A and 134B of uniforms that the user can mail-order also function as buttons. When the user presses an image of his or her desired sportswear on the screen 134, it is changed to the screen 135 on which he or she can mail-order the selected sportswear.

When the user inputs necessary information and presses the button 135A on the screen 135, it is changed to a screen (not shown) on which he or she confirms his or her input information. When the user presses for example a pay button on the screen, he or she can pay for the mail order.

Information that appears after for example the screen 131 may be provided by the server 3. Instead, the information may be provided by the contractor of the athlete, original seller of the sportsware recognized by the logo mark image, or the like as a web site on the Internet 2. In this case, when the user presses the button 130A or the button 130B on the screen 130, the portable camera telephone terminal 1 is linked to the web site.

The button 131D on the screen 131, the button 133B on the screen 133, and the button 135B on the screen 135 are buttons with which the current screen is changed to the immediately preceding screen.

FIG. 21A, FIG. 21B, FIG. 22A, and FIG. 22B show an example of the image data 7E. In this example, the user photographs an advertisement image of a new release CD or a new release movie, transmits the photographed image to the server 3, and receives a service therefrom. In this example, it is assumed that the image data 7E are data of which an advertisement poster of a new release movie was photographed. In FIG. 21A and FIG. 21B, the user photographs an advertisement poster of an attractive new release movie with the portable camera telephone terminal 1, attaches the photographed image as the image data 7E to electronic mail on the screen 101, and transmits the electronic mail to the server 3. The image data 7E may be image data of a commercial of a television broadcast.

The server 3 performs an image recognizing process and a meta data extracting process for the received image data 7E, identifies image elements contained in the image data 7E, and retrieves meta data corresponding to the image elements. The server 3 creates a web site that provides a service according to the meta data to the user and returns electronic mail describing the URL of the web site to the portable camera telephone terminal 1. When the user designates a URL 102A of the return electronic mail on the screen 102 in a predetermined manner, the portable camera telephone terminal 1 accesses the web site and displays a screen 140.

A poster image 7E' corresponding to the image data 7E and a button 140A appear on the screen 140. When the user presses the button 140A on the screen 140, it is changed to a screen 141 (refer to FIG. 22A). An outlined description of the movie advertised by the poster and buttons 141A, 141B, 141C, and 141D appear on the screen 141. When the user presses the button 141A on the screen 141, it is changed to a screen 142 on which detailed information of the movie appears. In this example, information about shows such as theaters and show times appear as the detailed information.

When the user presses the button 142A on the screen 142, it is changed to a screen 144 on which he or she can mail-order a movie ticket. Instead, when the user presses the button 141B on the screen 141, it is changed to the screen 144 on which he or she can mail-order a movie ticket. When the user inputs necessary information and presses the button 144A on the screen 144, it is changed to a screen 145 on which he or she can confirm the input information. When the user presses the button 145A on the screen 145, he or she can pay for the mail order.

When the user presses the button 141C on the screen 141, it is changed to a screen 143 on which similar information appears. Order information of a DVD of the movie, related information of the movie such as story and cast, download information of wallpaper data using an image of the movie, news about the movie, and so forth appear as the similar information. When the user selects his or her desired similar information and presses the button 143A on the screen 143, it is changed to a screen on which the selected information appears. When the user selects order information about the DVD and presses the button 143A on the screen, it is changed to a screen (not shown) on which a DVD mail order page appears. When the user selects wallpaper data and presses the button 143A on the screen 143, it is changed to a screen (not shown) on which he or she can download wallpaper data through the Internet 2.

Information that appears after for example the screen 141 may be provided by the server 3. Instead, the information may be provided by the distributor or the like as a web site on the Internet 2. In this case, when the user presses the button 140A on the screen 140, the portable camera telephone terminal 1 is linked to the web site.

The button 141D on the screen 141, the button 142B on the screen 142, the button 143B on the screen 143, the button 144B on the screen 144, and the button 145B on the screen 145 are buttons with which the current screen is changed to the immediately preceding screen.

FIG. 23A, FIG. 23B, FIG. 24A, FIG. 24B, and FIG. 25 show an example of the image data 7F. In this example, the user photographs a poster or the like that advertises a product, transmits the photographed image to the server 3, and receives a service therefrom. In FIG. 23A and FIG. 23B, the user photographs an attractive product with the portable camera telephone terminal 1, attaches the photographed image as the image data 7F to electronic mail on the screen 101, and transmits the electronic mail to the server 3. The image data 7F may be image data of a commercial of a television broadcast or the like.

The server 3 performs an image recognizing process and a meta data extracting process for the received image data 7F, identifies image elements contained in the image data 7F, and retrieves meta data corresponding to the image elements. The server 3 creates a web site that provides a service according to the meta data to the user and returns electronic mail describing the URL of the web site to the portable camera telephone terminal 1. When the user designates a URL 102A of the return electronic mail on the screen 102 in a predetermined manner, the portable camera telephone terminal 1 accesses the web site and displays a screen 150.

An image 7F' corresponding to the image data 7F and buttons 150A and 150B appear on the screen 150. In the example of which the user photographed a poster adverting a product, the server 3 recognizes the image of the advertised product, a logo mark image of the product, and an image of a model used in the advertisement and provides a service regarding the product and a service regarding the model.

When the user presses the button 150A on the screen 150, it is changed to a screen 151 (refer to FIG. 24A). An outlined description of the product advertised by the poster and buttons 151A, 151B, 151C, and 151D appear on the screen 151. When the user presses the button 151A on the screen 151, it is changed to a screen 152 on which detailed information of the product appears.

When the user presses the button 152A on the screen 152, it is changed to a screen 154 on which he or she can mail-order the product. Instead, when the user presses the button 151B on the screen 151, it is changed to the screen 154 on which he or she can mail-order the product. When the user inputs necessary information and presses the button 154A on the screen 154, it is changed to a screen (not shown) on which he or she can confirm the input information and pay for the mail order.

When the user presses the button 151C on the screen 151, it is changed to a screen 153 on which similar information appears. Other products of the same series of the relevant product, information about commercials advertising the relevant product, related news thereof, and so forth appear on the screen 153 as the similar information according to the meta data of the relevant product. When the user selects desired similar information and presses the button 153A on the screen 153, it is changed to a screen corresponding to the selected similar information.

When the user presses the button 150B on the screen 150, it is changed to a screen 155 (refer to FIG. 25). Outlined information about the model in the poster appears on the screen 155. When the user presses the button 155A on the screen 155, it is changed to a screen (not shown) on which detailed information about the model appears. When the user presses the button 155B, it is changed to a screen on which he or she can mail-order a product corresponding to the model. When the user presses the button 155C on the screen 155, it is changed to a screen (not shown) on which similar information about the model appears. In other words, information that appears after the screen 155 on which detailed information about the model appears has the same structure as information that appears after the screen 131 on which detailed information about the athlete appears.

Information that appears after for example the screen 151 may be provided by the server 3. Instead, the information may be provided by the sponsor of the product, the model agency to which the model belongs, or the like as a web site on the Internet 2. In this case, when the user presses the button 150A or the button 150B on the screen 150, the portable camera telephone terminal 1 is linked to the web site.

The button 151D on the screen 151, the button 152B on the screen 152, the button 153B on the screen 153, the button 154B on the screen 154, and the button 155D on the screen 155 are buttons with which the current screen is changed to the immediately preceding screen.

Thus, using the system according to the embodiment of the present invention, when the user transmits only the photographed image data 7 to the server 3, he or she can receive various services according to the contents of the photographed image data 7. The server 3 extracts meta data according to the result of the image recognizing process and determines the contents of the service. Thus, even if the user does not have the knowledge of an object that he or she photographs, he or she can properly receive a service corresponding thereto.

In addition, when the server 3 performs an image recognizing process for the image data 7 transmitted form the user, the server 3 recognizes a plurality of image elements contained in the image data 7 and extracts meta data corresponding to the image elements. Thus, the user can also receive services for other than the object that he or she photographed. In addition, the user can receive services corresponding to image elements of an image (a commercial image of a poster or a television broadcast, a magazine, or the like) other than an image of an object that he or she photographs.

Thus, when the system according to the embodiment of the present invention is used, the following things can be accomplished.

(1) It is assumed that the user sees a poster of a new release movie and wants to know a theater and show times at which the movie will be performed. When the user photographs the poster with his or her portable camera telephone terminal 1 and transmits the image data 7 of the poster to the server 3, he or she can obtain his or her desired information. When the user obtains his or her desired information, he or she does not need to input characters. In addition, even if the user forgot or incorrectly memorizes necessary information, he or she can retrieve it.

(2) It is assumed that the user wants shoes that a person on a photo of an advertisement of a magazine wears. In this case, even if the user does not know the maker and model of the shoes, when he or she photographs the photo with the portable camera telephone terminal 1 and transmits image data of the photo to the server 3, he or she can obtain his or her desired information.

(3) When the user buys a bottle of wine, he or she may not determine whether to buy it because he or she does not know necessary information about what taste the wine has, where it was produced, and what grape species was used for the wine. In this case, when the user photographs the label of the bottle of wine with the portable camera telephone terminal 1 and transmits an image of the photo of the label to the server 3, he or she can obtain the necessary information. In addition, since the user only needs to transmit an image that he or she photographed, even if he or she cannot read characters of the label because they are written in French or Italian, he or she can quickly retrieve his or her necessary information on the spot.

Next, the case that the embodiment of the present invention is applied to contents of a television broadcast will be considered. With a network connection type television receiver that has been practically implemented, information corresponding to a television broadcast can be obtained through a network. However, the embodiment of the present invention has the following advantages against such a network connection type television receiver.

(1) When the user receives services of the network connection type television receiver, he or she needs to prepare a dedicated television receiver. In contrast, when the user receives services according to the embodiment of the present invention, he or she only needs to photograph an image that appears on a television receiver with the portable camera telephone terminal 1 and transmit the photographed image to the server 3. Thus, when the user receives the services, he or she does need to prepare a dedicated television receiver.

(2) When the user receives services of the network connection type television receiver, he or she can receive only services that a television broadcasting station has prepared. In contrast, when the user receives services according to the embodiment of the present invention, since information is provided according to meta data extracted from an image, he or she can retrieve various types of information.

(3) When the user receives services of the network connection type television receiver, since data are transmitted through a data channel when a broadcast is aired, related information is not updated after the broadcast is aired. Thus, if the user records a broadcast and then reproduces it, since information is transmitted when the broadcast is aired, the information may be old and useless. In contrast, when the user receives the services according to the embodiment of the present invention, since related information is updated, he or she can retrieve the latest information with an old image.

(4) When the user receives services of the network connection type television receiver, if he or she reproduces a recorded broadcast and wants to receive a service regarding the broadcast, he or she needs to prepare a special recording unit that can record a data channel corresponding to the broadcast. In contrast, when the user receives the services according to the embodiment of the present invention, since information is retrieved according to an image, he or she can use a regular recording unit.

Many of television broadcasting stations have their web sites on the Internet 2. In addition, there are many sites for television broadcast programs and commercials on the Internet 2. While the user is watching a television broadcast on a regular television receiver that does not have a network connection function, if he or she found attractive information, he or she can connect his or her personal computer, portable telephone terminal having an Internet connection function, or the like to the Internet 2 and retrieve the information therefrom. The embodiment of the present invention has the following advantages against the information retrieving method based on such a television broadcast.

(1) While the user is watching a television broadcast, if he or she finds attractive information, he or she accesses a predetermined system (information search site or the like on the Internet) with a personal computer or the like. While the user is accessing the system, an attractive image may disappear. In contrast, when the user receives the services according to the embodiment of the present invention, if an attractive image appears, when he or she photographs the screen with a portable camera telephone terminal and transmits the photographed image of the screen to the server 3, he or she can obtain attractive information. Instead, after the user photographed the screen, he or she can access the predetermined system with a personal computer or the like. Thus, even if the attractive image disappears while he or she is accessing the predetermined system, when he or she transmits the photographed image data 7 to the server 3, he or she can access the predetermined system.

(2) When the user accesses the predetermined system with a personal computer or the like and retrieves information according to a television broadcast from the predetermined system, he or she needs to input information about the broadcasting station. In contrast, when the user receives services according to the embodiment of the present invention, he or she does not need to consider the broadcasting station. This is because when the user photographs an image of a television broadcast and transmits the photographed image to the server 3, he or she can obtain information.

(3) When the user accesses the predetermined system with a personal computer or the like and retrieves information corresponding to a recorded television broadcast, he or she needs to record information about a broadcasting station that aired the television broadcast and information of air time of the television broadcast along with an image of the television broadcast. Thus, the user needs to prepare a special recording unit. In contrast, when the user receives the services according to the embodiment of the present invention, he or she can use a regular recording unit. This is because when the user photographs an image of a television broadcast reproduced from a recording unit and transmits the photographed image to the server 3, he or she can obtain information.

Thus, since the services according to the embodiment of the present invention has higher advantages than the conventional information retrieving method, the services can be applied to various types of business. Next, a business model that uses the services according to the embodiment of the present invention will be described.

Figure 26B:
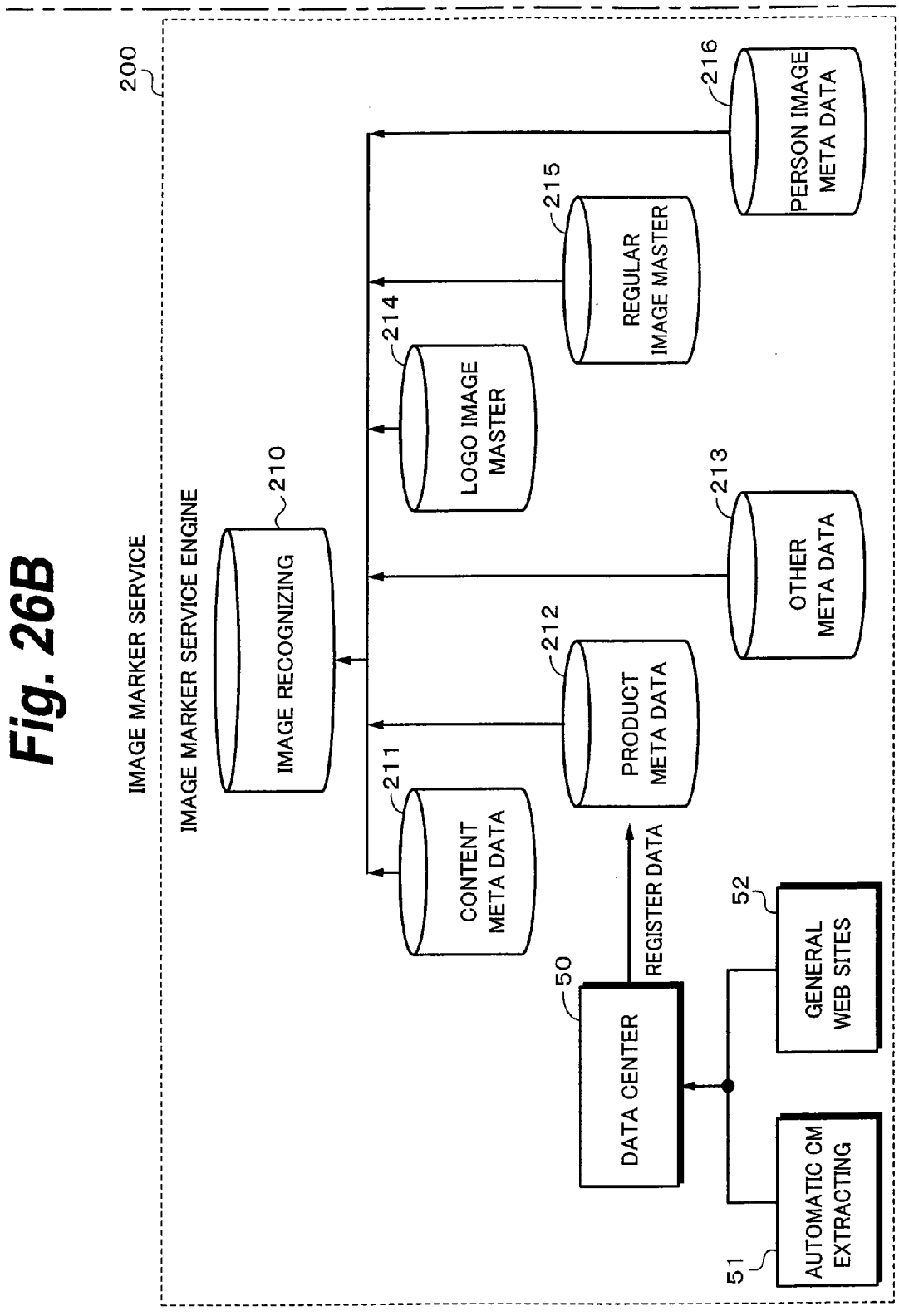

FIG. 26A, FIG. 26B, and FIG. 26C conceptually show the relationship among the services according to the embodiment of the present invention (hereinafter, these services will be referred to as the image marker service), the user, and various companies. An image marker service 200 corresponds to for example the server side system described with reference to FIG. 4A and FIG. 4B. The image marker service 200 has various types of image masters such as a logo mark image master 214, a regular image master 215, and a person image master (for example, they correspond to the image database 4 shown in FIG. 4A and FIG. 4B), various types of meta data corresponding to various types of images registered in the image masters, such as content meta data 211, product meta data 212, and other meta data 213 (for example, they correspond to the related information database 5 shown in FIG. 4A and FIG. 4B), and an image marker service engine composed of an image recognizing engine 210.

The image recognizing engine 210 corresponds to the image feature extracting section 30, the image feature comparing section 31, and the related information retrieving section 32 described with reference to for example FIG. 4A and FIG. 4B. The image recognizing engine 210 performs an image recognizing process for input image data, retrieves an image that matches the input image data with a high match rate from each of the image masters, extracts meta data corresponding to an image that matches the input image data with the high match rate as related information of the input image data.

The image masters and meta data are automatically collected by the automatic CM extracting system 51 from commercials of television broadcasts. In addition, they are retrieved from the general web sites 52. The collected masters and meta data are registered by a data registering center 50 using a registering tool.

The user 201 photographs his or her attractive product, advertisement, or the like and transmits the photographed image to the image marker service 200 through the Internet. In the image marker service 200, the image marker service engine retrieves related information of the image data transmitted from the user 201. The image marker service 200 transmits the retrieved related information to the user 201.

The user 201 can buy the photographed product or the like through the Internet according to the related information transmitted from the image marker service 200. At this point, another company 202 may perform a buying process and so forth instead of the image marker service 200.

The company 202 is an EC company that performs an electronic trade on the Internet using for example a web site at which the user can brose and buy a product. Hereinafter, the company 202 is referred to as the EC company 202. For example, the image marker service 200 rents the image marker service engine to the EC company 202. In other words, the image marker service 200 is an ASP (Application Service Provider) that rents the image marker service engine to the EC company 202.

Conventionally, the user 201 accesses the web site of the EC company 202, retrieves and selects his or her desired product from many produces, and buys it. When the EC company 202 uses the image marker service engine, the user directly designates a product and buys it from the EC company 202 without accessing the web site of the EC company 202 and selecting a product. The user 201 who buys a product from the EC company 202 through the image marker service engine is a prospect of the EC company 202. Thus, it can be expected that the user 201 may be led to the web site or the like of the EC company 202 in the future.

On the other hand, when a general company 203 such as a production maker that produces products that the user can buy through the image marker service engine actively registers product information, its URL, and so forth to the image marker service engine, the general company 203 can expect to increase its sales. The image marker service 200 rents or sells a registering tool used in a data center 50 to the general company 203 so that it can register information to the image marker service engine.

Next, with reference to FIG. 27 to FIG. 30, a business model of the image marker service 200 will be described. In the following, the user 201 corresponds to for example the portable camera telephone terminal 1 and a user who uses it. The image marker service 200 corresponds to for example the server 3. A seller or the like 204 corresponds to the EC company 202 and the general company 203 shown in FIG. 26C. The user 201 and the image marker service 200 can communicate with each other through the Internet 2. For example, as a server unit connected to the Internet 2, the seller or the like 204, the user 201, and the image marker service 200 may mutually communicate with each other through the Internet 2.

FIG. 27 shows an example of a membership pay service that charges the user with for services. The example shown in FIG. 27 is referred to as a first stage of the business model of the image marker service 200. The image marker service 200 charges the user 201 for an information service that the image marker service 200 provides to him or her. In other words, the user 201 makes a membership contract with the image marker service 200, pays the image marker service 200 for the information service, and receives it from the image marker service 200. When the user 201 found a product that he or she wants to buy in information that the information service provides to him or her, the image marker service 200 introduces the customer who wants to buy the product (user 201) to the seller or the like 204. The seller or the like 204 provides product information to the user 201 that the image marker service 200 introduced to the seller or the like 204. When the user pays the seller or the like 204 the money for the product, the seller or the like 204 ships the product and information to the user.

Figure 28:
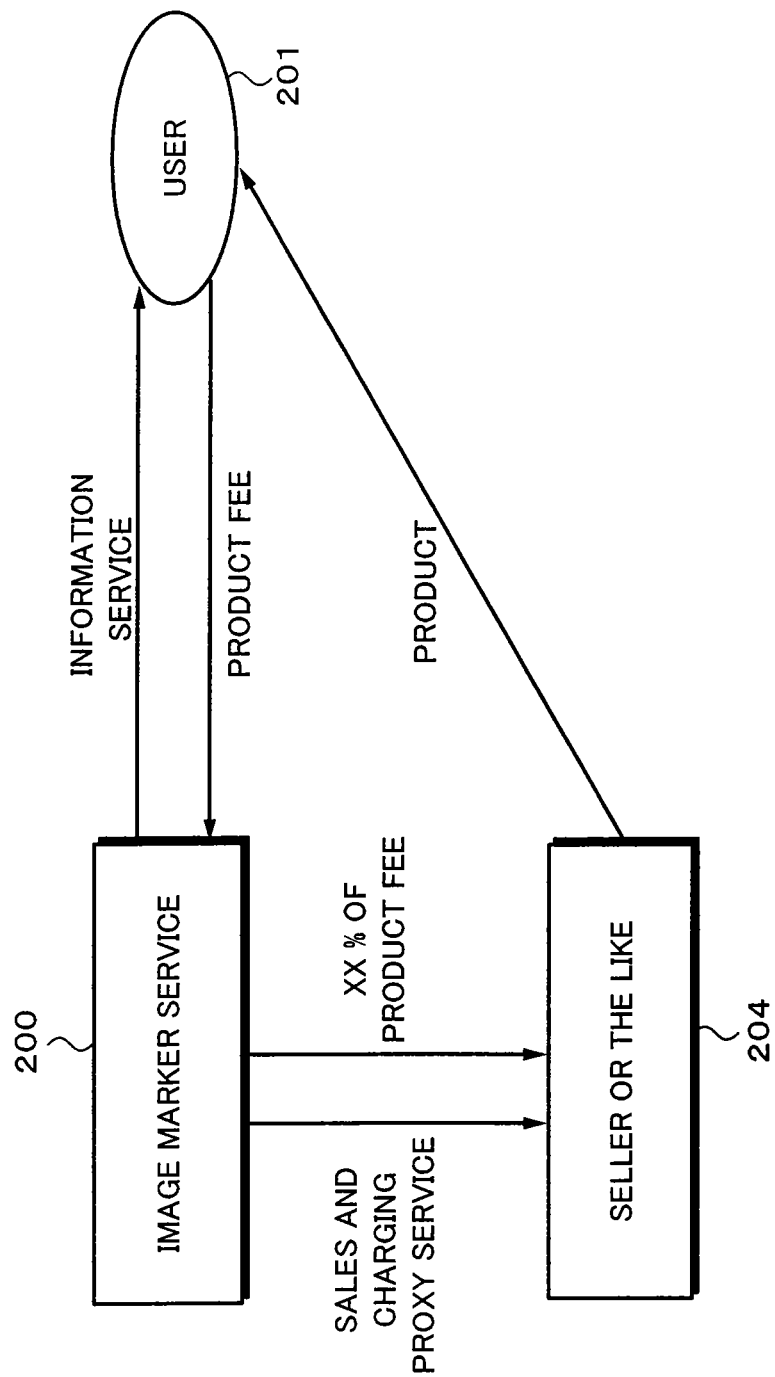
FIG. 28 is a schematic diagram showing an example of which an image marker service performs a proxy service that sells a product to a user and charges him or her the price for the product instead of a sales company.

FIG. 28 is an example that the image marker service 200 sells a product to the user and charges him or her for it instead of the seller or the like 204. The example shown in FIG. 28 is referred to as a second stage of the business model of the image marker service 200. The image marker service 200 performs an information service that provides product information and so forth to the user 201. The user buys a product according to the provided information. At this point, the user 201 pays the image marker service 200 for the product. The image marker service 200 deducts a service commission from the product fee and pays the remaining to the seller or the like 204. The service commission becomes the profit of the image marker service 200. When the seller or the like 204 receives the deducted money from the image marker service 200, the seller or the like 204 ships the product to the user 201.

FIG. 29 is an example of which the image marker service 200 becomes a functional ASP that provides the function of the image marker service engine to the seller or the like 204. The example shown in FIG. 29 is referred to a third stage of the business model of the image marker service 200. The image marker service 200 provides the function of the image marker service engine to the seller or the like 204. The seller or the like 204 pays the image marker service 200 for the function rental fee of the image marker service engine. As a result, the seller or the like 204 can use the image recognizing function and the meta data extracting function for image data transmitted from the user. The seller or the like 204 side needs to collect meta data themselves.

The user 201 transmits photographed image data of a favorite product or the like to the seller or the like 204. The seller or the like 204 transmits related information of the transmitted image data to the user 201 using the function of the image marker service engine. When the user 201 pays the seller or the like 204 for the product according to the related information, the seller or the like 204 ships the product to the user 201.

FIG. 30 is an example of which the image marker service 200 licenses the seller or the like 204 to use the image marker service engine. The example shown in FIG. 30 is referred to as fourth stage of the business model of the image marker service 200. The image marker service 200 licenses the seller or the like 204 to use the technology of the image marker service engine and provides meta data to the seller or the like 204. The seller or the like 204 pays the image marker service 200 for the technology and meta data. Thus, the seller or the like 204 can freely use the image recognizing function and the meta data extracting function for image data transmitted from the user under licensed conditions. In addition, the seller or the like 204 can freely use the meta data under the licensed conditions. The seller or the like 204 side does not need to collect meta data.

The user 201 transmits photographed image data of his or her favorite product or the like to the seller or the like 204. The seller or the like 204 transmits related information of the transmitted image data to the user 201 using the function of the image marker service engine. When the user 201 pays the seller or the like 204 for the product according to the related information, the seller or the like 204 ships the product to the user 201.

In the foregoing four business models, as the stage advances from the first state to the second stage, and so forth, it can be expected that the profit of the image marker service 200 will increase. In addition, as the stage advances, the seller or the like 204 side can more feely use the function of the image marker service engine. In addition, as the stage advances, the flows of information and money are simplified. As a result, the relationship among the image marker service 200, the user 201, and the seller or the like 204 becomes more simplified. This means that business is more effectively carried out among the image marker service 200, the user 201, and the seller or the like 204.

According to the present invention, the server has the image recognizing function. In addition, the serve pre-registers image data and related information thereof to databases. The server performs the image recognizing process for image data transmitted from the user, compares it with image data registered in the databases, and transmits related information of registered image data that match the image data transmitted from the user with a high match rate to the user.

Thus, as an effect of the embodiment of the present invention, by only transmitting photographed image data to the server, the user can receive various types of services according to the photographed contents. In addition, since the server extracts related information from databases according to the result of the image recognizing process and determines the type of a service, as an effect of the embodiment of the present invention, the user can properly receive a service of the server without the knowledge of the photographed object. Thus, as an effect of the embodiment of the present invention, the service provider side can obtain a user who does not have the knowledge about services as a new customer.

In addition, when the server performs the image recognizing process for image data transmitted from the user, the server recognizes a plurality of image elements contained in image data transmitted from the user and extracts related information for each image element. Thus, as an effect of the embodiment of the present invention, the user can receive services for portions other than the object that he or she photographed. In addition, as an effect of the embodiment of the present invention, the user can receive services corresponding to image elements of an image (a commercial image of a poster or a television broadcast, a magazine, or the like) other than an image of an object that he or she photographs.

In addition, according to the embodiment of the present invention, by only photographing image data and transmitting them to the server, the user can obtain related information of the object that he or she photographed. Thus, when the user obtains his or her desired information, as an effect of the embodiment of the present invention, he or she can omit to input characters. In addition, even if the user incorrectly memorizes or forgot a keyword, as an effect of the embodiment of the present invention, he or she can retrieve his or her desired information.

In addition, since the user can obtain related information of image data according to the result of the image recognizing process for the image data, even if he or she does not know the production maker and model of the object, as an effect of the embodiment of the present invention, by only photographing the object and transmitting the photographed image data to the server, the user can obtain his or her desired information. When the object is a label or the like, even if characters on the label are written in a foreign language that he or she cannot read, as an effect of the embodiment of the present invention, he or she can retrieve the information without difficulty.

In the case that the present invention is applied to image data of a television broadcast, as an effect of the embodiment of the present invention, by only photographing an image on a television receiver and transmitting the photographed image to the server, the user can obtain necessary information. Thus, when the user receives services from the server, he or she does not need to prepare a dedicated television receiver such as a network connection type television receiver. Since the user can obtain related information according to an image itself, when he or she wants to receive a service corresponding to a recorded image, he or she can use a regular recording unit. Thus, as an effect of the embodiment of the present invention, the user does not need to prepare a special recording unit that records a data channel along with a television broadcast.

In addition, when the user receives services of the network connection type television receiver, he or she can receive only services that a television broadcasting station has prepared. In contrast, when the user receives services according to the present invention, since information is provided according to related data extracted from an image, as an effect of the embodiment of the present invention, he or she can retrieve various types of information.

In addition, when the user receives services of the network connection type television receiver, since data are transmitted through a data channel when a broadcast is aired, related information is not updated after the broadcast is aired. Thus, if the user records a broadcast and then reproduces it, since information is transmitted when the broadcast is aired, the information may be old and useless. In contrast, when the user receives the services according to the present invention, since related information is updated, as an effect of the embodiment of the present invention, he or she can retrieve the latest information with an old image.

In addition, when the user receives services according to the present invention, even if the user finds attractive information in a television broadcast that he or she is watching, by only photographing the screen and transmitting the photographed image to the server, he or she can obtain necessary information. Thus, as an effect of the embodiment of the present invention, the user does not need to input information about a broadcasting station unlike the case that he or she retrieves information from an information search site on the Internet using for example a personal computer. In addition, as an effect of the embodiment of the present invention, there is no risk of which while the user is accessing the information search site, the broadcast ends and he or she loses information. In addition, by only photographing a reproduced image of a recorded television broadcast and transmitting the photographed image to the server, he or she can obtain necessary information. Thus, as an effect of the embodiment of the present invention, the user does not need to prepare a special recording unit that records information about broadcast time and broadcasting station as well as a television broadcast.

In addition, from the foregoing effects, the user can obtain his or her desired information with high probability. In addition, the user is stressfreely guided from obtaining information to buying a product. Thus, as an effect of the embodiment of the present invention, the information providing side does not lose business chance.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information retrieving system which retrieves information according to image data and moving image data, the information retrieving system comprising:
a terminal unit having:
image data obtaining means for obtaining image data and moving image data, and
transmitting means for transmitting the image data and the moving image data obtained by the image data obtaining means to a communication network, and
a server unit having:
a first database in which retrievable recognizing image data is registered,
a second database in which meta data corresponding to the recognizing image data registered in the first database is registered,
an automatic extracting system that automatically detects and extracts information broadcast on television broadcasts,
a registering section that collects the information broadcast on the television broadcasts and information published on web sites and registers the information as the retrievable recognizing image data to the first database, and collects meta data corresponding to the recognizing image data registered in the first database and registers the meta data to the second database,
receiving means for receiving the image data and the moving image data transmitted from the terminal unit through the network,
a feature extracting section which extracts a feature of image data of which the image data and the moving image data received by the receiving means are broken down frame by frame,
a feature comparing section which extracts a feature of the recognizing image data registered in the first database and compares the feature of the image data of which the image data and the moving image data are broken down frame by frame with a feature of the recognizing image data,
retrieving means for retrieving the recognizing image data having a high match rate to an image element of the image data from the first database according to a compared result by the feature comparing section, and
meta data extracting means for extracting the meta data from the second database according to a retrieved result by the retrieving means,
wherein the server unit allows the terminal unit to browse the meta data extracted by the meta data extracting means through the communication network.

2. The information retrieving system as set forth in claim 1, wherein the retrieving means calculates a score of the match rate to the recognizing image data according to the feature data of the image data transmitted from the terminal unit and retrieves the recognizing image data having the score which is a predetermined value or greater as image data having the high match rate, and
wherein the retrieving means retrieves the recognizing image data included in individual pieces of the image data of which the image data and the moving image data are broken down frame by frame at a predetermined rate or greater as image data having the high match rate.

3. The information retrieving system as set forth in claim 2, wherein the server unit side obtains the feature data.

4. The information retrieving system as set forth in claim 2, wherein the terminal unit pre-obtains the feature data of each piece of the image data of which the image data and the moving image data obtained by the image data obtaining means are broken down frame by frame and causes the transmitting means to transmit the feature data as the image data.

5. The information retrieving system as set forth in claim 1, wherein the automatic extracting system automatically detects and extracts commercials from the television broadcasts.

6. The information retrieving system as set forth in claim 1, wherein the registering section collects the meta data from a different source than where the corresponding recognizing image data is collected.

7. The information retrieving system as set forth in claim 1, wherein the feature comparing section calculates a positional relationship of a plurality of feature points.

8. The information retrieving system as set forth in claim 1, wherein the retrieving means retrieves the recognizing image data according to data including either grayscaled data of each piece of the image data of which the image data and the moving image data obtained by the image data obtaining means are broken down frame by frame or color information of each piece of the image data of which the image data and the moving image data obtained by the image data obtaining means are broken down frame by frame.

9. The information retrieving system as set forth in claim 1, wherein the retrieving means outputs retrieved results corresponding to a plurality of image elements included in each piece of the image data of which the image data and the moving image data received by the receiving means are broken down frame by frame, and wherein the meta data is extracted from the second database according to a retrieved result of a part of a plurality of image elements and other image elements of the plurality of image elements are retrieved from the first database according to the extracted meta data.

10. The information retrieving system as set forth in claim 9, wherein the retrieving means has a first recognizing means for recognizing a person, a second recognizing means for recognizing characters, and a third recognizing means for recognizing a shape other than the person and the characters, and wherein the first, second, and third recognizing means perform recognizing processes for each piece of the image data of which the image data and the moving image data are broken down frame by frame and retrieve the person, the characters, and the shape other than the person and the characters included in individual pieces of the image data of which the image data and the moving image data are broken down frame by frame as image elements from the recognizing image data.

11. The information retrieving system as set forth in claim 1, wherein the server unit transmits an address on the communication network for the meta data extracted by the meta data extracting means to the terminal unit and provides the meta data to the terminal unit on the communication network.

12. The information retrieving system as set forth in claim 1, wherein the server unit transmits the meta data extracted by the meta data extracting means to the terminal unit through the communication network.

13. The information retrieving system as set forth in claim 1, wherein when the meta data is browsed on the terminal unit, an address on the communication network relating to the meta data is allowed to be accessed from the terminal unit.

14. The information retrieving system as set forth in claim 1, wherein the terminal unit is a portable telephone terminal having a camera function.

15. An information retrieving method of a retrieving unit which retrieves information according to image data and moving image data which a terminal unit obtains, the information retrieving method comprising steps of:

causing the terminal unit to obtain the image data and the moving image data;

causing the terminal unit to transmit the image data and the moving image data obtained at the image data obtaining step from the terminal unit to a communication network;

causing the retrieving unit to receive the image data and the moving image data transmitted at the transmitting step through the network;

causing the retrieving unit to automatically detect and extract information broadcast on television broadcasts, causing the retrieving unit to collect the information broadcast on the television broadcasts and information published on web sites and register the information as retrievable recognizing image data to a first database, and collect meta data corresponding to the recognizing image data registered in the first database and register the meta data to a second database;

causing the retrieving unit to extract a feature of image data of which the image data and the moving image data received at the receiving step are broken down frame by frame, extract a feature of the recognizing image data registered in the first database, and retrieve the recognizing image data having a high match rate to an image element of the image data from the first database in which retrievable recognizing image data is registered according to a compared result of a feature of each piece of the image data of which the image data and the moving image data are broken down frame by frame with a feature of the recognizing image data; and causing the retrieving unit to extract the meta data from the second database in which the meta data corresponding to the recognizing image data registered in the first database according to a retrieved result at the retrieving step, wherein the retrieving unit allows the terminal unit to browse the meta data extracted at the meta data extracting step through the communication network.

16. An information retrieving unit which retrieves information according to image data, the information retrieving unit comprising:

a first database in which retrievable recognizing image data is registered;

a second database in which meta data corresponding to the recognizing image data registered to the first database is registered;

an automatic extracting system that automatically detects and extracts information broadcast on television broadcasts, a registering section that collects the information broadcast on the television broadcasts and information published on web sites and registers the information as the retrievable recognizing image data to the first database, and collects meta data corresponding to the recognizing image data registered in the first database and registers the meta data to the second database;

receiving means for receiving image data and moving image data transmitted from a terminal unit through a communication network;

a feature extracting section which extracts a feature of each piece of image data of which the image data and the moving image data received by the receiving means are broken down frame by frame;

a feature comparing section which extracts a feature of the recognizing image data registered in the first database and compares the feature of the image data of which the image data and the moving image data are broken down frame by frame with the feature of the recognizing image data;

retrieving means for retrieving the recognizing image data having a high match rate to an image element of the image data from the first database according to a compared result by the feature comparing section; and meta data extracting means for extracting the meta data from the second database according to a retrieved result by the retrieving means, wherein the terminal unit is allowed to browse the meta data extracted by the meta data extracting means through the communication network.

17. An information retrieving method of a retrieving unit which retrieves information according to image data, the information retrieving method comprising the steps of:

causing the retrieving unit to automatically detect and extract information broadcast on television broadcasts, causing the retrieving unit to collect the information broadcast on the television broadcasts and information published on web sites and register the information as retrievable recognizing image data to a first database, and collect meta data corresponding to the recognizing image data registered in the first database and registers the meta data to a second database;

causing the retrieving unit to receive image data and moving image data transmitted from a terminal unit through a communication network;

causing the retrieving unit to extract a feature of image data of which the image data and the moving image data received at the receiving step are broken down frame by frame, extract a feature of the recognizing image data registered in the first database, and retrieve the recognizing image data having a high match rate to an image element of the image data from the first database in which the retrievable recognizing image data is registered according to a compared result of the feature of the image data of which the image data and the moving image data are broken down frame by frame with the feature of the recognizing image data; and causing the retrieving unit to extract the meta data from the second database in which the meta data corresponding to the recognizing image data registered in the first database according to a retrieved result at the retrieving step, wherein the retrieving unit allows the terminal unit to browse the meta data extracted at the meta data extracting step through the communication network.

18. A non-transitory recording medium storing an information retrieving program which causes a computer unit to execute an information retrieving method of retrieving information according to image data, the information retrieving method comprising the steps of:

causing the retrieving unit to automatically detect and extract information broadcast on television broadcasts, causing the retrieving unit to collect the information broadcast on the television broadcasts and information published on web sites and register the information as retrievable recognizing image data to a first database, and collect meta data corresponding to the recognizing image data registered in the first database and registers the meta data to a second database;

causing the retrieving unit to receive image data and moving image data transmitted from a terminal unit through a communication network;

causing the retrieving unit to extract a feature of image data of which the image data and the moving image data received at the receiving step are broken down frame by frame, extract a feature of the recognizing image data registered in the first database, and retrieve the recognizing image data having a high match rate to an image element of the image data from the first database in which the retrievable recognizing image data is registered according to a compared result of the feature of the image data of which the image data and the moving image data are broken down frame by frame with the feature of the recognizing image data; and causing the retrieving unit to extract the meta data from the second database in which the meta data corresponding to the recognizing image data registered in the first database according to a retrieved result at the retrieving step, wherein the retrieving unit allows the terminal unit to browse the meta data extracted at the meta data extracting step through the communication network.

19. An image recognizing unit which recognizes a predetermined shape from image data, comprising:

a first database in which retrievable recognizing image data is registered;

a second database in which meta data of the recognizing image data registered in the first database is registered;

an automatic extracting system that automatically detects and extracts information broadcast on television broadcasts, a registering section that collects the information broadcast on the television broadcasts and information published on web sites and registers the information as the retrievable recognizing image data to the first database, and collects the meta data corresponding to the recognizing image data registered in the first database and registers the meta data to the second database;

a feature extracting section which extracts a feature of image data of which input image data and input moving image data are broken down frame by frame;

a feature comparing section which extracts a feature of the recognizing image data registered in the first database and compares the feature of the image data of which the image data and the moving image data are broken down frame by frame with the feature of the recognizing image data;

retrieving means for retrieving the recognizing image data having a high match rate to an image element of the image data from the first database according to a compared result by the feature comparing section; and meta data extracting means for extracting the meta data from the second database according to a retrieved result by the retrieving means.

20. The image recognizing unit as set forth in claim 19, wherein the retrieving means calculates a score of a match rate to the recognizing image data according to feature data of the input image data and retrieves the recognizing image data having the score which is a predetermined value or greater as the image data having the high match rate, and wherein the recognizing image data included in each piece of the image data of which the moving image data are broken down frame by frame at a predetermined rate or greater are the retrieved result corresponding to the moving image data.

21. The image recognizing unit as set forth in claim 19, wherein the retrieving means retrieves the recognizing image data according to data including either gray-scaled data of each piece of the image data of which the input image data and the moving image data are broken down frame by frame or color information of each piece of the image data of which the input image data and the moving image data are broken down frame by frame.

22. The image recognizing unit as set forth in claim 19, wherein the retrieving means outputs retrieved results corresponding to a plurality of image elements included in individual pieces of the image data of which the image data and the moving image data are broken down frame by frame, and wherein the meta data is extracted from the second database according to a retrieved result corresponding to a part of the plurality of image elements and other image elements of the plurality of image elements are retrieved from the first database according to the extracted meta data.

23. The image recognizing unit as set forth in claim 22, wherein the retrieving means has a first recognizing means for recognizing a person, a second recognizing means for recognizing characters, and a third recognizing means for recognizing a shape other than the person and the characters, and wherein the first, second, and third recognizing means perform recognizing processes for each piece of the image data of which the image data and the moving image data are broken down frame by frame and retrieve the person, the characters, and the shape other than the person and the characters included in individual pieces of the image data of which the image data and the moving image data are broken down frame by frame as the image elements from the recognizing image data.

24. The image recognizing unit as set forth in claim 22, wherein the meta data is extracted from the second database according to the retrieved result corresponding to the part of the plurality of image elements included in individual pieces of the image data of which the image data and the moving image data are broken down frame by frame and the other image elements of the plurality of image elements are retrieved from the first database according to the extracted meta data.

25. An image recognizing method of recognizing a predetermined shape from image data, the image recognizing method comprising the steps of:

causing a retrieving unit to automatically detect and extract information broadcast on television broadcasts, causing the retrieving unit to collect the information broadcast on the television broadcasts and information published on web sites and register the information as retrievable recognizing image data to a first database, and collect meta data corresponding to the recognizing image data registered in the first database and register the meta data to a second database;

causing the retrieving unit to extract a feature of image data of which input image data and input moving image data are broken down frame by frame, extract a feature of the recognizing image data registered in the first database, and retrieve the recognizing image data having a high match rate to an image element of the image data from the first database in which the retrievable recognizing image data is registered according to a compared result of the feature of the image data of which the image data and the moving image data are broken down frame by frame with the feature of the recognizing image data; and causing the retrieving unit to extract the meta data from the second database in which the meta data of the recognizing image data registered in the first database is registered according to a retrieved result at the retrieving step.

26. A non-transitory recording medium storing an image recognizing program which causes a computer unit to execute an image recognizing method of recognizing a predetermined shape from image data, the image recognizing method comprising the steps of:

causing a retrieving unit to automatically detect and extract information broadcast on television broadcasts, causing the retrieving unit to collect the information broadcast on the television broadcasts and information published on web sites and register the information as retrievable recognizing image data to a first database, and collect meta data corresponding to the recognizing image data registered in the first database and register the meta data to a second database;

causing the retrieving unit to extract a feature of image data of which input image data and input moving image data are broken down frame by frame, extract a feature of the recognizing image data registered in the first database, and retrieve the recognizing image data having a high match rate to an image element of the image data from the first database in which the retrievable recognizing image data is registered according to a compared result of the feature of the image data of which the image data and the moving image data are broken down frame by frame with the feature of the recognizing image data; and causing the retrieving unit to extract the meta data from the second database in which the meta data of the recognizing image data registered in the first database is registered according to a retrieved result at the retrieving step.

* * * * *

UNITED STATES PATENT AND TRADEMARK OFFICE
CERTIFICATE OF CORRECTION

| | | |
|---|---|---|
| PATENT NO. | : 8,458,038 B2 | Page 1 of 1 |
| APPLICATION NO. | : 10/597168 | |
| DATED | : June 4, 2013 | |
| INVENTOR(S) | : Ando | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1950 days.

Signed and Sealed this
Sixth Day of January, 2015

Michelle K. Lee
*Deputy Director of the United States Patent and Trademark Office*